United States Patent
Yoshimoto et al.

(10) Patent No.: US 9,331,763 B2
(45) Date of Patent: May 3, 2016

(54) COMMUNICATION SYSTEM, COMMUNICATION METHOD, BASE STATION APPARATUS, AND MOBILE STATION APPARATUS

(71) Applicant: Sharp Kabushiki Kaisha, Osaka-shi, Osaka (JP)

(72) Inventors: Takashi Yoshimoto, Osaka (JP); Shinpei To, Osaka (JP); Ryota Yamada, Osaka (JP); Kozue Yokomakura, Osaka (JP); Katsuya Kato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 64 days.

(21) Appl. No.: 14/357,636

(22) PCT Filed: Nov. 14, 2012

(86) PCT No.: PCT/JP2012/079475
§ 371 (c)(1),
(2) Date: May 12, 2014

(87) PCT Pub. No.: WO2013/073557
PCT Pub. Date: May 23, 2013

(65) Prior Publication Data
US 2014/0286298 A1 Sep. 25, 2014

(30) Foreign Application Priority Data

Nov. 15, 2011 (JP) .................................. 2011-249706
Nov. 15, 2011 (JP) .................................. 2011-249707

(51) Int. Cl.
*H04B 7/06* (2006.01)
*H04W 72/04* (2009.01)
(Continued)

(52) U.S. Cl.
CPC ............. *H04B 7/0615* (2013.01); *H04B 7/024* (2013.01); *H04J 11/0023* (2013.01);
(Continued)

(58) Field of Classification Search
None
See application file for complete search history.

(56) References Cited

U.S. PATENT DOCUMENTS

| 8,811,261 B2 * | 8/2014 | Nagata | H04B 7/0404 370/315 |
| 2002/0085619 A1 | 7/2002 | Cho et al. | |

(Continued)

FOREIGN PATENT DOCUMENTS

| JP | 2004-512728 A | 4/2004 |
| WO | 2010/124554 A1 | 11/2010 |

(Continued)

OTHER PUBLICATIONS

Official Communication issued in International Patent Application No. PCT/JP2012/079475, mailed on Dec. 18, 2012.
(Continued)

*Primary Examiner* — Candal Elpenord
(74) *Attorney, Agent, or Firm* — Keating & Bennett, LLP

(57) ABSTRACT

In a communication system in which a plurality base station apparatuses are arranged such that the entirety or part of cells of the plurality of base station apparatuses overlaps with one another, a master base station apparatus calculates transmission weighting coefficients of the base station apparatuses and reception weighting coefficients of mobile station apparatuses such that directions of equivalent channels of interference signals received by the mobile station apparatuses connected to the base station apparatuses become orthogonal to the reception weighting coefficients by which the mobile station apparatuses multiply their respective reception signals. The base station apparatuses transmit the reception weighting coefficients to the mobile station apparatuses connected thereto, and the mobile station apparatuses perform a reception process by multiplying their respective reception signals including the interference signals by the reception weighting coefficients.

9 Claims, 34 Drawing Sheets

(51) Int. Cl.
  *H04W 72/08* (2009.01)
  *H04W 24/06* (2009.01)
  *H04B 7/02* (2006.01)
  *H04J 11/00* (2006.01)
  *H04W 16/28* (2009.01)
  *H04L 25/02* (2006.01)
  *H04B 7/08* (2006.01)

(52) U.S. Cl.
  CPC .......... *H04W 72/082* (2013.01); *H04B 7/0862* (2013.01); *H04L 25/0228* (2013.01); *H04W 16/28* (2013.01); *H04W 72/042* (2013.01); *H04W 72/085* (2013.01)

(56) References Cited

U.S. PATENT DOCUMENTS

| | | | |
|---|---|---|---|
| 2006/0018282 A1* | 1/2006 | Kwak | H04W 72/1289 370/331 |
| 2008/0212555 A1* | 9/2008 | Kim | H04J 13/0062 370/344 |
| 2008/0212702 A1* | 9/2008 | Pan | H04B 7/0417 375/260 |
| 2009/0257411 A1* | 10/2009 | Shitara | H04J 11/0069 370/336 |
| 2011/0176593 A1* | 7/2011 | Hultell | H04B 7/0404 375/224 |
| 2011/0199986 A1* | 8/2011 | Fong | H04L 5/0035 370/329 |
| 2012/0044978 A1 | 2/2012 | Wang et al. | |
| 2012/0087265 A1 | 4/2012 | Tamaki et al. | |
| 2012/0207043 A1* | 8/2012 | Geirhofer | H04L 5/0048 370/252 |
| 2013/0039199 A1* | 2/2013 | Liao | H04B 7/0626 370/252 |
| 2013/0114523 A1* | 5/2013 | Chatterjee | H04J 11/0053 370/329 |
| 2013/0223245 A1 | 8/2013 | Taoka et al. | |

FOREIGN PATENT DOCUMENTS

| | | |
|---|---|---|
| WO | 2010/125635 A1 | 11/2010 |
| WO | 2011/111557 A1 | 9/2011 |

OTHER PUBLICATIONS

3GPP TS 36.213 V8.8.0, "3rd Generation Partnership Project; Technical Specification Group Radio Access Network; Evolved Universal Terrestrial Radio Access (E-UTRA); Physical layer procedures (Release 8)", Sep. 2009, pp. 1-77.

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)", Mar. 2010, pp. 1-104.

NTT Docomo, 3GPP TSG RAN WG1 meeting #62bis, R1-105442, "Views on eICIC Schemes for Rel-10", Xian, China, Oct. 11-15, 2010, pp. 1-9.

Kudo et al., "Spatial Domain Resource Sharing for Overlapping Cells—Performance evaluation using measured channel in office environment-", IEICE Technical Report, vol. 110, No. 75, Jun. 3, 2010, pp. 7-12.

Tong et al., "Aspects in Realizing Coordinated Multi-point Transmission for 3GPP LTE-Advanced", IEICE Technical Report, vol. 109, No. 305, Nov. 19, 2009, pp. 151-154.

Ohwatari, Y. et al., "Investigation of Interference Rejection Combining Receiver to Suppress Inter-cell Interference in LTE-Advanced Downlink", The Institute of Electronics, Information and Communication Engineers, Technical Report, vol. 111, No. 145, RCS2011-80, Jul. 2011, pp. 31-36.

She, X. et al., "Study on Reference Signals and Control Signaling for Downlink MU-MIMO in LTE-Advanced", The Institute of Electronics, Information and Communication Engineers, Technical Report, vol. 110, No. 251, RCS2010-113, Oct. 2010, pp. 37-42.

* cited by examiner

FIG. 3

| RECEPTION WEIGHTING COEFFICIENT INFORMATION | | | | | CELL INFORMATION REGION | | | | | | | | NUMBER OF LAYERS | | | |
|---|---|---|---|---|---|---|---|---|---|---|---|---|---|---|---|---|
| 0 | 1 | 2 | 3 | ... | n | 0 | 1 | 2 | 3 | 4 | 5 | 6 | 7 | 0 | 1 | 2 | 3 |
| 1 | 1 | 0 | 0 | ... | 0 | 1 | 0 | 0 | 0 | 0 | 0 | 0 | 0 | 1 | 0 | 0 | 0 |

FIG. 8

| RECEPTION WEIGHTING COEFFICIENTS $U_{k,n}$ | | | | CODEBOOK INDEX # | TRANSMISSION WEIGHTING COEFFICIENTS $V_{j,n}$ | | | |
|---|---|---|---|---|---|---|---|---|
| $U_{0,0}$ | | | | 0 | $V_{1,1}$ | $V_{2,1}$ | | |
| $U_{1,0}$ | | | | 1 | $V_{1,2}$ | $V_{2,2}$ | | |
| $U_{1,3}$ | $U_{2,3}$ | | | 2 | $V_{1,3}$ | $V_{2,3}$ | | |
| $U_{1,4}$ | $U_{2,4}$ | | | 3 | $V_{1,4}$ | $V_{2,4}$ | | |
| $U_{1,1}$ | $U_{2,1}$ | $U_{3,1}$ | | 4 | $V_{1,1}$ | $V_{2,1}$ | $V_{3,1}$ | |
| $U_{1,2}$ | $U_{2,2}$ | $U_{3,2}$ | | 5 | $V_{1,2}$ | $V_{2,2}$ | $V_{3,2}$ | |
| | | | | ... | | | ... | |
| $U_{1,3}$ | $U_{2,3}$ | $U_{3,3}$ | $U_{4,3}$ | 11 | $V_{1,3}$ | $V_{2,3}$ | $V_{3,3}$ | $V_{4,3}$ |
| | | | | ... | | | ... | |

FIG. 9

| CODEBOOK INDEX | CELL INFORMATION REGION | | | | | | | | NUMBER OF LAYERS | | |
|---|---|---|---|---|---|---|---|---|---|---|---|
| | 0 | 1 | 2 | 3 | 4 | 5 | 6 | 7 | 0 | 1 | 2 | 3 |
| 0 1 2 3 | 0 | 0 | 0 | 0 | 0 | 0 | 0 | 7 | 0 | 1 | 2 | 3 |
| 0 1 0 0 | 1 | 0 | 0 | 0 | 0 | 0 | 0 | 0 | 1 | 0 | 0 | 0 |

FIG. 20

| TRANSMISSION WEIGHTING COEFFICIENT INFORMATION | | | | MCS REGION | | | | | | | | LAYER | | | |
|---|---|---|---|---|---|---|---|---|---|---|---|---|---|---|---|
| 0 | 1 | 2 | 3 | n | 0 | 1 | 2 | 3 | 4 | 5 | 6 | 7 | 0 | 1 | 2 | 3 |
| 1 | 1 | 0 | 0 | 0 | 1 | 0 | 0 | 0 | 0 | 0 | 0 | 0 | 1 | 0 | 0 | 0 |

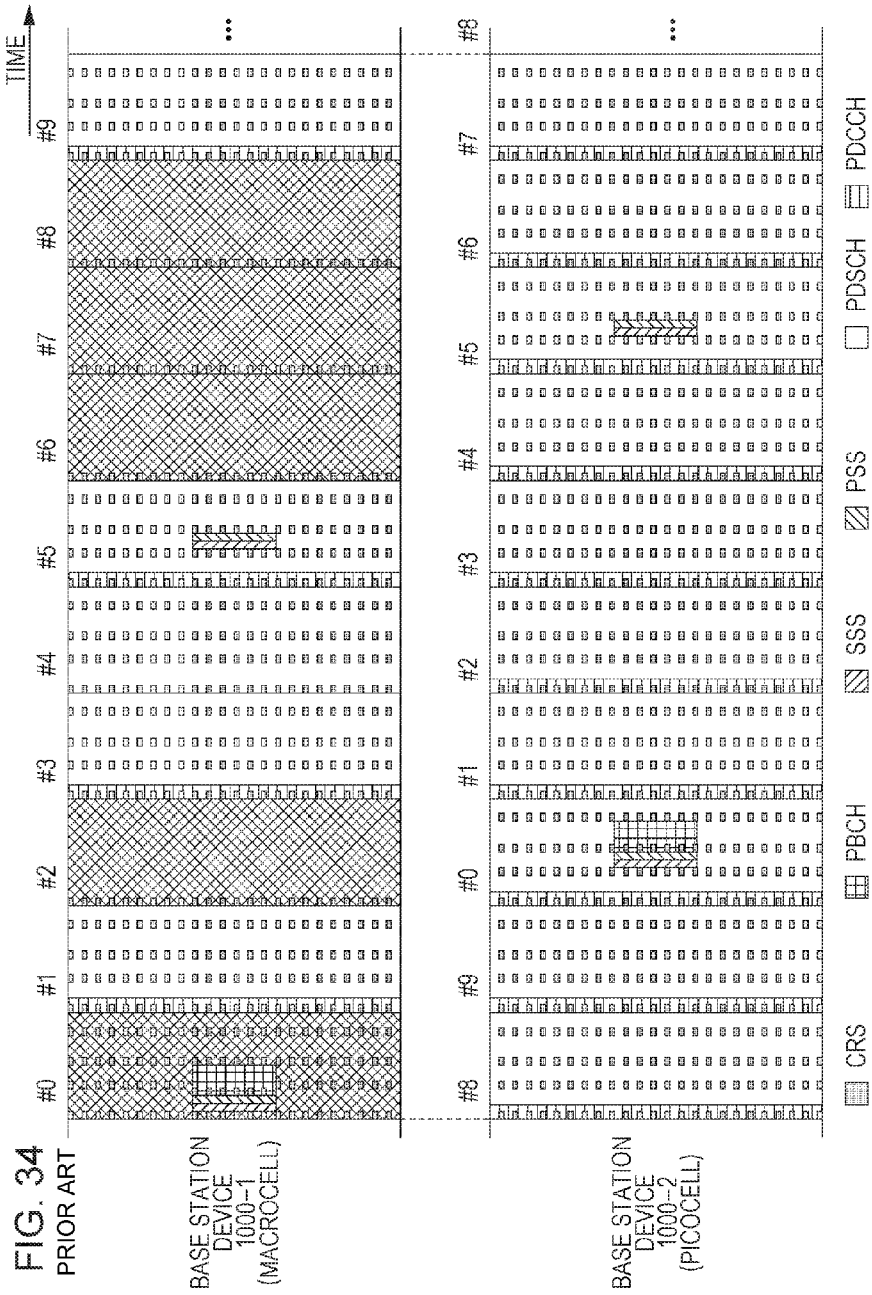

COMMUNICATION SYSTEM, COMMUNICATION METHOD, BASE STATION APPARATUS, AND MOBILE STATION APPARATUS

TECHNICAL FIELD

The present invention relates to a communication system, a communication method, a base station apparatus, and a mobile station apparatus.

BACKGROUND ART

In a wireless communication system for mobile phones or the like, base station apparatuses (eNBs; eNodeBs) configuring cells (communication service areas) for providing wireless communication services for a plurality of mobile station apparatuses (terminals or UE (user equipment)) are installed in a city and the suburbs. In particular, in the wireless communication system, a cellular configuration, in which a plurality of base station apparatuses are arranged, is used in order to expand communication areas.

In the cellular configuration, the same frequency is reused in the cells of the base station apparatuses in order to improve spectral efficiency. When inter-cell interference is caused due to the reuse of the same frequency in the cellular configuration, however, improvement of the spectral efficiency is limited.

As a method for suppressing and reducing inter-cell interference in an uplink of the cellular configuration, inter-cell interference coordination (ICIC) that uses an indicator OI (overload indicator), an indicator HII (high interference indicator), and the like is used (NPL 1). The indicator OI is a control signal used by a base station apparatus for notifying another base station apparatus that an interference level of a mobile station apparatus connected to the other base station apparatus is high when the interference level of the mobile station apparatus is high. In addition, the indicator HII is a control signal used by a base station apparatus that is receiving signals from a mobile station apparatus which is located at a cell edge of the base station apparatus and which performs transmission with high transmission power for notifying another base station apparatus that the base station apparatus is receiving signals from the mobile station apparatus.

FIG. 32 illustrates an overview of an existing wireless communication system A1000 in an uplink in which the inter-cell interference coordination ICIC is applied. A base station apparatus A1000-1 and a base station apparatus A1000-2 include a cell A1000-1a and a cell A1000-2a, respectively, and the base station apparatuses are arranged using one-cell frequency reuse so that the cell A1000-1a of the base station apparatus A1000-1 and the cell A1000-2a of the base station apparatus A1000-2 partially overlap. A plurality of mobile station apparatuses are included in each cell, and each mobile station apparatus is controlled in such a way as to be wirelessly connected to a base station apparatus that can receive signals with optimum reception field intensity.

The base station apparatus A1000-1 is connected (r11) to a mobile station apparatus A2000-1. In addition, the base station apparatus A1000-1 is interfered (r21) by a mobile station apparatus A2000-2 connected (r22) to the base station apparatus A1000-2.

The interfered (r21) base station apparatus A1000-1 transmits the indicator 10 to the base station apparatus A1000-2 through a backhaul line A10 (for example, an optical fiber, an X2 interference, or the like). Upon receiving the indicator IO, the base station apparatus A1000-2 causes the mobile station apparatus A2000-2 to stop the transmission in order to suppress and reduce the inter-cell interference.

In addition, before the mobile station apparatus A2000-2 transmits signals (r22), the base station apparatus A1000-2 transmits the indicator HII to the base station apparatus A1000-1 through the backhaul line A10. Upon receiving the indicator HII, the base station apparatus A1000-1 performs scheduling such that signals (r11) from the mobile station apparatus A2000-1 are not interfered, in order to suppress and reduce the interference.

In addition, a lot of reception dead zones and weak-field zones are being caused in these years because of high-rise buildings and apartments built in the process of rapid urbanization. In these zones, connections between mobile station apparatuses and base station apparatuses are often restricted. In addition, improvement of throughput to mobile stations is required in order to increase communication speed in a mobile communication system. Similarly, it is desired to realize high-speed communication with mobile station apparatuses located at cell edges (peripheral zones of communication service areas) without trouble.

As a method for improving throughput, a method has been proposed in which a plurality of base station apparatuses are arranged such that part or the entirety of the range of a macrocell configured by a main base station apparatus (macro base station) and the range of a cell of a low-power base station (picocell base station or femtocell base station) whose maximum transmission power is lower than that of the macro base station overlap (heterogeneous network; NPL 2).

FIG. 33 illustrates an overview of a wireless communication system 1000 in a downlink in which a plurality of base station apparatuses having different cell radii are arranged. The base station apparatuses are arranged using one-cell frequency reuse so that a cell 1000-1a (macrocell) of a main base station apparatus 1000-1 (macro base station apparatus), a cell 1000-2a (picocell) of a base station apparatus 1000-2, which is a low-power base station whose maximum transmission power is lower than that of the macro base station apparatus, and a cell 1000-3a (picocell) of a base station apparatus 1000-3 overlap. A plurality of mobile station apparatuses are included in each cell, and each mobile station apparatus is controlled in such a way as to be wirelessly connected to a base station apparatus that can receive signals with highest reception field intensity. In FIG. 33, a mobile station apparatus 2000-1 is wirelessly connected (r11) to the base station apparatus 1000-1, a mobile station apparatus 2000-2 is wirelessly connected (r22) to the base station apparatus 1000-2, and a mobile station apparatus 2000-3 is wirelessly connected (r33) to the base station apparatus 1000-3.

By constructing such a heterogeneous network, it becomes possible to improve total spectral efficiency in an area covered by the macrocell viewed from the perspective of the network.

In addition, as a method for suppressing and reducing inter-cell interference in a downlink of a heterogeneous network, a method has been disclosed in which a plurality of base station apparatuses transmit and communicate signals to mobile station apparatuses in a coordinated manner (NPL 3).

FIG. 34 illustrates a transmission frame format in the downlink of the heterogeneous network. In an upper part of FIG. 34, one frame is configured by ten subframes of a plurality of types including normal subframes and resource mapping restriction subframes (also referred to as restriction subframes). In the upper part of FIG. 34, a subframe index #1, a subframe index #3, a subframe index #4, a subframe index #5, and a subframe index #9 are normal subframes, and a subframe index #0, a subframe index #2, a subframe index #6, a subframe index #7, and a subframe index #8 are resource mapping restriction subframes. The resource mapping restriction subframes may be ABSs (almost blank subframes), MBSFNs (multicast-broadcast over single-frequency networks), or the like.

The normal subframes refer to subframes in which a base station apparatus can perform resource mapping on information data, control data, and reference signals. For example, as downlink signals in LTE, physical downlink shared channels (PDSCHs; channels that mainly transmit information data), physical downlink control channels (PDCCHs; indicated by horizontally hatched portions in the figure), synchronization signals (PSSs; primary synchronization signals and SSSS; secondary synchronization signals), physical broadcast channels (PBCHs), cell-specific reference signals (CRSs), and the like may be subjected to the resource mapping.

The resource mapping restriction subframes are subframes in which a base station apparatus is restricted to resource mapping of certain signals. In an ABS, only CRSs and/or certain control signals (SSSs, PSSs, PBCHs (checkered portions in the figure), and the like) are arranged (the subframe index #0 in the upper part of FIG. 34). In an MBSFN subframe, only CRSs are arranged (the subframe index #2, the subframe index #6, the subframe index #7, and the subframe index #8 in the upper part of FIG. 34). In ABS and MBSFN subframes, signals (for example, PDSCHs) other than the above-mentioned signals that can be arranged are not arranged (hatched portions in the figure).

A lower part of FIG. 34 illustrates a downlink transmission frame format at a time when the base station apparatus 1000-2 and the base station apparatus 1000-3 transmit signals to their respective connected mobile station apparatuses. In the lower part of FIG. 34, one frame is configured by ten normal subframes. In FIG. 34, information data (PDSCHs) transmitted from the base station apparatus 1000-1 to the mobile station apparatus 2000-1 is arranged in the subframes other than the subframe index #0, the subframe index #2, the subframe index #6, the subframe index #7, and the subframe index #8 in the upper part of FIG. 34. Information data transmitted from the base station apparatus 1000-2 to the mobile station apparatus 2000-2 is arranged in a subframe index #0, a subframe index #4, a subframe index #5, a subframe index #6, and a subframe index #8 in the lower part of FIG. 34. Information data transmitted from the base station apparatus 1000-3 to the mobile station apparatus 2000-3 is arranged in the subframe index #0, the subframe index #4, the subframe index #5, the subframe index #6, and the subframe index #8 in the lower part of FIG. 34.

Thus, since the base station apparatus 1000-2 and the base station apparatus 1000-3 assign the information data for the mobile station apparatus 2000-2 and the mobile station apparatus 200-4, respectively, that can be interfered by the base station apparatus 1000-1 in the subframes synchronized with the subframes in which the base station apparatus 1000-1 does not arrange information data, inter-cell interference from the base station apparatus 1000-1 can be reduced.

CITATION LIST

Non Patent Literature

NPL 1: 3rd Generation Partnership Project; Technical Specification Group Radio Access Network; Evolved Universal Terrestrial Radio Access (E-UTRA) Physical Layer procedures (Release 8), 3GPP TS36.213 v8.8.0 (2009 September) URL: http://www.3gpp.org/ftp/Specs/2011-06/Rel-8/36_series/

NPL 2: 3rd Generation Partnership Project; Technical Specification Group Radio Access Network; Further Advancements for E-UTRA Physical Layer Aspects (Release 9), 3GPP TR36.814 v9.0.0 (2010 March) URL: http://www.3gpp.org/ftp/Specs/html-info/36814.htm NPL 3: R1-105442, 3GPP TSG RAN WG1 Meeting #62bis

SUMMARY OF INVENTION

Technical Problem

In NPL 2, however, there is a problem in that when the base station apparatus 1000-1 is transmitting signals, transmission efficiencies of the mobile station apparatus 2000-2 connected to the picocell 1000-2a and the mobile station apparatus 2000-3 connected to the picocell 1000-3a decrease due to interference (inter-cell interference) (r12) and (r13), respectively, from the macrocell 1000-1a as illustrated in FIG. 33.

In addition, in the method for suppressing and reducing inter-cell interference disclosed in NPL 3, when inter-cell interference has occurred between the picocells, SINRs of the mobile station apparatuses 2000-2 and 2000-3 decrease. In FIG. 33, interference (r32) with the mobile station apparatus 2000-2 from the base station apparatus 1000-3 and interference (r23) with the mobile station apparatus 2000-3 from the base station apparatus 1000-2 are causes of the decreases in the SINRs. Therefore, there is a problem in that even if the heterogeneous network is constructed, the spectral efficiency cannot be sufficiently improved.

In addition, in the heterogeneous network, when a lot of picocells that use the same frequency are arranged in a macrocell and interference is caused between a plurality of cells, opportunities for each base station apparatus to cause a connected mobile station apparatus to perform transmission is extremely limited if the inter-cell interference is controlled by indicators OI or indicators HII between the plurality of base station apparatuses between which the interference is caused. Accordingly, there is a problem in that the spectral efficiency and the throughput cannot be sufficiently improved.

The present invention has been established in view of the above circumstances, and aims to provide a communication system, a communication method, a base station apparatus, and a mobile station apparatus that can improve the spectral efficiency even when inter-cell interference is caused between cells of a plurality of base station apparatuses.

Solution to Problem

The configurations of a communication system, a communication method, a base station apparatus, and a mobile station apparatus according to the present invention for solving the above-described problems are as follows.

A communication system in the present invention is a communication system including a plurality of base station apparatuses, and mobile station apparatuses each connected to at least one of the plurality of base station apparatuses. The plurality of base station apparatuses are arranged such that the entirety or part of connectable ranges of the base station apparatuses overlap with one another. The base station apparatuses transmit, to the mobile station apparatuses, information regarding weighting coefficients indicating reception weighting coefficients by which reception signals received by the mobile station apparatuses are multiplied.

In addition, the plurality of base station apparatuses in the communication system in the present invention, the plurality of base station apparatuses include a main base station apparatus and a subsidiary base station apparatus. The main base station apparatus includes a weighting coefficient control unit that calculates, using channel state information regarding the entirety of the system, transmission weighting coefficients by which transmission data to be transmitted by the plurality of base station apparatuses is multiplied and reception weighting coefficients by which reception signals received by the mobile station apparatuses to which the plurality of base station apparatuses are connected are multiplied. The plurality of base station apparatuses each include a precoding unit that multiplies the transmission data by the transmission weighting coefficient, a weighting coefficient information generation unit that generates weighting coefficient information indicating the reception weighting coefficient, and a transmission unit that transmits information data obtained by multiplying the transmission data by the transmission weighting coefficient and the weighting coefficient information to the mobile station apparatus to which each of the plurality of base station apparatuses is connected. The mobile station apparatuses each include a control signal detection unit that detects the reception weighting coefficient from the weighting coefficient information and an interference suppression unit that obtains the information data by multiplying the reception signal by the reception weighting coefficient.

In addition, in the communication system in the present invention, the weighting coefficient information is control signals including the reception weighting coefficient by which the reception signal received by each of the mobile station apparatuses connected to the base station apparatuses is multiplied. In addition, the weighting coefficient information is control signals including a codebook index corresponding to the transmission weighting coefficients of the plurality of base station apparatuses and the reception weighting coefficients of the mobile station apparatuses. In addition, the weighting coefficient information is reference signals multiplied by the reception weighting coefficients.

In addition, in the communication in the present invention, the reference signals are part of reference signals specific to the mobile station apparatuses. The reference signals are part of reference signals specific to cells of the base station apparatuses. The reference signals are reference signals specific to the mobile station apparatuses or reference signals specific to cells of the base station apparatuses.

In addition, in the communication system in the present invention, the main base station apparatus includes a higher layer that transmits information regarding the transmission weighting coefficient and information regarding the reception weighting coefficients to the subsidiary base station apparatus. Furthermore, the subsidiary base station apparatus includes a weighting coefficient information generation unit that generates weighting coefficient information including the information regarding the reception weighting coefficient transmitted from the higher layer.

In addition, a communication method in the present invention is a communication method used in a communication system that includes a plurality of base station apparatuses and mobile station apparatuses each connected to at least one of the plurality of base station apparatuses and in which the plurality of base station apparatuses are arranged such that the entirety or part of connectable ranges of the base station apparatuses overlap with one another. The communication method includes the step of transmitting, using the base station apparatuses, reception weighting coefficient information indicating reception weighting coefficients by which reception signals received by the mobile station apparatuses are multiplied to the mobile station apparatuses.

In addition, a base station apparatus in the present invention is a base station apparatus in a communication system that includes a plurality of base station apparatuses including a main base station apparatus and a subsidiary base station apparatus and mobile station apparatuses each connected to at least one of the plurality of base station apparatuses and in which the plurality of base station apparatuses are arranged such that the entirety or part of connectable ranges of the base station apparatuses overlap with one another. The main base station apparatus includes a weighting coefficient control unit that calculates, using channel state information regarding the entirety of the system, transmission weighting coefficients by which transmission data to be transmitted by the plurality of base station apparatuses are multiplied and reception weighting coefficients by which reception signals received by the mobile station apparatuses to which the plurality of base station apparatuses are connected are multiplied. The plurality of base station apparatuses each include a precoding unit that multiplies the transmission data by the transmission weighting coefficient, a weighting coefficient information generation unit that generates reception weighting coefficient information indicating the reception weighting coefficient, and a transmission unit that transmits information data obtained by multiplying the transmission data by the transmission weighting coefficient and the reception weighting coefficient information to the mobile station apparatus to which each of the plurality of base station apparatuses is connected.

In addition, a mobile station apparatus in the present invention is a mobile station apparatus in a communication system that includes a plurality of base station apparatuses including a main base station apparatus and a subsidiary base station apparatus and mobile station apparatuses each connected to at least one of the plurality of base station apparatuses and in which the plurality of base station apparatuses are arranged such that the entirety or part of connectable ranges of the base station apparatuses overlap with one another. The mobile station apparatus includes a reception unit that receives a reception signal multiplied by a transmission weighting coefficient calculated by the main base station apparatus using channel state information regarding the entirety of the system and reception weighting coefficient information, a control signal detection unit that detects a reception weighting coefficient from the reception weighting coefficient information, and an interference suppression unit that obtains the information data by multiplying the reception signal by the reception weighting coefficient.

In addition, a communication system in the present invention is a communication system including a plurality of base station apparatuses including a main base station apparatus and a subsidiary base station apparatus and mobile station apparatuses each connected to at least one of the plurality of base station apparatuses. The main base station apparatus includes a weighting coefficient control unit that calculates, using channel state information regarding the entirety of the system, transmission weighting coefficients by which transmission data to be transmitted by the mobile station apparatuses to which the plurality of base station apparatuses are connected is multiplied and reception weighting coefficients by which the transmission data received by the plurality of base station apparatuses is multiplied. The plurality of base station apparatuses each include a transmission unit that transmits information regarding the transmission weighting coefficient to the corresponding mobile station apparatus, a reception unit that receives a transmission signal obtained by the mobile station apparatus to which each of the plurality of base station apparatuses is connected by multiplying the transmission data by the transmission weighting coefficient, and an interference suppression unit that multiplies the transmission signal obtained by multiplying the transmission data by the transmission weighting coefficient by the reception weighting coefficient. The mobile station apparatuses each include a transmission unit that transmits the transmission signal obtained by multiplying the transmission data by the transmission weighting coefficient to the base station apparatuses to which each of the mobile station apparatuses is connected.

In addition, in the communication system in the present invention, the plurality of base station apparatuses each include a control signal generation unit that generates a control signal including a region storing the information regarding the transmission weighting coefficient. The transmission unit of each of the base station apparatuses transmits the control signal to the mobile station apparatus to which each of the mobile station apparatuses is connected.

In addition, in the communication system in the present invention, the main base station apparatus includes a higher layer that transmits the transmission weighting coefficients and the reception weighting coefficient to the subsidiary base station apparatus.

In addition, in the communication system in the present invention, the information regarding the transmission weighting coefficients is the transmission weighting coefficients by which the transmission signals transmitted by the mobile station apparatuses are multiplied. In addition, the information regarding the transmission weighting coefficients are a codebook index corresponding to the transmission weighting coefficients by which the transmission signals transmitted by the mobile station apparatuses are multiplied.

In addition, in the communication system in the present invention, the mobile station apparatuses each include a control signal detection unit that detects the transmission weighting coefficient from the codebook index.

In addition, in the communication system in the present invention, the plurality of base station apparatuses each further include a reference signal generation unit that generates a reference signal multiplied by the transmission weighting coefficient. The transmission unit of each of the base station apparatuses transmits the reference signal to the mobile station apparatus to which each of the base station apparatuses is connected.

In addition, in the communication system in the present invention, the reference signals are part of reference signals specific to the mobile station apparatuses. In addition, in the communication system in the present invention, the reference signals are part of reference signals specific to cells, which are connectable ranges of the base station apparatuses. In addition, in the communication system in the present invention, the reference signals are reference signals specific to the mobile station apparatuses or reference signals specific to the cells of the base station apparatuses.

In addition, a communication method in the present invention is a communication method in a communication system that includes a plurality of base station apparatuses including a main base station apparatus and a subsidiary base station apparatus and mobile station apparatuses each connected to at least one of the plurality of base station apparatuses. The method includes the steps of calculating, in the main base station apparatus, transmission weighting coefficients by which transmission data to be transmitted by the mobile station apparatuses to which the plurality of base station apparatuses are connected is multiplied and reception weighting coefficients by which the transmission data received by the plurality of base station apparatuses is multiplied using channel state information regarding the entirety of the system, transmitting, in the plurality of base station apparatuses, information regarding the transmission weighting coefficients to the mobile station apparatuses, receiving, in the plurality of base station apparatuses, transmission signals obtained by the mobile station apparatuses to which the base station apparatuses are connected by multiplying the transmission data by the transmission weighting coefficients, multiplying, in the plurality of base station apparatuses, the transmission signals obtained by multiplying the transmission data by the transmission weighting coefficients by the reception weighting coefficients, and transmitting, in the mobile station apparatuses, the transmission signals obtained by multiplying the transmission data by the transmission weighting coefficients to the base station apparatuses to which the mobile station apparatuses are connected.

In addition, the communication method in the present invention further includes the steps of generating, using the plurality of base station apparatuses, control signals each including a region storing the information regarding the transmission weighting coefficients, and transmitting, using the transmission unit of each of the base station apparatuses, the control signal to the base station apparatus to which each of the base station apparatuses is connected.

In addition, the communication method in the present invention further includes the step of transmitting, using the main base station apparatus, the transmission weighting coefficients and the reception weighting coefficient to the subsidiary base station apparatus.

In addition, a base station apparatus in a communication system that includes a plurality of base station apparatuses including a main base station apparatus and a subsidiary base station apparatus and mobile station apparatuses each connected to at least one of the plurality of base station apparatuses. The base station apparatus includes a weighting coefficient control unit that calculates, using channel state information regarding the entirety of the system, transmission weighting coefficients by which transmission data to be transmitted by the mobile station apparatuses to which the plurality of base station apparatuses are connected is multiplied and reception weighting coefficients by which the transmission data received by the plurality of base station apparatuses is multiplied, a transmission unit that transmits information regarding the transmission weighting coefficient to the mobile station apparatus, a reception unit that receives a transmission signal obtained by the mobile base station apparatus to which each of the base station apparatuses is connected by multiplying the transmission data by the transmission weighting coefficient, an interference suppression unit that multiplies the transmission signal obtained by multiplying the transmission data by the transmission weighting coefficient by the reception weighting coefficient, a control signal generation unit that generates a control signal including a region storing the information regarding the transmission weighting coefficient, and a higher layer that transmits the transmission weighting coefficient and the reception weighting coefficient.

In addition, a mobile station apparatus in the present invention is a mobile station apparatus in a communication system that includes a plurality of base station apparatuses including a main base station apparatus and a subsidiary base station apparatus and mobile station apparatuses each connected to at least one of the plurality of base station apparatuses. The mobile station apparatus includes a reception unit that receives, among transmission weighting coefficients and transmission weighting coefficients calculated by the main base station apparatus using channel state information regarding the entirety of the system, one of the transmission weighting coefficients, a precoding unit that generates a transmission signal obtained by multiplying transmission data transmitted by the mobile station apparatus by the transmission weighting coefficient, and a transmission unit that transmits the transmission signal obtained as a result of the multiplication by the transmission weighting coefficient to the base station apparatus to which each of the mobile station apparatuses is connected.

Advantageous Effects of Invention

According to the present invention, in a communication system including a plurality of base station apparatuses and mobile station apparatuses each connected to at least one of the plurality of base station apparatuses, the plurality of base station apparatuses and the mobile station apparatuses can suppress inter-cell interference in a coordinated manner when the plurality of base station apparatuses communicate with the mobile station apparatuses using the same frequency. Therefore, the communication system can produce excellent effects of effectively suppressing the inter-cell interference and enabling desirable transmission and reception.

BRIEF DESCRIPTION OF DRAWINGS

FIG. 3 illustrates an example of a format output from a control signal generation unit of the main base station apparatus in the communication system according to the first embodiment.

FIG. 8 illustrates an example of codebooks in a communication system according to a second embodiment.

FIG. 9 illustrates an example of a format output from a control signal generation unit of a main base station apparatus in the communication system according to the second embodiment.

FIG. 20 illustrates an example of a format output from a control signal generation unit of the main base station apparatus in the communication system according to the fourth embodiment.

FIG. 34 illustrates a transmission frame format in a downlink of an existing heterogeneous network.

DESCRIPTION OF EMBODIMENTS

First Embodiment

With respect to a communication system 1 according to a first embodiment, an example will be described in which base station apparatuses 100-j and mobile station apparatuses 200-k transmit data to each other using an OFDM (orthogonal frequency-division multiplexing) scheme. It is to be noted that the scheme used in this embodiment is not limited to this, and other transmission schemes including, for example, single-carrier transmission schemes such as SC-FDMA (single-carrier frequency-division multiplexing access) and DFT-s-OFDM (discrete Fourier transform-spread OFDM) and a multicarrier transmission scheme such as MC-CDMA (multiple carrier code-division multiple access) may be used, instead. In addition, examples of the communication system 1 according to the first embodiment include wireless communication systems such as WCDMA (wideband code-division multiple access), LTE (long term evolution), and LTE-A (LTE-advanced) developed by the 3GPP (Third Generation Partnership Project) and WiMAX (worldwide interoperability for microwave access) developed by the IEEE (Institute of Electrical and Electronics Engineers), but the communication system 1 according to the first embodiment is not limited to these.

Figure 1:
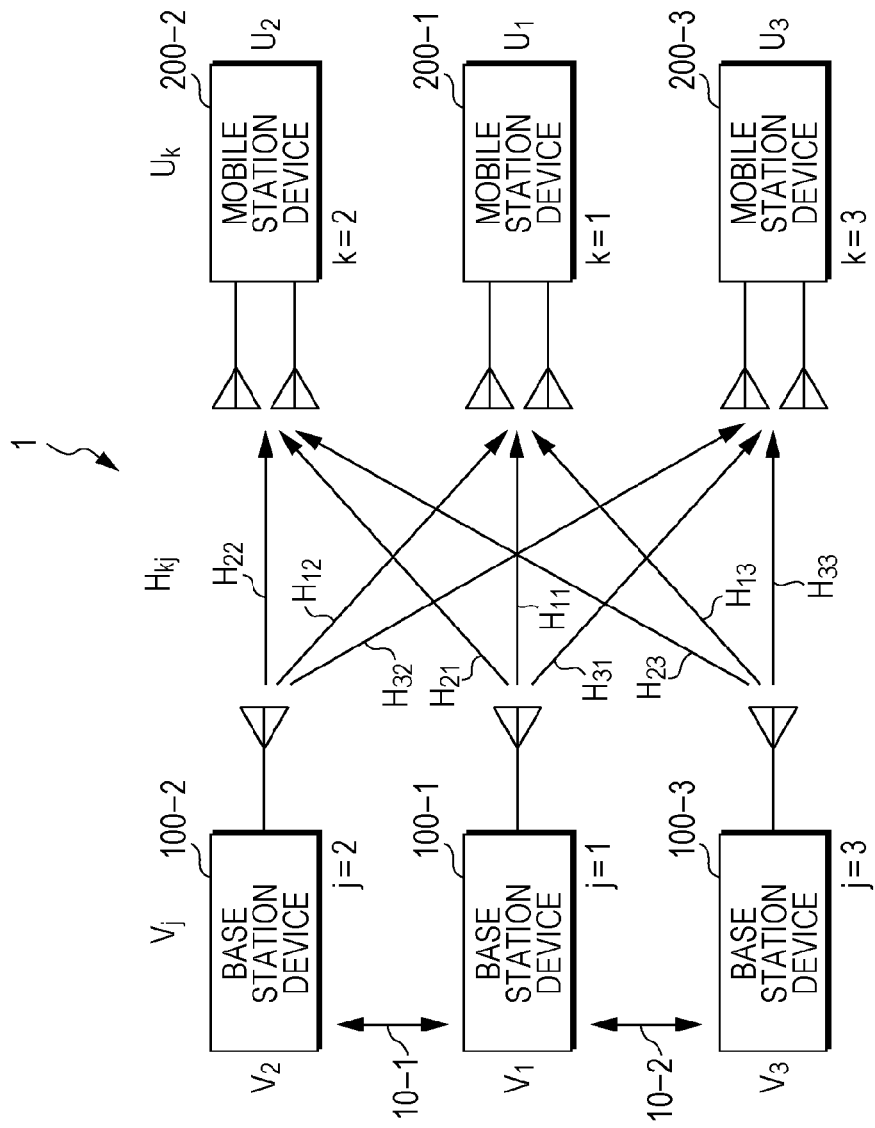
FIG. 1 is a schematic diagram illustrating the configuration of a communication system according to a first embodiment.

FIG. 1 is a schematic diagram illustrating the configuration of the transmission system 1 according to the first embodiment of the present invention. The communication system 1 according to the first embodiment includes a plurality of base station apparatuses 100-j (j is an arbitrary positive integer and j=1 to 3 in FIG. 1) and a plurality of mobile station apparatuses 200-k (k is an arbitrary positive integer and k=1 to 3 in FIG. 1).

The plurality of base station apparatuses 100-j in the communication system 1 are configured in such a way as to suppress inter-cell interference in a coordinated manner. In addition, the mobile station apparatuses 200-k in the transmission system 1 include mobile station apparatuses connected to the base station apparatuses operating in a coordinated manner and mobile station apparatuses subjected to the coordinated control.

Each of the base station apparatuses 100-j is arranged such that the entirety or part of a cell thereof overlaps a cell of another base station apparatus. The base station apparatuses 100-j are connected to each other by backhaul lines 10-1 and 10-2 (for example, X2 interfaces) realized by optical fibers, Internet lines, wireless lines, or the like. In addition, the communication system 1 uses so-called one-cell frequency reuse, in which all cells use the same frequency.

Channels between the base station apparatuses 100-j and the mobile station apparatuses 200-k are represented by channels $H_{kj}$ (transmission functions) (k and j are arbitrary positive integers; k=1 to 3 and j=1 to 3 in FIG. 1). Here, the channels $H_{kj}$ between base station apparatuses and mobile station apparatuses subjected to the coordinated control will be referred to as channels of the entirety of the system. In the communication system 1, the mobile station apparatuses 200-k are wirelessly connected to the base station apparatuses 100-j that satisfy k=j. That is, for the mobile station apparatuses 200-k, signals transmitted by base station apparatuses 100-j with which k≠j cause inter-cell interference.

For example, for the mobile station apparatus 200-1, signals from the base station apparatus 100-1 received through the channel $H_{11}$ are desired signals, and signals from the base station apparatus 100-2 and the base station apparatus 100-3 received through the channel $H_{12}$ and the channel $H_{13}$, respectively, cause inter-cell interference (undesired signals).

Each of the base station apparatuses 100-j multiplies transmission signals thereof by a transmission weighting coefficient $V_j$ with which the base station apparatuses 100-j and the mobile station apparatuses 200-k can suppress possible inter-cell interference in a coordinated manner, details of which will be described later. In addition, each of the mobile station apparatuses 200-k multiplies its reception signals by a reception weighting coefficient $U_k$ with which the base station apparatuses 100-j and the mobile station apparatuses 200-k can suppress possible inter-cell interference in a coordinated manner.

In the following description, it is assumed that, in the communication system 1 illustrated in FIG. 1, the base station apparatus 100-1 is a main base station apparatus (master base station apparatus) that calculates the transmission weighting coefficients and the reception weighting coefficients and the base station apparatus 100-2 and the base station apparatus 100-3 are subsidiary base station apparatuses (slave base station apparatuses) that operate in a coordinated manner in accordance with instructions from the master base station apparatus.

Next, the master base station apparatus (base station apparatus 100-1) according to the first embodiment will be described.

Figure 2:
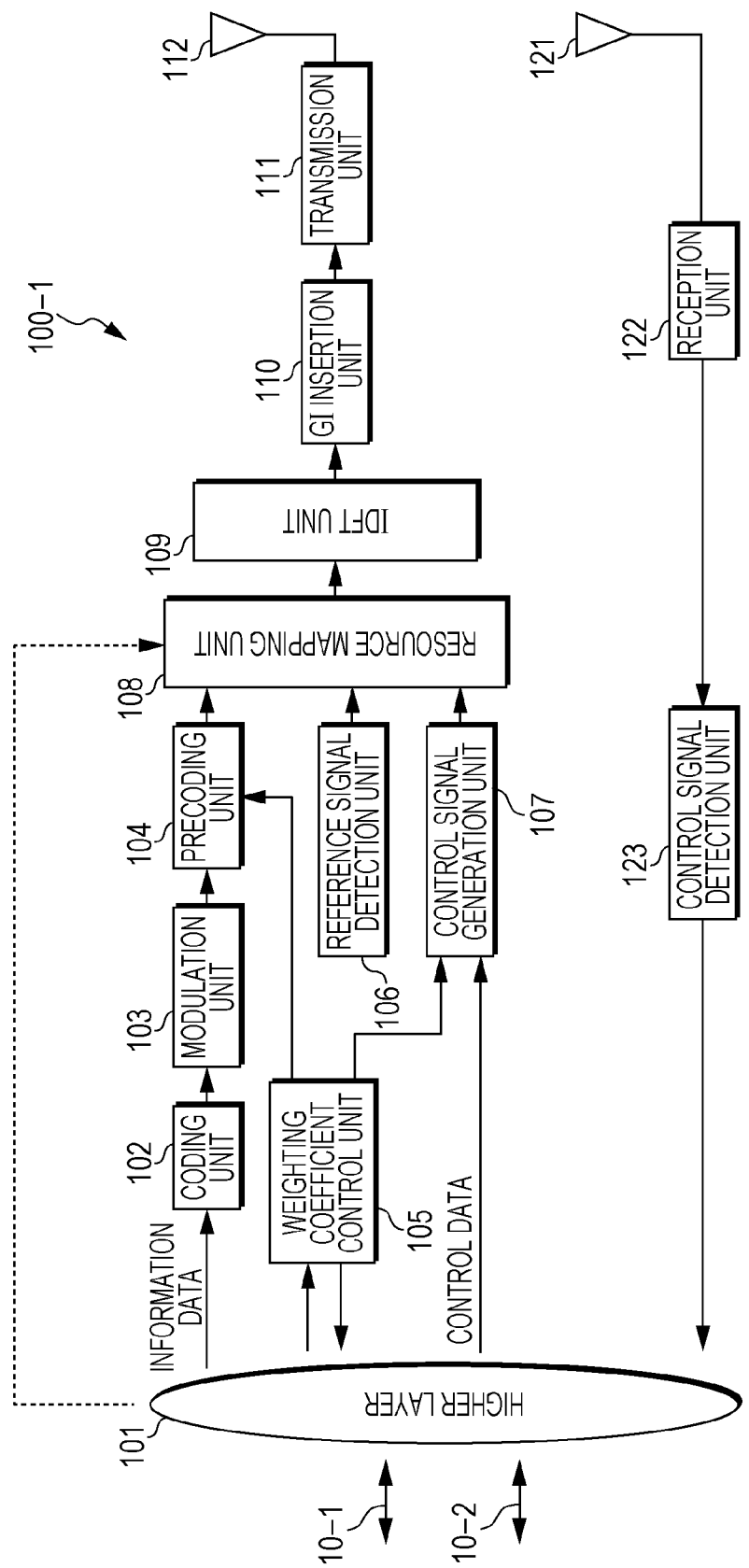
FIG. 2 is a schematic diagram illustrating the configuration of a main base station apparatus in the communication system according to the first embodiment.

As illustrated in FIG. 2, the master base station apparatus (base station apparatus 100-1) is configured by including a higher layer 101, a coding unit 102, a modulation unit 103, a precoding unit 104, a weighting coefficient control unit 105, a reference signal generation unit 106, a control signal generation unit 107, a resource mapping unit 108, an IDFT unit 109, a GI insertion unit 110, a transmission unit 111, a transmission antenna unit 112, a reception antenna unit 121, a reception unit 122, and a control signal detection unit 123. It is to be noted that if part or the entirety of the base station apparatus 100-1 is realized as a chip, namely an integrated circuit, a chip control circuit (not illustrated) that controls each function block is included.

The base station apparatus 100-1 receives signals including control signals such as channel state information transmitted by the mobile station apparatus 200-1 through the reception antenna unit 121 using an uplink. The reception unit 122 down-converts (wireless frequency conversion) the control signals and the like such that the control signals and the like fall into a frequency band in which digital signal processing such as a process for detecting signals is possible. The reception unit 122 then performs a filtering process for removing spurious and converts (analog-to-digital conversion) the signals subjected to the filtering process from analog signals into digital signals.

The control signal detection unit 123 performs a demodulation process, a decoding process, and the like on the control signals output from the reception unit 122. The control signals are detected from physical uplink control channels (PUUCHs) and physical uplink shared channels (PUSCHs).

The higher layer 101 obtains the channel state information (channel state information $H_{11}$ regarding the channel between the base station apparatus 100-1 and the mobile station apparatus 200-1, channel state information $H_{12}$ regarding the channel between the base station apparatus 100-2 and the mobile station apparatus 200-1, and channel state information $H_{13}$ regarding the channel between the base station apparatus 100-3 and the mobile station apparatus 200-1). Here, the higher layer refers to, among layers of communication functions defined by an OSI reference model, a layer having higher functions than a physical layer, that is, for example, a data link layer, a network layer, or the like.

In addition, the higher layer 101 obtains channel state information from the slave base station apparatuses (base station apparatus 100-2 and base station apparatus 100-3) through the backhaul lines 10-1 and 10-2, respectively. More specifically, the higher layer 101 obtains channel state information (information regarding the channel $H_{21}$) regarding the channel between the base station apparatus 100-1 and the mobile station apparatus 200-2, channel state information (information regarding the channel $H_{22}$) regarding the channel between the base station apparatus 100-2 and the mobile station apparatus 200-2, and channel state information (information regarding the channel $H_{23}$) regarding the channel between the base station apparatus 100-3 and the mobile station apparatus 200-2 through the backhaul line 10-1, and channel state information (information regarding the channel $H_{31}$) regarding the channel between the base station apparatus 100-1 and the mobile station apparatus 200-3, channel state information (information regarding the channel $H_{32}$) regarding the channel between the base station apparatus 100-2 and the mobile station apparatus 200-3, and channel state information (information regarding the channel $H_{33}$) regarding the channel between the base station apparatus 100-3 and the mobile station apparatus 200-3 through the backhaul line 10-2.

That is, the master base station apparatus obtains channel state information, which is results of estimation of channel state variations performed by each mobile station apparatus 200-$k$ with respect to all the base station apparatuses (master base station apparatus and slave base station apparatuses) that perform coordinated control.

In addition, the higher layer 101 inputs the channel state information to the weighting coefficient control unit 105. Here, the higher layer 101 may be configured in such a way as to input the number of base station apparatuses and the number of mobile station apparatuses operating in a coordinated manner to the weighting coefficient control unit 105.

In addition, the higher layer 101 transmits transmission weighting coefficients and reception weighting coefficients calculated by the weighting coefficient control unit 105, which will be described later, to the slave base station apparatuses through the backhaul lines 10-1 and 10-2, respectively. The higher layer 101 of the base station apparatus 100-1 transmits a transmission weighting coefficient $V_2$ by which the base station apparatus 100-2 multiplies its transmission signals and a reception weighting coefficient $U_2$ by which the mobile station apparatus 200-2 multiplies its reception signals to the base station apparatus 100-2 through the backhaul line 10-1. The higher layer 101 of the base station apparatus 100-1 transmits a transmission weighting coefficient $V_3$ by which the base station apparatus 100-3 multiplies its transmission signals and a reception weighting coefficient $U_3$ by which the mobile station apparatus 200-3 multiplies its reception signals to the base station apparatus 100-3 through the backhaul line 10-2.

In addition, the higher layer 101 also obtains feedback information included in the control signals, such as MCS information and a spatial multiplexing number. The higher layer 101 outputs information data to the coding unit 102 and control data to the control signal generation unit 107 on the basis of the feedback information. It is to be noted that the higher layer 101 transmits other parameters necessary for the components of the base station apparatus 100-1 to realize their respective functions.

The coding unit 102 performs error correction coding on the information data input from the higher layer 101. The information data is, for example, audio signals obtained from speech, still image or moving image signals representing a captured image, a character message, or the like. A coding scheme used by the coding unit 102 for the error correction coding is, for example, turbo coding, convolutional coding, low-density parity-check coding (LDPC), or the like.

It is to be noted that the coding unit 102 may perform a rate matching process on a coded bit sequence in order to match a coding rate of a data sequence subjected to the error correction coding with a coding rate corresponding to a data transmission rate. In addition, the coding unit 102 may have a function of rearranging and interleaving the data sequence subjected to the error correction coding.

The modulation unit 103 modulates the signals input from the coding unit 102 and generates modulation symbols. A modulation process performed by the modulation unit 103 is, for example, BPSK (binary phase-shift keying), QPSK (quadrature phase-shift keying), M-QAM (M-quadrature amplitude modulation; for example, M=16, 64, 256, 1,024, or 4,096), or the like. It is to be noted that the modulation unit 103 may have a function of rearranging and interleaving the generated modulation symbols.

The weighting coefficient control unit 105 calculates transmission weighting coefficients $V_j$ by which the master base station apparatus and the slave base station apparatuses multiply their respective transmission signals and reception weighting coefficients $U_k$ by which the mobile station apparatuses connected to the base station apparatuses multiply their respective reception signals using the channel state information (channel estimation values) obtained from the higher layer 101. That is, the weighting coefficient control unit 105 calculates the transmission weighting coefficients and the reception weighting coefficients using the channel state information regarding the entirety of the system.

In an example, the weighting coefficient control unit 105 calculates the transmission weighting coefficients such that the directions (vectors) of equivalent channels of interference signals transmitted from a plurality of base station apparatuses that are interference sources become orthogonal to the reception weighting coefficients by which the mobile station apparatuses multiply their respective reception signals (Math. 1).

$$U_k^H H_{kj} V_j = 0, \forall j \neq k$$

$$\text{rank}(U_k^H H_{kk} V_k) = d_k \qquad [\text{Math. 1}]$$

Here, $H_{kj}$ denotes a channel matrix between the base station apparatus 100-$j$ and the mobile station apparatus 200-$k$ subjected to coordinated control, and $V_j$ denotes the vector of the transmission weighting coefficient of the base station apparatus 100-$j$. $U_k$ denotes the vector of the reception weighting coefficient of the mobile station apparatus 200-$k$, and $d_k$ denotes the number of streams. $_H$ denotes a complex conjugate transpose.

In addition, the weighting coefficient control unit 105 transmits the transmission weighting coefficients $V_j$ of the slave base station apparatuses and the reception weighting coefficients $U_k$ of the mobile station apparatuses connected to the slave base station apparatuses to the higher layer 101.

In addition, the weighting coefficient control unit 105 outputs the transmission weighting coefficient $V_1$ by which the master base station apparatus (host apparatus) multiplies its transmission signals to the precoding unit 104. In addition, the weighting coefficient control unit 105 outputs the reception weighting coefficient $U_1$ of the mobile station apparatus connected to the master base station apparatus (host apparatus) to the control signal generation unit 107.

The precoding unit 104 multiplies the modulation symbols output from the modulation unit 103 by the transmission weighting coefficient $V_1$.

The reference signal generation unit 106 generates reference signals (pilot signals) and outputs the generated reference signals to the resource mapping unit 108. For example, the reference signals are signals used for estimating transmission characteristics between the transmission antenna units 112 of the base station apparatuses and reception antenna units 201-1 and 201-2 of the mobile station apparatuses. The estimated transmission characteristics are used for the channel state information for calculating the transmission weighting coefficients and the reception weighting coefficients or channel compensation in the mobile station apparatuses. It is to be noted that a code sequence configuring each reference signal is preferably an orthogonal sequence, that is, for example, a Hadamard code or a CAZAC (constant amplitude zero autocorrelation) sequence.

The control signal generation unit 107 generates control signals including the control data output from the higher layer 101 and the reception weighting coefficient $U_1$ (the reception weighting coefficient of the mobile station apparatus connected to the host apparatus) output from the weighting coefficient control unit 105. Here, the control signal generation unit that generates control signals including a weighting coefficient may be referred to as a weighting coefficient information generation unit, and the control signals including the weighting coefficient generated by the control signal generation unit may be referred to as weighting coefficient information. It is to be noted that the control signal may be subjected to error correction coding and a modulation process.

FIG. 3 is a conceptual diagram illustrating an example of the format of the control signals output from the control signal generation unit 107. Each control signal includes a region (cell information region) storing reception weighting coefficient information regarding the mobile station apparatus connected to the host apparatus. As illustrated in FIG. 3, the reception weighting coefficient $U_1$ by which the mobile station apparatus 200-1 multiplies its reception signals is determined as the reception weighting coefficient information, and the region storing the information is provided.

The resource mapping unit 108 maps the modulation symbols, the reference signals, and the control signals in resource elements on the basis of scheduling information transmitted from the higher layer 101 (hereinafter referred to as resource mapping). A resource element is a minimum unit that is configured by one subcarrier and one OFDM symbol and in which a signal is arranged.

The IDFT unit 109 performs an inverse discrete Fourier transform (IDFT) on frequency domain signals input from the resource mapping unit 108 to transform the frequency domain signals into time domain signals. The IDFT unit 109 may use another processing method (for example, an inverse fast Fourier transform (IFFT)) instead of the IDFT insofar as the frequency domain signals can be transformed into the time domain signals.

The GI insertion unit 110 adds GIs (guard intervals) to the time domain signals (referred to as valid symbols) input from the IDFT unit 109 to generate OFDM symbols. The GIs are sections that are added in order to prevent continuous OFDM symbols from interfering with each other. For example, the GI insertion unit 110 disposes a copy of a portion of a latter half of a valid symbol before the valid symbol as the GI. Therefore, a valid symbol preceded by a GI is an OFDM symbol.

The transmission unit 111 performs D/A (digital-to-analog) conversion on the OFDM symbols input from the GI insertion unit 110 to generate analog signals. The transmission unit 111 performs bandlimiting on the generated analog signals by performing a filtering process in order to generate bandlimited signals. The transmission unit 111 up-converts the generated bandlimited signals such that the bandlimited signals fall into a radio frequency band, and outputs the bandlimited signals to the transmission antenna unit 112.

Figure 4:
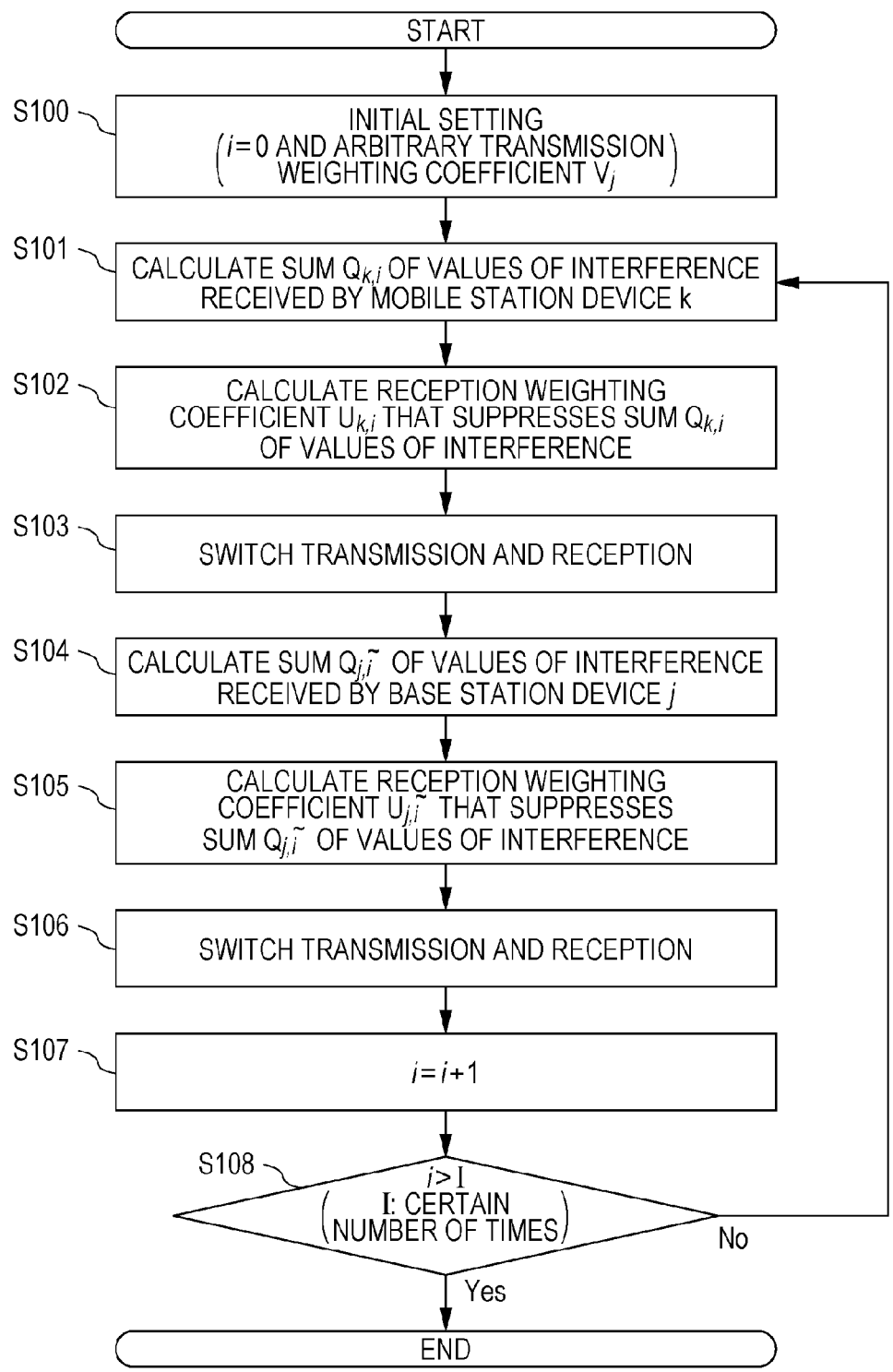
FIG. 4 is a flowchart illustrating a process for calculating transmission weighting coefficients and reception weighting coefficients performed by the main base station in the communication system according to the first embodiment.

Next, a process for calculating the transmission weighting coefficient $V_j$ and the reception weighting coefficient $U_k$ in the communication system 1 will be described. FIG. 4 is a flowchart illustrating an example of the process for calculating the transmission weighting coefficient $V_j$ and the reception weighting coefficient $U_k$ performed by the weighting coefficient control unit 105.

In the calculation method illustrated in FIG. 4, a process for calculating a weighting coefficient that reduces the effect of interference as much as possible is repeatedly performed while switching the roles of transmission and reception by utilizing a property (reciprocity of channels) that the complex conjugate transpose of a channel matrix from a base station apparatus to a mobile station apparatus equals a channel matrix from the mobile station apparatus to the base station apparatus.

First, upon receiving channel state information, the weighting coefficient control unit 105 sets an arbitrary transmission weighting coefficient $V_j$ (S100).

Next, the weighting coefficient control unit 105 calculates the sum $Q_{k,i}$ of values of interference received by the mobile station apparatus 200-$k$ on the basis of Math. 2 (S101). Here, Q denotes a covariance matrix of received interference signals. In addition, P denotes transmission power and K denotes the number of mobile station apparatuses subjected to coordinated control. In addition, H denotes a complex conjugate transpose.

$$Q_{k,i} = \sum_{j=1, j \neq k}^{K} \frac{P_j}{d_j} H_{kj} V_{j,i} V_{j,i}^H H_{kj}^H \qquad \text{[Math. 2]}$$

Next, the weighting coefficient control unit 105 performs singular value decomposition on the calculated sum $Q_{k,i}$ of the values of interference to calculate a reception weighting coefficient $U_{k,i}$ that suppresses the sum $Q_{k,i}$ of the values of interference (S102). It is to be noted that in step S102 and step S103, the reception weighting coefficient $U_k$ when a transmission signal of the base station apparatus 100-$j$ is received by the mobile station apparatus 200-$k$ is calculated.

Next, the roles of transmission and the reception are switched between the base station apparatus 100-$j$ and the mobile station apparatus 200-$k$ (S103). That is, a reception weighting coefficient $U_{k\sim}$ of the base station apparatus 100-$j$ when the base station apparatus 100-$j$ receives a transmission signal multiplied by the mobile station apparatus 200-$k$ by the coefficient $U_{k,i}$ is calculated. The reception weighting coefficient $U_{k\sim}$ corresponds to a transmission weighting coefficient $V_k$ of the base station apparatus 100-$j$.

In the calculation of the reception weighting coefficient $U_{k\sim}$, first, the sum $Q_{j,i\sim}$ of values of interference received by the base station apparatus 100-$j$ is calculated on the basis of Math. 3 (S104). Here, $H_{jk\sim} = H_{kj}^H$ and $V_{k\sim} = U_k$. $P\sim$ denotes transmission power.

$$\tilde{Q}_j = \sum_{k=1, k \neq j}^{K} \frac{\tilde{p}_k}{d_k} \tilde{H}_{jk} \tilde{V}_k \tilde{V}_k^H \tilde{H}_{jk}^H \quad \text{[Math. 3]}$$

Next, the sum $Q_{j,i}$~ of the values of interference is subjected to singular value decomposition to calculate a reception weighting coefficient $U_{k,i}$~ that suppresses the sum $Q_{j,i}$~ of the values of interference (S105). Again, the roles of transmission and reception are switched between the base station apparatus 100-$j$ and the mobile station apparatus 200-$k$ (S106). That is, $V_{k,i} = U_{k,i}$~ is substituted.

A counter that counts the number of times of processing is incremented by 1 (S107), and the processing in step S101 to step S106 is repeated until a certain number of times I has been reached (N in S108). If the certain number of times I has been reached (Y in S108), the processing ends.

Thus, a reception weighting coefficient with which the base station apparatus 100-$j$ and the mobile station apparatus 200-$k$ can suppress the effect of interference can be obtained by repeatedly updating the reception weighting coefficients ($U_k$ and $U_k$~) that reduce interference power while switching the roles of transmission and reception between the base station apparatus 100-$j$ and the mobile station apparatus 200-$k$.

By determining the reception weighting coefficient $U_k$~ with which k=j as the transmission weighting coefficient $V_j$ of the base station apparatus 100-$j$ and the reception weighting coefficient $U_k$ as the reception weighting coefficient $U_k$ of the mobile station apparatus 200-$k$, the plurality of base station apparatuses 100-$j$ can suppress the effect of interference in a coordinated manner. It is to be noted that this calculation method is an example, and the calculation method is not limited to this. Another calculation method may be used, instead.

Figure 5:
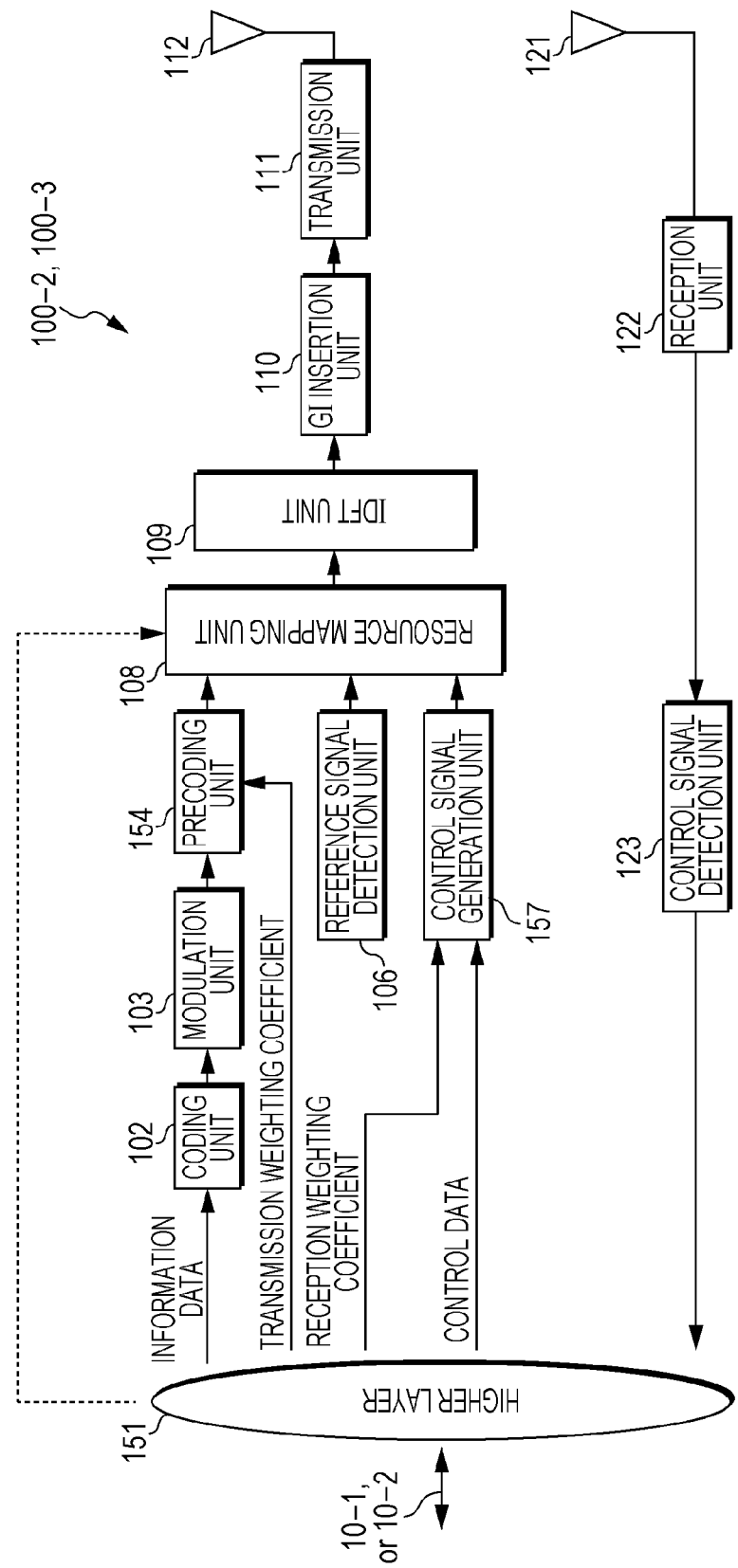
FIG. 5 is a schematic diagram illustrating the configurations of subsidiary base station apparatuses in the communication system according to the first embodiment.

Next, the slave base station apparatuses (the base station apparatus 100-2 and the base station apparatus 100-3) in the first embodiment will be described. FIG. 5 is a schematic diagram illustrating the configurations of the slave base station apparatuses (the base station apparatus 100-2 and the base station apparatus 100-3) according to the first embodiment. Although the configuration of the base station apparatus 100-2 will be described hereinafter, the base station apparatus 100-3 has the same configuration.

The base station apparatus 100-2 includes a higher layer 151, a coding unit 102, a modulation unit 103, a precoding unit 154, a reference signal generation unit 106, a control signal generation unit 157, a resource mapping unit 108, an IDFT unit 109, a GI insertion unit 110, a transmission unit 111, a transmission antenna unit 112, a reception antenna unit 121, a reception unit 122, and a control signal detection unit 123. It is to be noted that if part or the entirety of the base station apparatus 100-2 is realized as a chip, namely an integrated circuit, a chip control circuit (not illustrated) that controls each function block is included.

Compared to the base station apparatus 100-1, the operations of the higher layer 151, the precoding unit 154, and the control signal generation unit 157 of the base station apparatus 100-2 are different. The differences will be mainly described hereinafter.

The higher layer 151 obtains channel state information (the channel state information $H_{21}$ regarding the channel between the base station apparatus 100-1 and the mobile station apparatus 200-2, the channel state information $H_{22}$ regarding the channel between the base station apparatus 100-2 and the mobile station apparatus 200-2, and the channel state information $H_{23}$ regarding the channel between the base station apparatus 100-3 and the mobile station apparatus 200-2) included in control signals input from the control signal detection unit 123.

In addition, the higher layer 151 transmits the channel state information to the master base station apparatus, which calculates the reception weighting coefficients, through the backhaul line 10-1. In addition, the higher layer 151 obtains the transmission weighting coefficient $V_2$ by which transmission signals of the host apparatus are multiplied and the reception weighting coefficient $U_2$ of the mobile station apparatus 200-2 connected to the host apparatus from the master base station apparatus through the backhaul line 10-1.

In addition, the higher layer 151 inputs the transmission weighting coefficient $V_2$ to the precoding unit 154. Furthermore, the higher layer 151 inputs the reception weighting coefficient $U_{22}$ to the control signal generation unit 157.

The precoding unit 154 multiplies modulation symbols output from the modulation unit 103 by the transmission weighting coefficient $V_2$.

The control signal generation unit 157 generates control signals including control data output from the higher layer 151 and the reception weighting coefficient $U_2$ (the reception weighting coefficient of the mobile station apparatus 200-2 connected to the host apparatus). Similarly, the format illustrated in FIG. 3 is adopted as the format of the control signals. That is, each control signal includes a region storing reception weighting coefficient information $U_2$ regarding the mobile station apparatus 200-2 connected to the host apparatus.

Figure 6:
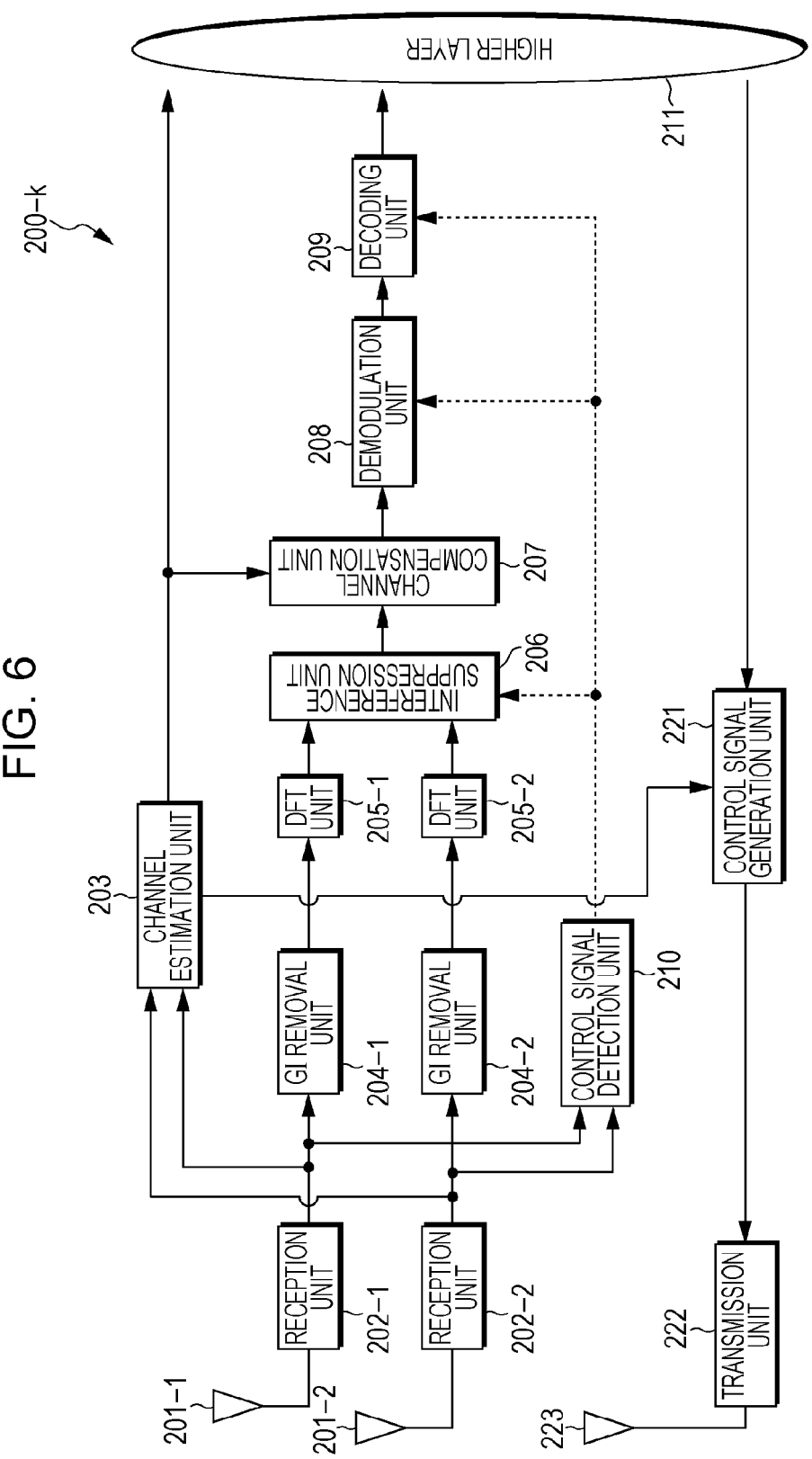
FIG. 6 is a schematic diagram illustrating the configurations of mobile station apparatuses in the communication system according to the first embodiment.

Next, the mobile station apparatuses 200-$k$ in the first embodiment will be described. FIG. 6 is a schematic diagram illustrating the configurations of the mobile station apparatuses 200-$k$ according to the first embodiment.

Each mobile station apparatus 200-$k$ includes a plurality of reception antenna units 201-$e$, a plurality of reception units 202-$e$, a channel estimation unit 203, a plurality of GI removal units 204-$e$, a plurality of DFT units 205-$e$, an interference suppression unit 206, a channel compensation unit 207, a demodulation unit 208, a decoding unit 209, a control signal detection unit 210, a higher layer 211, a control signal generation unit 221, a transmission unit 222, and a transmission antenna unit 223. It is to be noted that although an example of a case in which the mobile station apparatus 200-$k$ includes two (e=2) reception antennas is illustrated in FIG. 6, the number of reception antennas is not limited to this, and any number of antennas may be included. In addition, although one transmission antenna is included, the number of transmission antennas is not limited to this, and a plurality of transmission antennas may be included, or a transmission antenna and a reception antenna may be the same antenna. In addition, if part or the entirety of each mobile station apparatus 200-$k$ is realized as a chip, namely an integrated circuit, a chip control circuit (not illustrated) that controls each function block is included.

The mobile station apparatus 200-$k$ receives transmission signals of the base station apparatus 100-$j$ through the reception antenna unit 201-$e$. Here, when a mobile station apparatus 200-$m$ (m E the group of k) is connected to a base station apparatus 100-$m$, transmission signals from base station apparatuses other than the base station apparatus 100-$m$ are inter-cell interference.

The reception unit 202-$e$ down-converts radio frequency signals input from the reception antenna unit 201-$e$ such that the radio frequency signals fall into the frequency band in which digital signal processing is possible, and removes unnecessary components (spurious) by further performing a filtering process on the down-converted signals. In addition, the reception unit 202-*e* converts the signals subjected to the filtering process from analog signals into digital signals (A/D; analog-to-digital), and outputs the digital signals obtained as a result of the conversion to the channel estimation unit 203, the GI removal unit 204-*e*, and the control signal detection unit 210.

The GI removal unit 204-*e* removes the guard intervals GI from the signal output from the reception unit 202-*e* in order to avoid distortion due to delayed waves, and outputs the signals from which the guard intervals GI have been removed to the DFT unit 205-*e*.

The DFT unit 205-*e* performs a discrete Fourier transform (DFT) that transforms the signals from which the guard intervals GI have been removed, the signals being input from the GI removal unit 204-*e*, from time domain signals into frequency domain signals, and outputs the signals to the interference suppression unit 206. It is to be noted that the DFT unit 205-*e* may use another method such as, for example, a fast Fourier transform (FFT) instead of the DFT insofar as the signals can be transformed from a time domain into a frequency domain.

The channel estimation unit 203 performs channel estimation using reference signals included in the signals output from the reception unit 202-*e*. The channel estimation unit 203 then transmits a channel estimation value to the channel compensation unit 207, the control signal generation unit 221, and the higher layer 211. It is to be noted that the channel estimation value is, for example, a transmission function, an impulse response, or the like.

The control signal detection unit 210 detects control signals included in the signals output from the reception unit 202-*e*. When the control signal detection unit 210 has extracted reception weighting coefficient information (refer to FIG. 3) included in the control signals, the control signal detection unit 210 inputs the reception weighting coefficient information to the interference suppression unit 206. In addition, when the control signal detection unit 210 has extracted information regarding an MCS used for information data and the like included in the control signals, the number of layers, and the like, the control signal detection unit 210 transmits the information to the demodulation unit 208 and the decoding unit 209.

The interference suppression unit 206 multiplies the signals in the frequency domain input from the DFT unit 205-*e* by the reception weighting coefficient input from the control signal detection unit 210.

The channel compensation unit 207 calculates a weighting coefficient that corrects channel distortion due to fading using a scheme such as ZF (zero forcing) equalization or MMSE (minimum mean square error) equalization on the basis of the channel estimation value input from the channel estimation unit 203. The channel compensation unit 207 performs channel compensation by multiplying the signals input from the interference suppression unit 206 by this weighting coefficient.

The demodulation unit 208 performs a demodulation process on the signals (data modulation symbols) subjected to the channel compensation input from the channel compensation unit 207. The demodulation process may be either hard decision (calculation of a coded bit sequence) or soft decision (calculation of a coded bit LLR).

The decoding unit 209 performs an error correction decoding process on the coded bit sequence (or the coded bit LLR) subjected to the demodulation output from the demodulation unit 208, calculates information data transmitted to the host apparatus, and outputs the information data to the higher layer 211. A scheme for the error correction coding process is a scheme corresponding to the error correction coding such as turbo coding or convolutional coding performed by the connected base station apparatus 100-*m*. In the error correction coding process, either hard decision or soft decision may be applied.

It is to be noted that when the base station apparatus 100-*j* has transmitted interleaved data modulation symbols, the decoding unit 209 performs a deinterleaving process corresponding to the interleaving on the input coded bit sequence. The decoding unit 209 then performs the error correction decoding process on the signals subjected to the deinterleaving process.

The control signal generation unit 221 generates control signals including channel state information regarding the channel between the host apparatus and the base station apparatus 100-*j*. For example, in the communication system 1 illustrated in FIG. 1, the control signals of the mobile station apparatus 200-1 include channel state information regarding the channel $H_{11}$ between the mobile station apparatus 200-1 and the base station apparatus 100-1 operating in a coordinated manner, the channel $H_{12}$ between the mobile station apparatus 200-1 and the base station apparatus 100-2 operating in a coordinated manner, and the channel $H_{13}$ between the mobile station apparatus 200-1 and the base station apparatus 100-3 operating in a coordinated manner.

In addition, the control signal generation unit 221 generates control signals for transmitting feedback information (CQI, RI, and PMI) to the base station apparatus. The feedback information is determined by the higher layer 211 on the basis of the channel state estimation value calculated by the channel estimation unit 203.

In addition, the control signal generation unit 221 performs error correction coding and modulation mapping on control data indicating the feedback information and generates the control signals. Signals including the control signal output from the control signal generation unit 221 are up-converted by the transmission unit 222 such that the signals fall into a frequency band in which downlink transmission is possible, and transmitted to the connected base station apparatus 100-*j* through the transmission antenna unit 223.

Next, a process performed by the interference suppression unit 206 of the mobile station apparatus 200-*k* will be specifically described. An example of a case in which the number of antennas of the mobile station is two (e=2) will be described hereinafter.

In the mobile station apparatus 200-*k*, signals input from the DFT unit 205-1 and the DFT unit 205-2 to the interference suppression unit 206 can be expressed as vectors $R_k$ as follows using Math. 4.

$$R_k = H_k V \oplus S \qquad \text{[Math. 4]}$$

$$R_k = \begin{bmatrix} R_{k,1} \\ R_{k,2} \end{bmatrix}$$

$$H_k = \begin{bmatrix} H_{k1,1} & H_{k2,1} & H_{k3,1} \\ H_{k1,2} & H_{k2,2} & H_{k3,2} \end{bmatrix}$$

$$V = \begin{bmatrix} V_1 \\ V_2 \\ V_3 \end{bmatrix}$$

$$S = \begin{bmatrix} S_1 \\ S_2 \\ S_3 \end{bmatrix}$$

Here, $R_{k,e}$ denotes a signal input from the DFT unit 205-$e$ of a mobile station apparatus k, and $H_{kj,e}$ denotes a channel (transmission function) at a time when the mobile station apparatus 200-$k$ receives a transmission signal of the base station apparatus 100-$j$ (j=1 to 3) through the reception antenna unit 201-$e$. $V_j$ denotes a transmission weighting coefficient by which the transmission signal of the base station apparatus 100-$j$ is multiplied (multiplied by the precoding unit 104 of each base station apparatus), and S denotes a data modulation symbol of the base station apparatus 100-$j$. In addition, + (indicated as a circle plus in Math. 4 and Math. 5) denotes addition of each element.

In addition, if a signal obtained by the interference suppression unit 206 by multiplying $R_k$ by the reception weighting coefficient $U_k$ is denoted by $Y_k$, Math. 5 is obtained. Here, $U_{k,e}$ denotes a reception weighting coefficient by which the signal input from the DFT unit 205-$e$ of the mobile station apparatus 200-$k$ is multiplied.

$$Y_k = U_k R = U_k H_k V \oplus S$$

$$U_k = [U_{k,1} U_{k,2}]$$ [Math. 5]

Next, a procedure for transmitting the transmission weighting coefficients $V_j$ and the reception weighting coefficients $U_k$ in the communication system 1 will be described.

Figure 7:
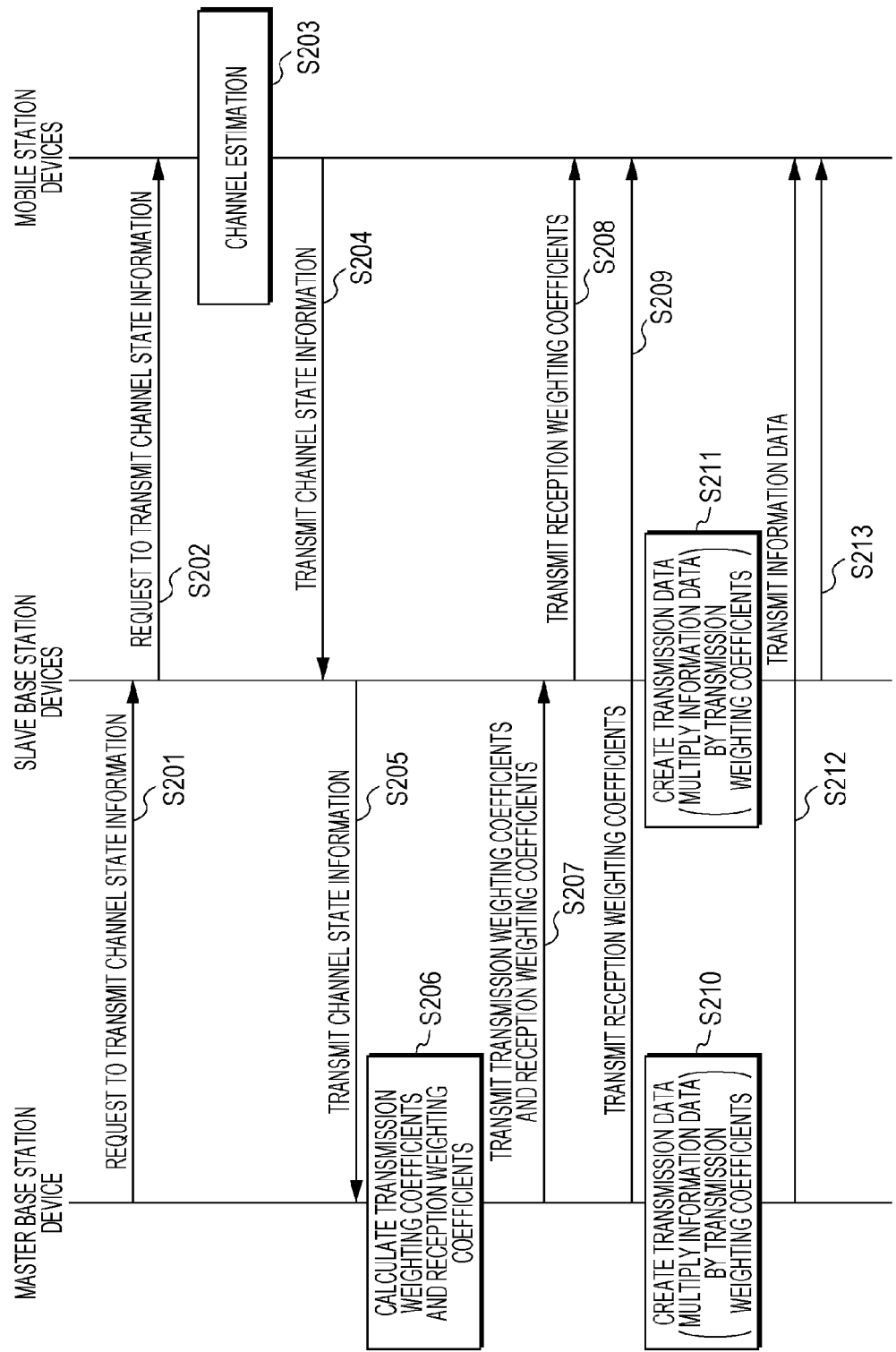
FIG. 7 is a sequence diagram illustrating a process for calculating the transmission weighting coefficients and the reception weighting coefficients and transmitting the transmission weighting coefficients and the reception weighting coefficients to the subsidiary base station apparatuses and the mobile station apparatuses performed by the main base station apparatus in the communication system according to the first embodiment.

FIG. 7 is a sequence diagram illustrating an example of an operation in which the master base station apparatus (the base station apparatus 100-1) in the communication system 1 calculates the transmission weighting coefficients $V_j$ and the reception weighting coefficients $U_k$ and transmits the transmission weighting coefficients $V_j$ and the reception weighting coefficients $U_k$ to the slave base station apparatuses (the base station apparatuses 100-2 and 100-3) and the mobile station apparatuses 200-$k$.

First, the master base station apparatus requests the slave base station apparatuses with which the master base station apparatus performs data transmission in a coordinated manner to transmit channel state information (S201).

Upon receiving the transmission requests in step S201, the slave base station apparatuses request the connected mobile station apparatuses 200-2 and 200-3, respectively, to transmit channel state information (S202).

On the other hand, the mobile station apparatus 200-1 connected to the master base station apparatus directly receives a request to transmit channel state information from the master base station apparatus.

Upon receiving the requests to transmit channel state information (S202), all the mobile station apparatuses 200-$k$ estimate channels to the base station apparatuses operating in a coordinated manner (S203).

In the communication system 1, each mobile station apparatus 200-$k$ estimates a channel $H_{k1}$, a channel $H_{k2}$, and a channel $H_{k3}$. The channel estimation is, for example, performed using reference signals transmitted by the base station apparatuses 200-$j$.

Next, each mobile station apparatus 200-$k$ transmits results (channel state information) of the channel estimation to the corresponding base station apparatus 100-$j$ that has requested transmission of channel state information (S204).

Next, upon receiving the channel state information (S204), the slave base station apparatuses (base station apparatuses 100-2 and 100-3) transmit the channel state information to the master base station apparatus (base station apparatus 100-1) (S205).

More specifically, in the communication system 1, the base station apparatus 100-1 requests the base station apparatus 100-2 to transmit the channel state information regarding the connected mobile state apparatus 200-2. The base station apparatus 100-2 then requests the mobile station apparatus 200-2 to transmit channel state information. The base station apparatus 100-3 also makes a request to transmit channel state information in the same manner as above.

On the other hand, the mobile station apparatus 200-1 connected to the master base station apparatus directly transmits the channel state information to the master base station apparatus.

As a result, the master base station apparatus obtains all the channel state information regarding the channels between all the base station apparatuses and all the mobile station apparatuses that perform data transmission in a coordinated manner.

Next, the master base station apparatus calculates the transmission weighting coefficients $V_j$ and the reception weighting coefficients $U_k$ using the channel state information obtained in step S205 (S206).

The master base station apparatus then transmits the calculated transmission weighting coefficients $V_j$ to the slave base station apparatuses 100-$j$ using the backhaul lines (S207).

In addition, the master base station apparatus transmits the reception weighting coefficients $U_k$ of the mobile station apparatuses through the base station apparatuses to which the mobile station apparatuses are connected (S207 and S208). For example, the mobile station apparatus 200-2 connected to the slave base station apparatus 100-2 obtains the reception weighting coefficient $U_2$ from the master base station apparatus 100-1 through the slave base station apparatus 100-2.

In addition, the master base station apparatus directly transmits the reception weighting coefficient $U_1$ of the mobile station apparatus 200-1 connected thereto to the mobile station apparatus 200-1 (S209).

The master base station apparatus and the slave base station apparatuses multiply information data to be transmitted to the mobile station apparatuses connected thereto by the transmission weighting coefficients $V_j$ (S210 and S211), and transmit results to the mobile station apparatuses (S212 and S213).

As described above, in the first embodiment, in the communication system 1 in which the entirety or part of the cells of the plurality of base station apparatuses 100-$j$ is arranged in such a way as to overlap with one another, the master base station apparatus calculates the transmission weighting coefficients $V_j$ of the base station apparatuses 100-$j$ and the reception weighting coefficients $U_k$ of the mobile station apparatuses 200-$k$ such that the directions of the equivalent channels of interference signals received by the mobile station apparatuses 200-$k$ connected to the base station apparatuses 100-$j$ become orthogonal to the reception weighting coefficients by which the mobile station apparatuses 200-$k$ multiply their respective reception signals.

The base station apparatuses 100-$j$ then transmit the reception weighting coefficients $U_k$ to the mobile station apparatuses 200-$k$ connected thereto, and the mobile station apparatuses 200-$k$ perform a reception process by multiplying the reception signals (including the interference signals) by the reception weighting coefficients $U_k$.

As a result, in the communication system in which the entirety or part of the cells of the plurality of base station apparatuses having different cell ranges is arranged in such a way as to overlap with one another, inter-cell interference caused when the plurality of base station apparatuses perform communication using the same frequency is effectively suppressed, thereby achieving desirable reception characteristics.

It is to be noted that the weighting coefficient control unit 105 of the base station apparatus 100-1 may be included in the higher layer 101. Alternatively, the weighting coefficient control unit 105 may be located outside the plurality of base station apparatuses 100-j operating in a coordinated manner and included in a base station management unit that manages these base station apparatuses 100-j.

Second Embodiment

In a second embodiment, a method used by the base station apparatuses 100-j for transmitting the reception weighting coefficients $U_k$ to the mobile station apparatuses 200-k using codebooks in the communication system 1 described in the first embodiment in which the plurality of base station apparatuses 100-j suppress inter-cell interference in a coordinated manner will be described. The codebooks refer to a list of predetermined transmission weighting coefficients $V_j$ and a list of reception weighting coefficients $U_k$ in the communication system 1.

The base station apparatuses 100-j in the communication system 1 according to the second embodiment are configured in such a way as to share the codebook of the transmission weighting coefficients $V_j$ thereof and the codebook of the reception weighting coefficients $U_k$ of the mobile station apparatuses, and the mobile station apparatuses 200-k are configured in such a way as to share at least the codebook of the reception weighting coefficients $U_k$ thereof.

An example of the codebooks is illustrated in FIG. 8. In FIG. 8, a transmission weighting coefficient $V_{j,n}$ is an n-th candidate for the transmission weighting coefficient of a j-th base station apparatus (j and n are arbitrary positive integers). In addition, a reception weighting coefficient $U_{k,n}$ is an n-th candidate for the reception weighting coefficient of a k-th mobile station apparatus (k and n are arbitrary positive integers).

In the codebooks illustrated in FIG. 8, codebook indices #0 to #3 indicate candidates for the transmission weighting coefficients $V_j$ and the reception weighting coefficients $U_k$ with which two base station apparatuses and two mobile station apparatuses suppress inter-cell interference in a coordinated manner. Codebook indices #4 to #7 indicate candidates for the transmission weighting coefficients $V_j$ and the reception weighting coefficients $U_k$ with which three base station apparatuses and three mobile station apparatuses suppress inter-cell interference in a coordinated manner. Codebook indices #8 to #11 indicate candidates for the transmission weighting coefficients $V_j$ and the reception weighting coefficients $U_k$ with which four base station apparatuses and four mobile station apparatuses suppress inter-cell interference in a coordinated manner.

Next, selection of the transmission weighting coefficients $V_j$ and the reception weighting coefficients $U_k$ using the codebooks will be described.

For example, the master base station apparatus 100-1 holds the codebooks in the weighting coefficient control unit 105. First, the weighting coefficient control unit 105 selects candidates in the codebooks on the basis of the number of base station apparatuses and the number of mobile station apparatuses operating in a coordinated manner input from the higher layer 101.

Since the three base station apparatuses 100-j and the three mobile station apparatuses 200-k operate in a coordinated manner in the communication system 1 illustrated in FIG. 1, the codebook indices #4 to #7 are selected as the candidates.

Next, the weighting coefficient control unit 105 performs a process for obtaining reception weighting coefficients $U_k$ that reduce the effect of interference as much as possible using channel state information $H_{kj}$ input from the higher layer 101 and the selected candidate codebook indices.

For example, the channel state information $H_{kj}$ and the transmission weighting coefficients $V_j$ and the reception weighting coefficients $U_k$ of the candidate codebook indec are substituted for Math. 2 and Math. 3, and a codebook with which the sum $Q_{k,i}$ of the values of interference and the sum $Q_{j,i}$ of the values of interference become smallest is selected.

Next, a method for transmitting the transmission weighting coefficients $V_j$ and the reception weighting coefficients $U_K$ using the codebooks will be described.

As the sequence of an operation for transmitting the codebook index selected by the master base station apparatus to the slave base station apparatuses and the mobile station apparatuses, the sequence illustrated in FIG. 7 is applied.

In this case, the operation is realized by replacing "transmit transmission weighting coefficients and reception weighting coefficients" (S207) and "transmit reception weighting coefficients" (S208 and S209) illustrated in FIG. 7 by "transmit codebook index".

The master base station apparatus then transmits the selected codebook indec to the slave base station apparatuses using the backhaul lines 10-1 and 10-2, respectively.

Next, the format of the control signals output from the control signal generation unit 107 will be described. FIG. 9 is a conceptual diagram illustrating an example of the format of the control signals output from the control signal generation unit 107.

Each control signal includes a region of codebook indices for transmitting information regarding the reception weighting coefficient $U_k$ of the mobile station apparatus connected to the host apparatus. As an example, FIG. 9 illustrates a case in which the reception weighting coefficient $U_1$ by which the mobile station apparatus 200-1 multiplies its reception signals is determined as reception weighting coefficient information, and a 4-bit region for storing the information is provided.

In addition, the control signal generation unit 157 of each slave base station apparatus transmits the reception weighting coefficient $U_k$ to the corresponding mobile station apparatus 200-k using the format of the control signals illustrated in FIG. 9.

As described above, by sharing the codebooks between the base station apparatuses 100-j and the mobile station apparatuses 200-k, the number of repetitions for calculating the transmission weighting coefficients $V_j$ and the reception weighting coefficients $U_k$ can be reduced, thereby reducing the amount of arithmetic processing in the base station apparatuses 100-j and the mobile station apparatuses 200-k. In addition, since the reception weighting coefficients $U_k$ can be transmitted to the mobile station apparatuses 200-k by transmitting a codebook indec, overhead (a storage region of a control signal for transmitting weighting coefficients) can be reduced.

Third Embodiment

In a third embodiment, an embodiment will be described in which a method for transmitting the reception weighting coefficients $U_k$ to the mobile station apparatuses 200-k using a plurality of reference signals is used by the plurality of base station apparatuses 100-j described in the first embodiment in the communication system 1 in which the base station apparatuses 100-j suppress inter-cell interference in a coordinated manner.

Figure 10:
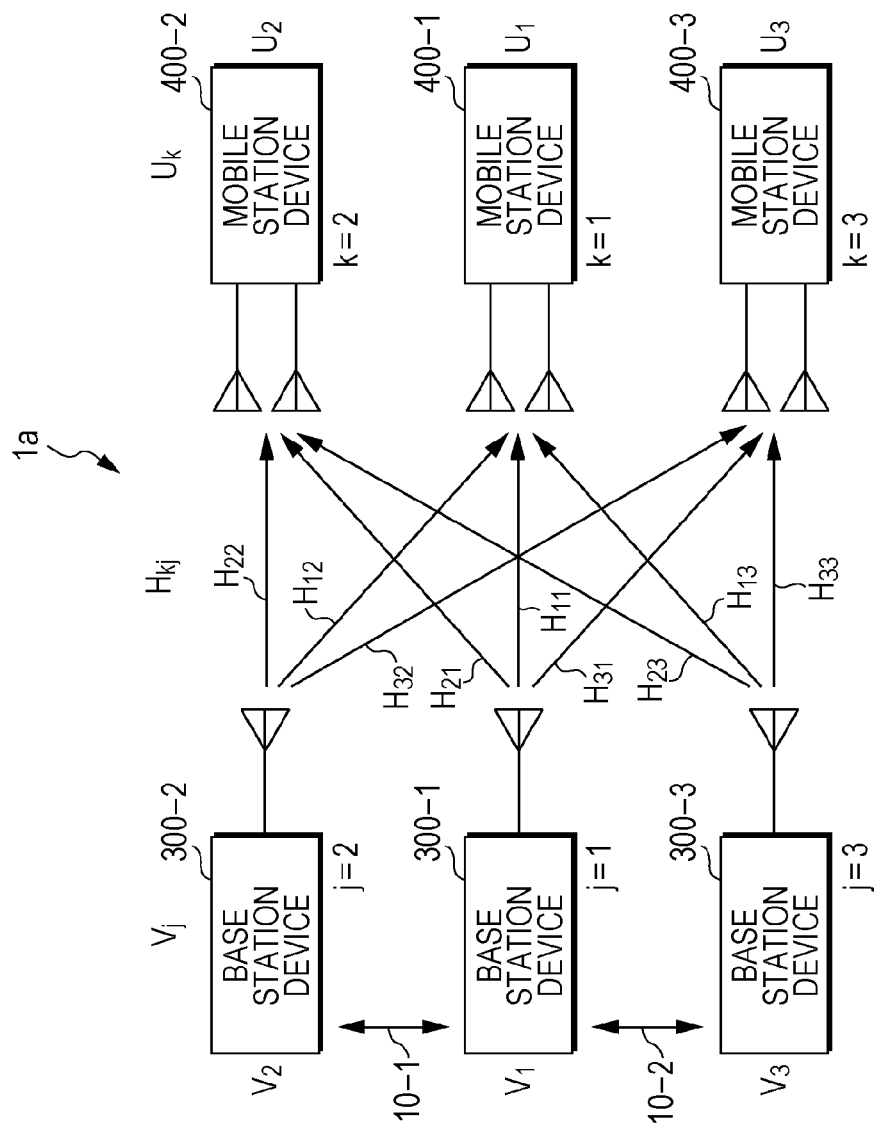
FIG. 10 is a schematic diagram illustrating the configuration of a communication system according to a third embodiment.

As illustrated in FIG. 10, a communication system 1*a* in the third embodiment includes a base station apparatus 300-1, which is a master base station apparatus, base station apparatuses 300-2 and 300-3, which are slave base station apparatuses, and a plurality of mobile station apparatuses 400-1 to 400-3. It is to be noted that the communication system 1*a* in the third embodiment can be realized by replacing the base station apparatus 100-1 illustrated in FIG. 1 by the base station apparatus 300-1, the base station apparatuses 100-2 and 100-3 illustrated in FIG. 1 by the base station apparatuses 300-2 and 300-3, respectively, and the mobile station apparatuses 200-1 to 200-3 by the mobile station apparatuses 400-1 to 400-3, respectively.

Figure 11:
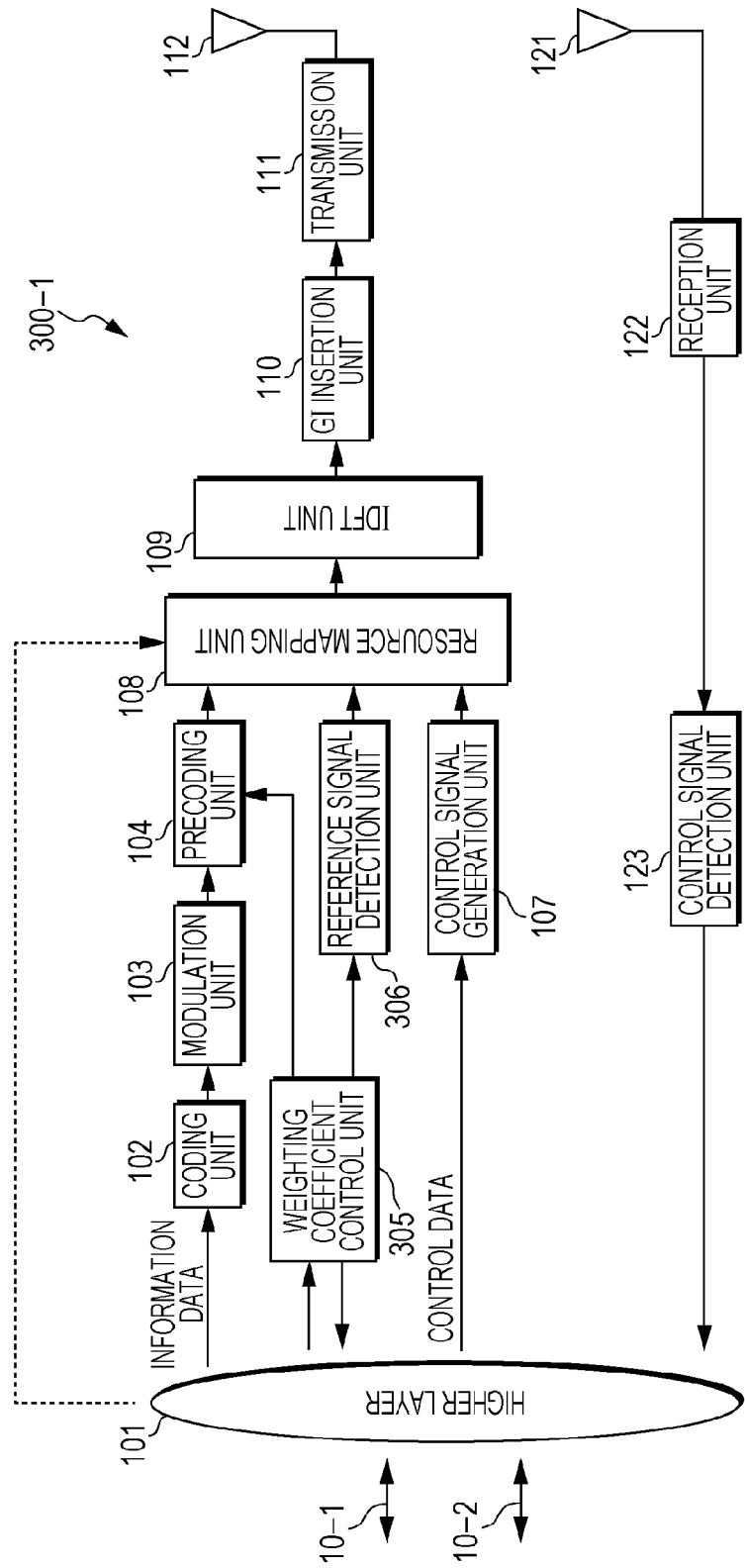
FIG. 11 is a schematic diagram illustrating the configuration of a main base station apparatus in the communication system according to the third embodiment.

FIG. 11 is a schematic diagram illustrating the configuration of the base station apparatus 300-1 according to the third embodiment. The base station apparatus 300-1 is configured by including a higher layer 101, a coding unit 102, a modulation unit 103, a precoding unit 104, a weighting coefficient control unit 305, a reference signal generation unit 306, a control signal generation unit 107, a resource mapping unit 108, an IDFT unit 109, a GI insertion unit 110, a transmission unit 111, a transmission antenna unit 112, a reception antenna unit 121, a reception unit 122, and a control signal detection unit 123. It is to be noted that if part or the entirety of the base station apparatus 300-1 is realized as a chip, namely an integrated circuit, a chip control circuit (not illustrated) that controls each function block is included.

In the base station apparatus 300-1, components having the same reference numerals as those illustrated in FIG. 2 have the same functions and operations, and accordingly description thereof is omitted. Between the base station apparatus 300-1 according to the third embodiment and the base station apparatus 100-1 according to the first embodiment, the weighting coefficient control unit 305 and the reference signal generation unit 306 are different. These components will be mainly described hereinafter.

The weighting coefficient control unit 305 calculates the transmission weighting coefficients $V_j$ by which the base station apparatus and the slave base station apparatuses multiply their respective transmission signals and the reception weighting coefficients $U_k$ by which the mobile station apparatuses connected to the base station apparatuses multiply their respective reception signals using channel state information obtained from the higher layer 101. The same method for calculating the transmission weighting coefficients $V_j$ and the reception weighting coefficients $U_k$ as that according to the first embodiment may be used.

In addition, the weighting coefficient control unit 305 transmits the transmission weighting coefficients $V_j$ of the slave base station apparatuses and the reception weighting coefficients $U_k$ of the mobile station apparatuses connected to the slave base station apparatuses to the higher layer. In addition, the weighting coefficient control unit 305 outputs the transmission weighting coefficient $V_1$ by which the transmission signals of the master base station apparatus (host apparatus) are multiplied to the precoding unit 104. Furthermore, the weighting coefficient control unit 305 outputs the reception weighting coefficient $U_1$ of the mobile station apparatus connected to the master base station apparatus (host apparatus) to the reference signal generation unit 306.

The reference signal generation unit 306 generates first reference signals used for estimating transmission characteristics from the transmission antenna of the base station apparatus 300-*j* to the reception antennas of the mobile station apparatuses 300-*k* and a second reference signal used for transmitting the reception weighting coefficient $U_1$ to the mobile station apparatus. The second reference signal is generated by multiplying a known code sequence predetermined by the communication system 1*a* by the reception weighting coefficient $U_1$. Here, the reference signal generation unit that generates reference signals including a weighting coefficient may be referred to as a weighting coefficient information generation unit, and the reference signals including the weighting coefficient generated by the reference signal generation unit may be referred to as weighting coefficient information.

For example, if the known code sequence predetermined by the communication system 1*a* is denoted by $S_{RS}$, the first reference signals are denoted by $S_{RS}$ and the second reference signal is denoted by $U_1 S_{RS}$.

The resource mapping unit 108 performs resource mapping on modulation symbols output from the precoding unit 104, the first reference signals, the second reference signals, and control signals in resource elements of the resource mapping unit 108 on the basis of scheduling information transmitted from the higher layer 101.

Next, the base station apparatus 300-2 and the base station apparatus 300-3 (slave base station apparatuses) according to the third embodiment will be described.

Figure 12:
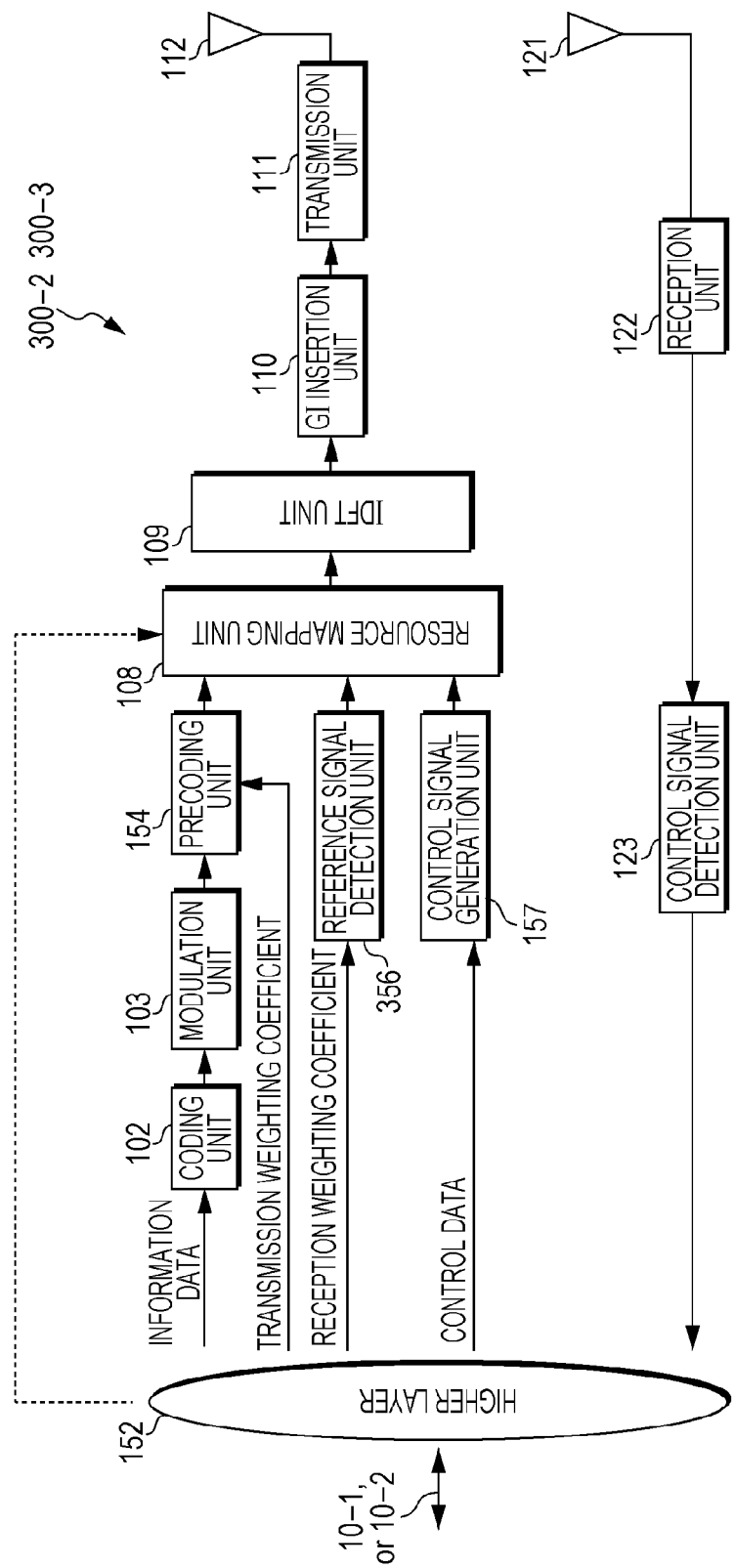
FIG. 12 is a schematic diagram illustrating the configurations of subsidiary base station apparatuses according to the third embodiment.

FIG. 12 is a schematic diagram illustrating the configurations of the base station apparatus 300-2 and the base station apparatus 300-3 according to the third embodiment. Although the configuration of the base station apparatus 300-2 will be described hereinafter, the base station apparatus 300-3 has the same configuration. In addition, the number of slave base station apparatuses is not limited to two, and it is only required that at least one base station apparatus be included.

The base station apparatus 300-2 includes a higher layer 152, a coding unit 102, a modulation unit 103, a precoding unit 154, a reference signal generation unit 356, a control signal generation unit 157, a resource mapping unit 108, an IDFT unit 109, a GI insertion unit 110, a transmission unit 111, a transmission antenna unit 112, a reception antenna unit 121, a reception unit 122, and a control signal detection unit 123. It is to be noted that if part or the entirety of the base station apparatus 300-2 is realized as a chip, namely an integrated circuit, a chip control circuit (not illustrated) that controls each function block is included.

In the base station apparatus 300-2, components having the same reference numerals as those illustrated in FIG. 5 have the same functions and operations, and accordingly description thereof is omitted. Between the base station apparatus 300-2 according to the third embodiment and the base station apparatus 100-2 according to the first embodiment, the higher layer 152 and the reference signal generation unit 356 are different. These components will be mainly described hereinafter.

The higher layer 152 obtains channel state information (channel state information $H_{21}$ regarding the channel between the base station apparatus 300-1 and the mobile station apparatus 400-2, channel state information $H_{22}$ regarding the channel between the base station apparatus 300-2 and the mobile station apparatus 400-2, and channel state information $H_{23}$ regarding the channel between the base station apparatus 300-3 and the mobile station apparatus 400-2).

In addition, the higher layer 152 transmits the obtained channel state information to the master base station apparatus, which calculates the reception weighting coefficients $U_k$, through a backhaul line 10-1 (or a backhaul line 10-2).

In addition, the higher layer 152 obtains the transmission weighting coefficient $V_2$ (or $V_3$) by which transmission signals of the host apparatus are multiplied and the reception weighting coefficient $U_2$ (or $U_3$) of the mobile station apparatus 400-2 connected to the host apparatus from the master base station apparatus through the backhaul line 10-1 (or the backhaul line 10-2).

Furthermore, the higher layer 152 inputs the transmission weighting coefficient $V_2$ (or $V_3$) to the precoding unit 154. In addition, the higher layer 152 inputs the reception weighting coefficient $U_2$ (or $U_3$) to the reference signal generation unit 356.

The reference signal generation unit 356 generates first reference signals $S_{RS1}$ used for estimating the transmission characteristics from the transmission antenna of the base station apparatus to the reception antennas of the mobile station apparatuses and a second reference signal $S_{RS2}$ used for transmitting the reception weighting coefficient $U_2$ (or $U_3$) to the mobile station apparatus 400-2. It is to be noted that the method for generating reference signals used by the reference signal generation unit 306 of the base station apparatus 300-1 is also used as a method for generating reference signals used by the reference signal generation unit 356 of the base station apparatus 300-2 or 300-3.

The resource mapping unit 108 performs resource mapping on modulation symbols output from the precoding unit 154, the first reference signals, the second reference signals, and control signals in resource elements of the resource mapping unit 108 on the basis of scheduling information transmitted from the higher layer 152. As the format of the resource mapping, the format used by the reference signal generation unit 106 of the base station apparatus 300-1 is used.

Next, the configurations of the mobile station apparatuses 400-$k$ according to the third embodiment will be described.

Figure 13:
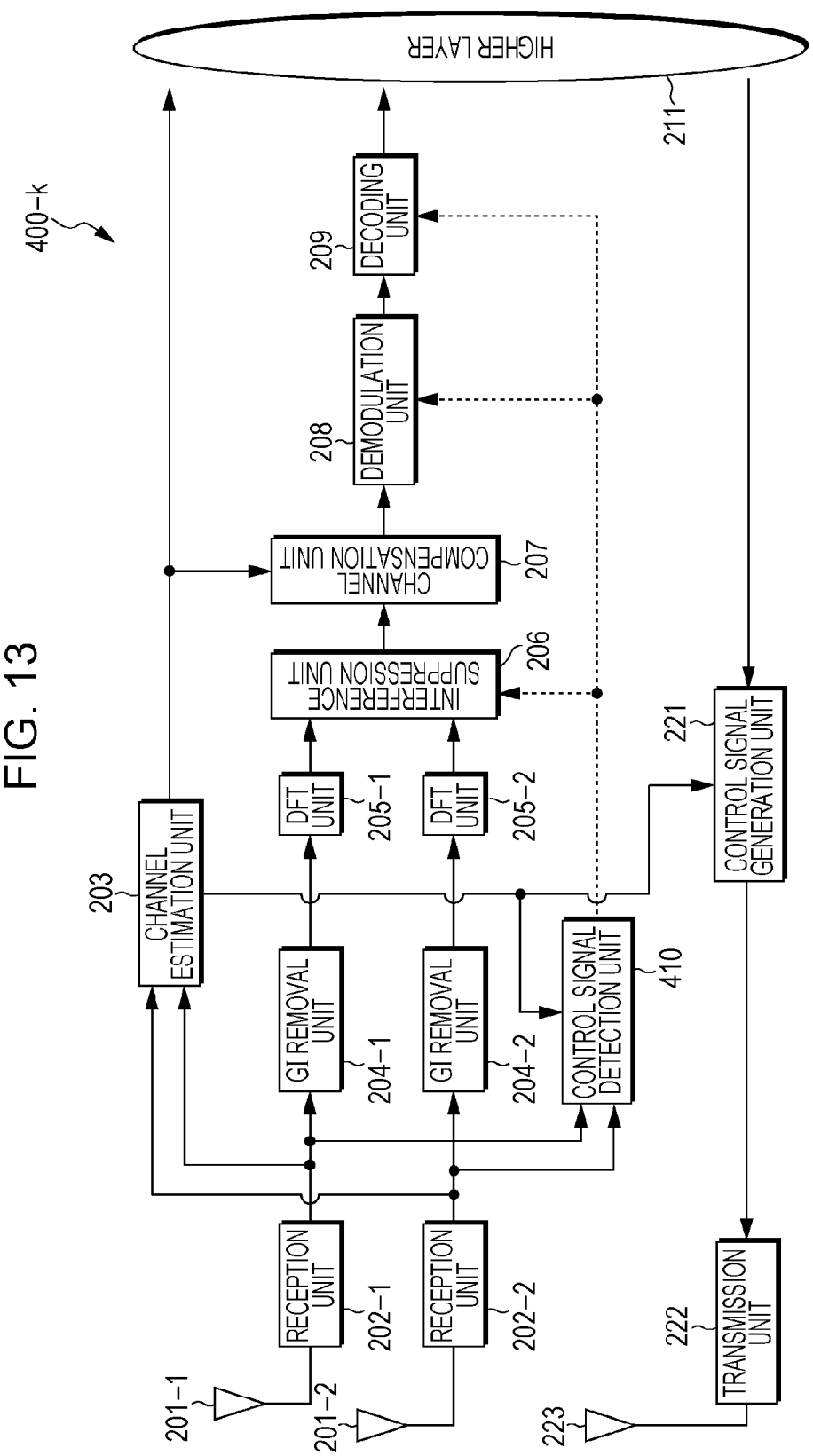
FIG. 13 is a schematic diagram illustrating the configurations of mobile station apparatuses according to the third embodiment.

FIG. 13 is a schematic diagram illustrating the configurations of the mobile station apparatuses 400-$k$ according to the third embodiment. Each mobile station apparatus 400-$k$ is configured by including reception antenna units 201-$e$, reception units 202-$e$, a channel estimation unit 203, GI removal units 204-$e$, DFT units 205-$e$, an interference suppression unit 206, a channel compensation unit 207, a demodulation unit 208, a decoding unit 209, a control signal detection unit 410, a higher layer 211, a control signal generation unit 221, a transmission unit 222, and a transmission antenna unit 223. FIG. 13 illustrates an example in which the number of antennas is two (e=1 and 2). It is to be noted that if part or the entirety of each mobile station apparatus 400-$k$ is realized as a chip, namely an integrated circuit, a chip control circuit (not illustrated) that controls each function block is included.

In the mobile station apparatuses 400-$k$, components having the same reference numerals as those illustrated in FIG. 6 have the same functions and operations, and accordingly description thereof is omitted. Between the mobile station apparatuses 400-$k$ according to the third embodiment and the mobile station apparatuses 200-$k$ according to the first embodiment, the control signal detection unit 410 is different. The component will be mainly described hereinafter.

The channel estimation unit 203 performs channel estimation using the first reference signals $S_{RS1}$ included in signals output from the reception unit 202-1. The channel estimation unit 203 then transmits channel estimation values (for example, transmission functions) to the control signal detection unit 410, the channel compensation unit 207, the control signal generation unit 221, and the higher layer 211.

The channel estimation unit 203 calculates a channel estimation value $\hat{H}$ by dividing a first reference signal $HS_{RS1}$ ($H_k$ denotes a channel between the base station apparatus 300-$j$ (however, j=k) and the mobile station apparatus 400-$k$) output from the reception unit 202-$e$ by a known signal $S_{RS1}$.

In addition, a channel estimation value of a subcarrier in which the known signal $S_{RS1}$ is not arranged can be calculated through an interpolation technique such as linear interpolation or FFT complement using a channel estimation value $\hat{H_k}$ of a subcarrier in which the first reference signal $HS_{RS1}$ is arranged.

The control signal detection unit 410 detects control signals included in signals output from the reception unit 202-2. After extracting information regarding the MCS and the number of layers added to information data and the like included in the control signals, the control signal detection unit 410 transmits the information to the demodulation unit 208 and the decoding unit 209.

In addition, the control signal detection unit 410 calculates reception weighting coefficient information $\hat{U_k}$ using the second reference signal $S_{RS2}$ (=$U_k S_{RS1}$) included in the signals output from the reception unit 202-2. The control signal detection unit 410 then inputs the reception weighting coefficient information $\hat{U_k}$ to the interference suppression unit 206. The calculated reception weighting coefficient information $\hat{U_k}$ can be expressed by the following Math. 6. Here, $\hat{H_k}$ denotes the channel estimation value.

$$\hat{U_k} = \hat{H_k} R_{RS2}/\hat{H_k} S_{RS2} = H_k U_k S_{RS1}/\hat{H}_{RS2} \qquad [\text{Math. 6}]$$

The interference suppression unit 206 performs processing represented by Math. 5 using the calculated reception weighting coefficient information $\hat{U_k}$.

Figure 14:
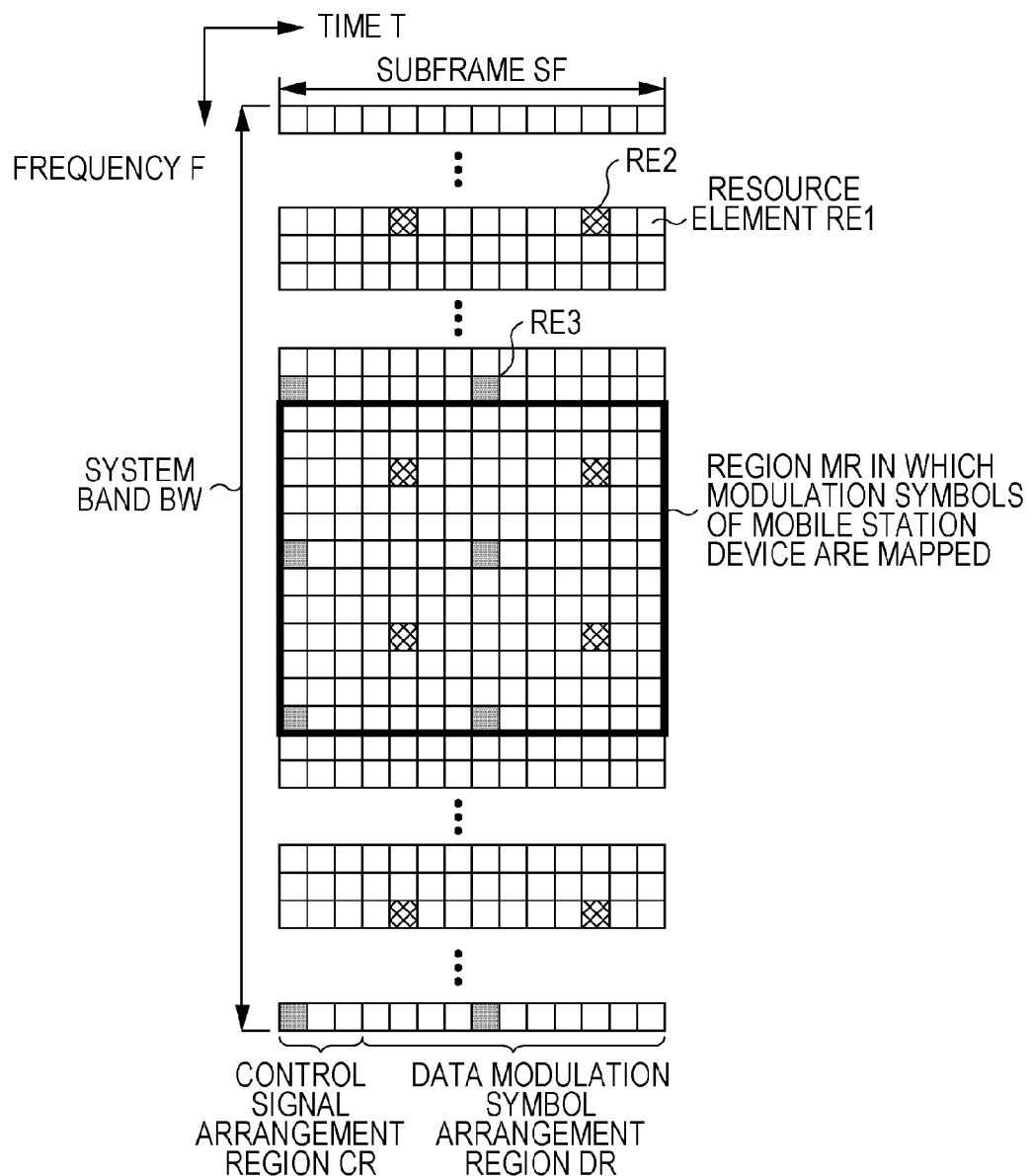
FIG. 14 illustrates an example of resource mapping performed by a resource mapping unit of the base station apparatus according to the third embodiment.

Next, the resource mapping performed by the resource mapping unit 108 of the base station apparatus 300-1 according to the third embodiment will be described. FIG. 14 illustrates an example of the resource mapping performed by the resource mapping unit 108 of the base station apparatus 300-1 according to the third embodiment.

The resource mapping performed by the resource mapping unit 108 illustrated in FIG. 14 is an example of a case in which the base station apparatus 300-1 performs transmission using one transmission antenna unit. In FIG. 14, the horizontal direction represents time T, and the horizontal direction represents frequency T. In FIG. 14, white portions RE1 are resource elements in which the control signals and the information data are mapped.

In addition, hatched portions RE2 and solid portions RE3 are resource elements in which the reference signals are mapped. The resource elements in which the reference signals can be mapped are included over the entirety of a system band. That is, such resource elements are resource elements in which cell-specific reference signals are mapped.

Among the resource elements in which the reference signals are mapped, the first reference signals are mapped in the solid portions RE3. In addition, among the resource elements in which the reference signals are mapped, the second reference signals are arranged in the hatched portions RE2.

Thus, by multiplying part of the cell-specific reference signals by the reception weighting coefficient $U_k$, the reception weighting coefficient $U_k$ is transmitted to the mobile station apparatus. It is to be noted that error correction coding and a modulation process may be performed on the information data and the control signals (the same holds true for FIG. 15 to FIG. 17).

Figure 15:
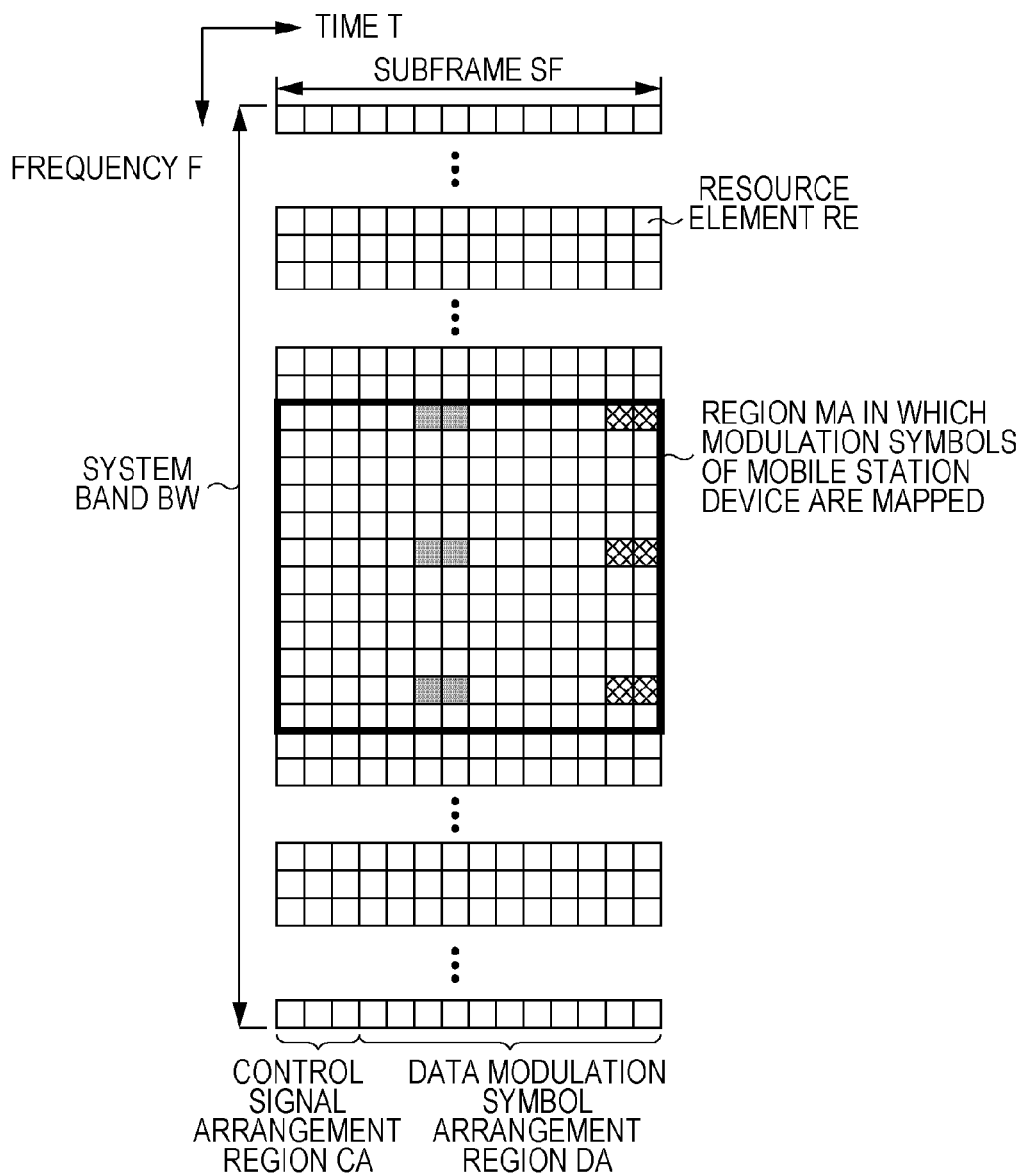
FIG. 15 illustrates another example of the resource mapping performed by the resource mapping unit of the base station apparatus according to the third embodiment.

FIG. 15 illustrates another example of the resource mapping performed by the resource mapping unit 108 of the base station apparatus 300-1 according to the third embodiment.

In FIG. 15, the horizontal direction represents the time T, and the vertical direction represents the frequency F. In FIG. 15, white portions RE1 are resource elements in which the control signals and the information data are mapped. A range indicated by thick lines is a range MA in which modulation symbols of the mobile station apparatuses to which the reception weighting coefficients are transmitted are assigned.

In addition, hatched portions RE2 and solid portions RE3 are resource elements in which the reference signals are mapped. The resource elements in which the reference signals are mapped are included in the range in which the modulation symbols of the mobile station apparatus to which the reception weighting coefficient $U_k$ is transmitted are assigned. That is, such resource elements are resource elements in which user-specific reference signals are mapped.

In addition, among the resource elements in which the reference signals are mapped, the first reference signals are arranged in the solid portions RE3. In addition, among the resource elements in which the reference signals are mapped, the second reference signals are mapped in the hatched portions RE2.

Thus, by multiplying part of the user-specific reference signals by the reception weighting coefficient $U_k$, the reception weighting coefficient is transmitted to the mobile station apparatus.

Figure 16:
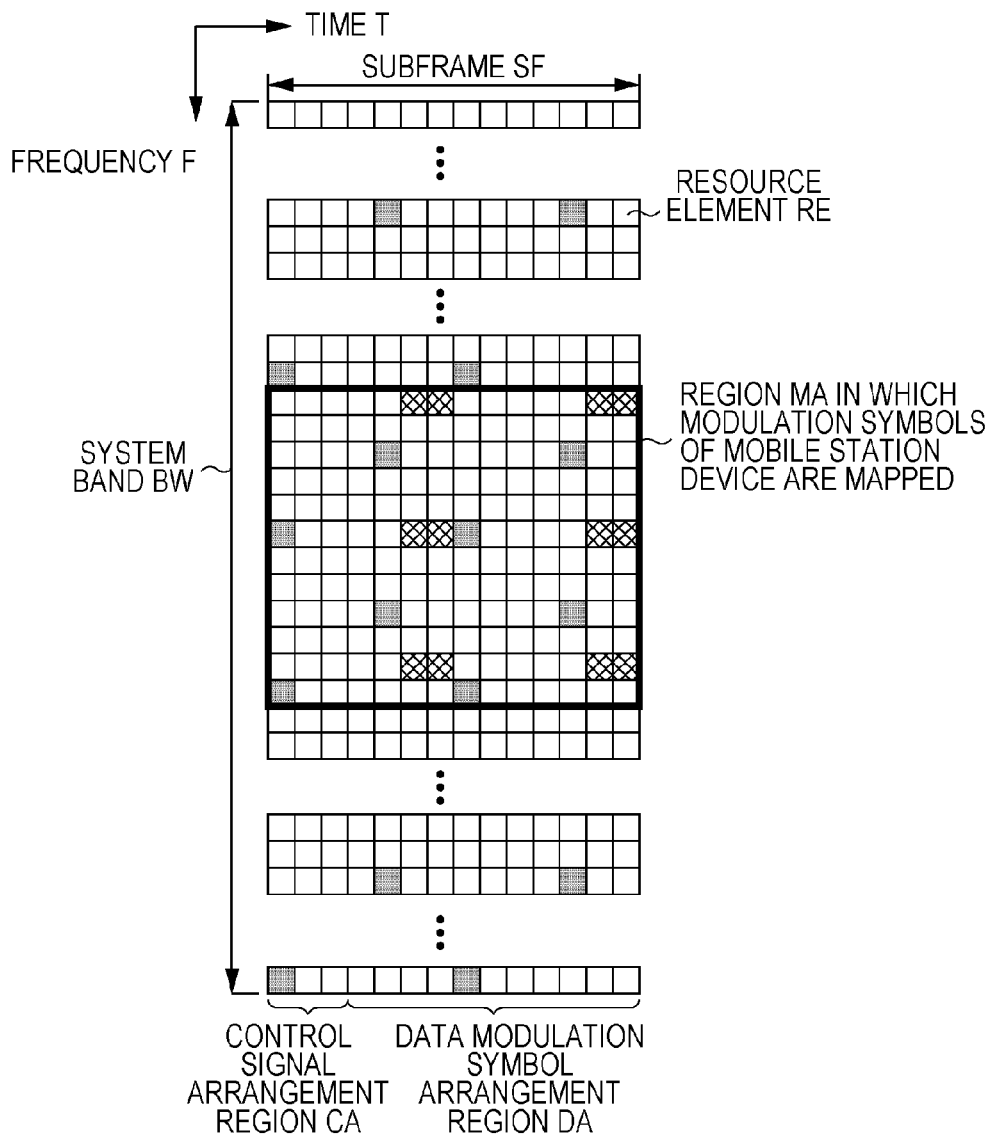
FIG. 16 illustrates another example of the resource mapping performed by the resource mapping unit of the base station apparatus according to the third embodiment.

FIG. 16 illustrates another example of the resource mapping performed by the resource mapping unit 108 of the base station apparatus 300-1 according to the third embodiment.

In FIG. 16, the horizontal direction represents time T, and the vertical direction represents frequency F. In FIG. 16, white portions RE1 are resource elements in which the control signals and the information data are mapped. A region indicated by thick lines is a region MA in which the modulation symbols of the mobile station apparatuses to which the reception weighting coefficients are transmitted are assigned.

In addition, hatched portions RE2 and solid portions RE3 are resource elements in which the reference signals are mapped. The resource elements indicated by the solid portions RE3 in which the reference signal can be mapped are resource elements in which the cell-specific reference signals are mapped. The resource elements indicated by the hatched portions RE2 in which the reference signals can be mapped are resource elements in which the user-specific reference signals are mapped.

In addition, among the resource elements in which the reference signals are mapped, the first reference signals are arranged in the solid portions RE3. In addition, among the resource elements in which the reference signals are mapped, the second reference signals are arranged in the hatched portions RE2.

Thus, by multiplying either the user-specific reference signals or the cell-specific reference signals by the reception weighting coefficients Uk, the reception weighting coefficients are transmitted to the mobile station apparatuses.

Figure 17:
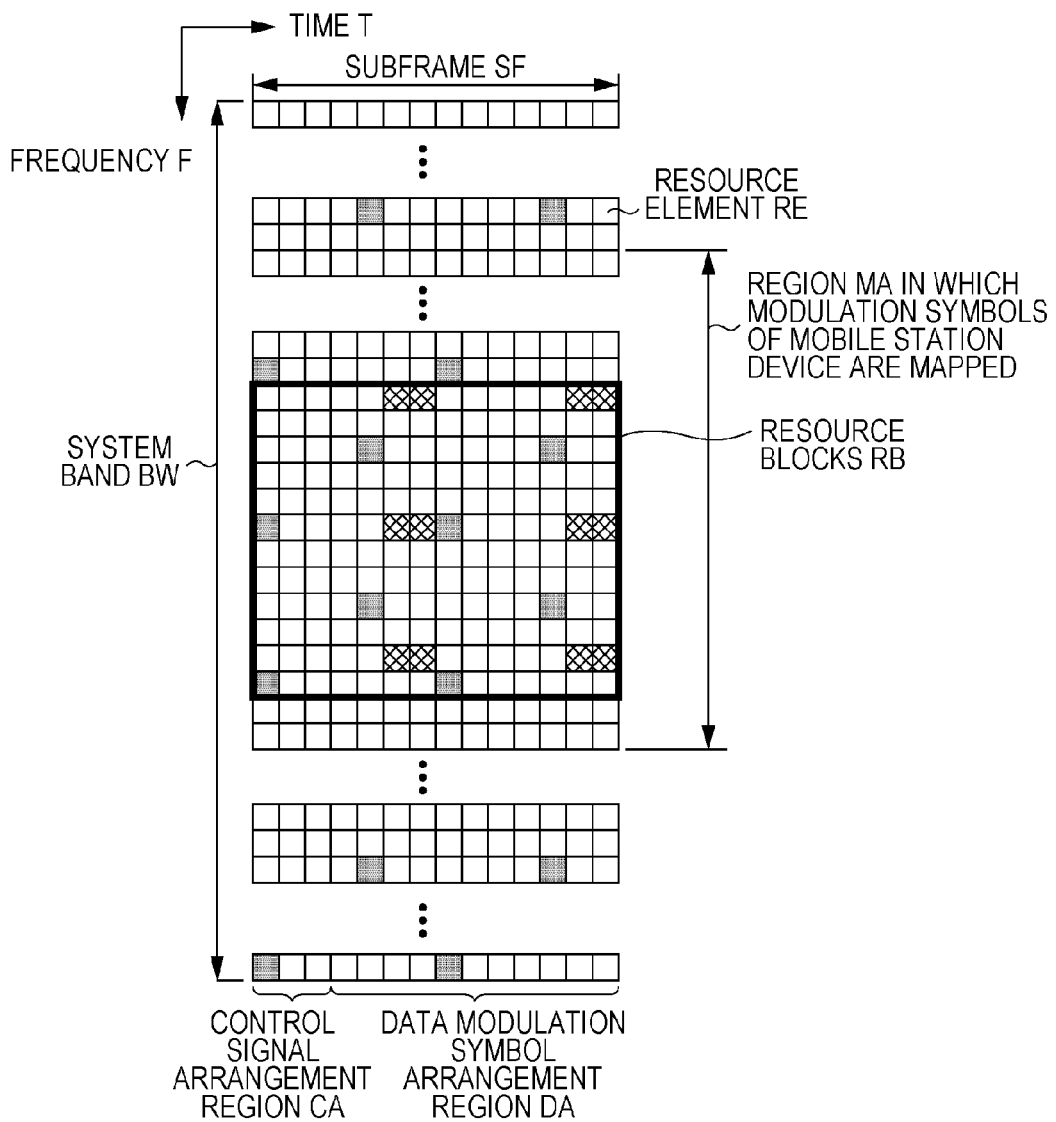
FIG. 17 illustrates another example of the resource mapping performed by the resource mapping unit of the base station apparatus according to the third embodiment.

FIG. 17 illustrates another example of the resource mapping performed by the resource mapping unit 108 of the base station apparatus 300-1 according to the third embodiment.

In FIG. 17, the horizontal direction represents the time T, and the vertical direction represents the frequency F. In FIG. 17, white portions RE1 are resource elements in which the control signals and the information data are mapped. A region indicated by thick lines is resource blocks RB. A resource block is a unit of resources in which a plurality of resource elements are collected, and is a minimum unit of resources to which the modulation symbols are assigned for each mobile station apparatus. In FIG. 17, the resource blocks RB may each be resources configured by twelve subcarriers and seven OFDM symbols.

In addition, hatched portions RE2 and solid portions RE3 are resource elements in which the reference signals are mapped. The resource elements indicated by the solid portions RE3 in which the reference signals can be mapped are resource elements in which the cell-specific reference signals are mapped. The resource elements indicated by the hatched portions RE2 in which the reference signals can be mapped are resource elements in which the user-specific reference signals are mapped.

In addition, among the resource elements in which the reference signals are mapped, the first reference signals are mapped in the solid portions RE3. In addition, among the resource elements in which the reference signals are mapped, the second reference signals are arranged in the hatched portions RE2.

Thus, by multiplying either the mobile station apparatus-specific reference signals or the cell-specific reference signals included in the resource blocks, which are part of the region in which the modulation symbols of the mobile station apparatus are mapped, by the reception weighting coefficient, the reception weighting coefficient is transmitted to the mobile station apparatus.

As described above, in the communication system according to the third embodiment, the entirety or part of cells of the plurality of base station apparatuses are arranged in such a way as to overlap with one another, and the plurality of base station apparatuses and the mobile station apparatuses connected to the base station apparatuses suppress inter-cell interference in a coordinated manner. Since the base station apparatuses transmit the reception weighting coefficients for suppressing the inter-cell interference to the mobile station apparatuses using the reference signals, an increase in the number of control signals can be suppressed, thereby realizing a communication system capable of reducing the amount of processing of the control signals in the plurality of base station apparatuses and the mobile station apparatuses. In addition, the base station apparatuses can transmit the weighting coefficients using the mobile station apparatus- or cell-specific reference signals, and accordingly a communication system in which data can be efficiently transmitted and received in accordance with a communication environment can be constructed.

It is to be noted that although a method for transmitting the reception weighting coefficients to the mobile station apparatuses by multiplying the reference signals by the reception weighting coefficients has been described in this embodiment, the method used is not limited to this, and it is only required that the signals multiplied by the reception weighting coefficients be known signals. For example, control signals that are known signals may be multiplied by the reception weighting coefficients in order to transmit the reception weighting coefficients to the mobile station apparatuses.

Fourth Embodiment

In a communication system A1 according to a fourth embodiment, an example will be described in which base station apparatuses A100-k and mobile station apparatuses A200-j transmit data to each other using a DFT-s-OFDM (discrete Fourier transform-spread-orthogonal frequency-division multiplexing) scheme. It is to be noted that the scheme used in this embodiment is not limited to this, and other transmission schemes including, for example, a single-carrier transmission scheme such as SC-FDMA (single-carrier frequency-division multiplexing access) and multicarrier transmission schemes such as OFDM (orthogonal frequency-division multiplexing) and MC-CDMA (multiple carrier code-division multiple access) may be used, instead. In addition, as examples of the communication system 1 according to the fourth embodiment, wireless communication systems such as WCDMA (wideband code-division multiple access), LTE (long term evolution), and LTE-A (LTE-advanced) developed by the 3GPP (Third Generation Partnership Project) and WiMAX (worldwide interoperability for microwave access) developed by the IEEE (Institute of Electrical and Electronics Engineers) are included, but the communication system A1 according to the fourth embodiment is not limited to these.

Figure 18:
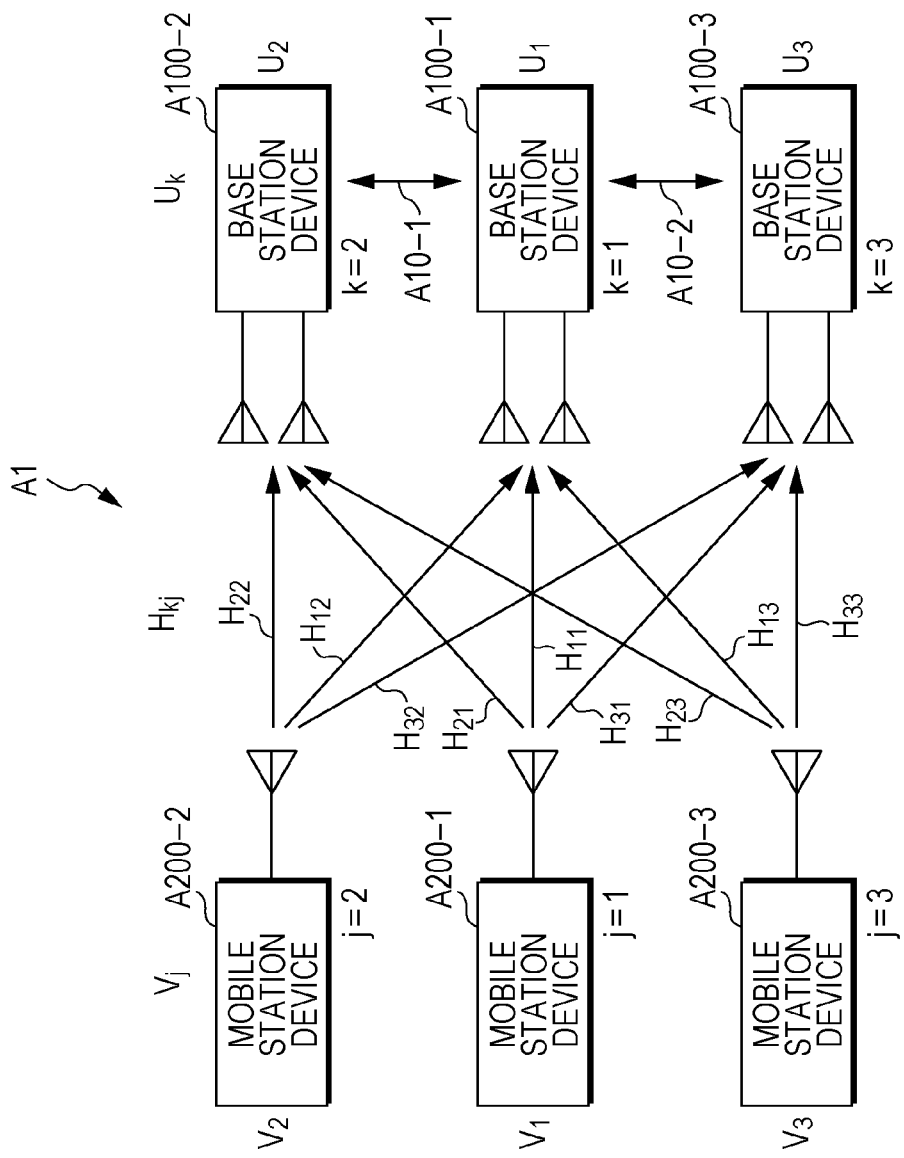
FIG. 18 is a schematic diagram illustrating the configuration of a communication system according to a fourth embodiment.

FIG. 18 is a schematic diagram illustrating the configuration of the communication system A1 according to the fourth embodiment of the present invention. The communication system A1 according to the fourth embodiment includes a plurality of base station apparatuses A100-$k$ ($k$ is an arbitrary positive integer, and $k$=1 to 3 in FIG. 18) and a plurality of mobile station apparatuses A200-$j$ ($j$ is an arbitrary positive integer, and $j$=1 to 3 in FIG. 18).

The plurality of base station apparatuses A100-$k$ and the plurality of mobile station apparatuses A200-$j$ in the communication system A1 are configured in such a way as to suppress inter-cell interference in a coordinated manner. In addition, the mobile station apparatuses A200-$k$ in the communication system 1 include mobile station apparatuses connected to base station apparatuses operating in a coordinated manner and mobile station apparatuses subjected to the coordinated control.

Each of the base station apparatuses A100-$k$ is arranged such that the entirety or part of a cell thereof overlaps a cell of another base station apparatus and the same frequency is reused in one cell. The base station apparatuses A100-$k$ are connected to each other by backhaul lines A10-1 and A10-2 (for example, X2 interfaces), which are optical fibers, Internet lines, wireless lines, or the like.

Channels between the base station apparatuses A100-$k$ and the mobile station apparatuses A200-$j$ are represented by uplink channels $H_{kj}$ (transmission functions) ($k$ and $j$ are arbitrary positive integers; $k$=1 to 3 and $j$=1 to 3 in FIG. 18). Here, the channels $H_{kj}$ between base station apparatuses and mobile station apparatuses subjected to the coordinated control will be referred to as channels of the entirety of the system. In the communication system A1, the mobile station apparatuses 200-$j$ are wirelessly connected to the base station apparatuses A100-$k$ that satisfy $k$=$j$. That is, for the mobile station apparatuses A200-$j$, signals transmitted by base station apparatuses A100-$k$ with which $k$≠$j$ cause inter-cell interference.

For example, for the base station apparatus A100-1, transmission signals from the mobile station apparatus A200-1 received through the channel $H_{11}$ are desired signals, and transmission signals from the mobile station apparatus A200-2 and the mobile station apparatus A200-3 received through the channel $H_{12}$ and the channel $H_{13}$, respectively, are inter-cell interference (undesired signals).

More specifically, each of the mobile station apparatuses A200-$j$ multiplies transmission signals to be transmitted thereby by a transmission weighting coefficient $V_j$ with which the base station apparatuses A100-$k$ and the mobile station apparatuses A200-$j$ can suppress possible inter-cell interference in a coordinated manner, details of which will be described later. In addition, each of the base station apparatuses A100-$k$ multiplies its reception signals by a reception weighting coefficient $U_k$ with which the base station apparatuses A100-$k$ and the mobile station apparatuses A200-$j$ can suppress possible inter-cell interference in a coordinated manner. It is to be noted that the communication system A1 illustrated in FIG. 18 is different from the communication system 1 illustrated in FIG. 1 in that the uplink is used instead of the downlink. The channels $H_{kj}$, the transmission weighting coefficients $V_j$, and the reception weighting coefficients $U_k$ illustrated in FIG. 18 may be applied to the base station apparatuses or the mobile station apparatuses in accordance with the difference.

In the following description, it is assumed that, in the communication system A1 illustrated in FIG. 18, the base station apparatus A100-1 is a main base station apparatus (master base station apparatus) that calculates the transmission weighting coefficients and the reception weighting coefficients and the base station apparatus A100-2 and the base station apparatus A100-3 are subsidiary base station apparatuses (slave base station apparatuses) that operate in a coordinated manner in accordance with instructions from the master base station apparatus.

Next, the master base station apparatus (the base station apparatus A100-1) according to the fourth embodiment will be described.

Figure 19:
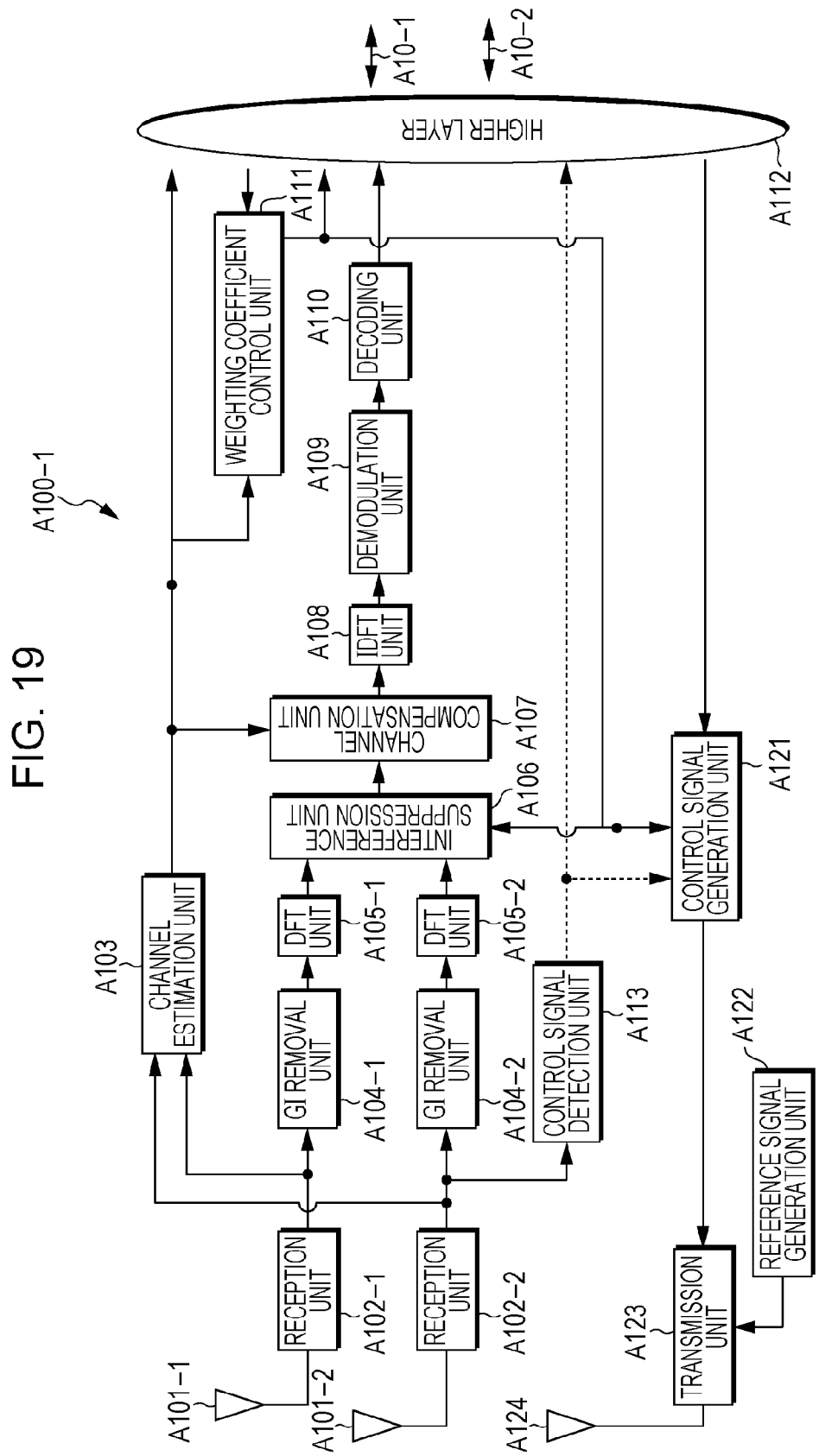
FIG. 19 is a schematic diagram illustrating the configuration of a main base station apparatus in the communication system according to the fourth embodiment.

As illustrated in FIG. 19, the master base station apparatus (the base station apparatus A100-1) is configured by including a plurality of reception antenna units A101-L (L is an arbitrary positive integer and will denote the number of components in the following description), reception units A102-L, a channel estimation unit A103, GI removal units A104-L, DFT units A105-L, an interference suppression unit A106, a channel compensation unit A107, an IDFT unit A108, a demodulation unit A109, a decoding unit A110, a weighting coefficient control unit A111, a higher layer A112, a control signal detection unit A113, a control signal generation unit A121, a reference signal generation unit A122, a transmission unit A123, and a transmission antenna unit A124. It is to be noted that although an example of a case in which the base station apparatus A100-1 includes two (L=2) reception antennas is illustrated in FIG. 19, the number of reception antennas is not limited to this, and any number of antennas may be included. In addition, although one transmission antenna is included, the number of transmission antennas is not limited to this, and a plurality of transmission antennas may be included, or a transmission antenna and a reception antenna may be the same antenna. In addition, if part or the entirety of the base station apparatus A100-1 is realized as a chip, namely an integrated circuit, a chip control circuit (not illustrated) that controls each function block is included.

The higher layer A112 obtains channel state information from the slave base station apparatuses (the base station apparatus A100-2 and the base station apparatus A100-3) through the backhaul lines A10-1 and A10-2, respectively. In addition, the higher layer A112 outputs the channel state information to the weighting coefficient control unit A111. Here, the higher layer refers to, among the layers of communication functions defined by the OSI reference model, a layer having higher functions than the physical layer, that is, for example, the data link layer, the network layer, or the like.

In addition, the higher layer A112 obtains channel state information (information regarding the channels $H_{2j}$) regarding the channels between the mobile station apparatuses A200-$j$ and the base station apparatus A100-2 from the base station apparatus A100-2 through the backhaul line A10-1. In addition, the higher layer A112 obtains channel state information (information regarding the channels $H_{3j}$) regarding the channels between the mobile station apparatuses A200-$j$ and the base station apparatus A100-3 from the base station apparatus A100-3 through the backhaul line A10-2.

In addition, the higher layer A112 obtains the reception weighting coefficients of the slave base station apparatuses and the transmission weighting coefficients of the mobile station apparatuses connected to the slave base station apparatuses calculated by the weighting coefficient control unit A111, which will be described later.

In addition, the higher layer A112 transmits the reception weighting coefficients of the slave base station apparatuses and the transmission weighting coefficients of the mobile station apparatuses connected to the slave base station apparatuses to the slave base station apparatuses through the backhaul line A10-1.

More specifically, the higher layer A112 of the base station apparatus A100-1 transmits the transmission weighting coefficient $V_2$ by which transmission signals of the mobile station apparatus A200-2 are multiplied and the reception weighting coefficient $U_2$ by which reception signals of the base station apparatus A100-2 are multiplied to the base station apparatus A100-2 through the backhaul line A10-1. In addition, the higher layer A112 of the base station apparatus A100-1 transmits a transmission weighting coefficient $V_3$ by which transmission signals of the mobile station apparatus A200-3 are multiplied and a reception weighting coefficient $U_3$ by which reception signals of the base station apparatus A100-3 are multiplied to the base station apparatus A100-3 through the backhaul line A10-2.

In addition, the higher layer A112 outputs control data such as the MCS (modulation and coding scheme) and the spatial multiplexing number of the transmission signals transmitted by the mobile station apparatus A200-2 to the control signal generation unit A121. The control data is configured in consideration of the channel estimation value, the transmission weighting coefficient, and the reception weighting coefficient. It is to be noted that the higher layer A112 also transmits other parameters necessary for the components of the base station apparatus A100-1 to realize their respective functions.

The control signal generation unit A121 generates control signals including the control data output from the higher layer A112 and a transmission weighting coefficient by which the mobile station apparatus connected to the host apparatus multiplies its transmission signals. The control signals correspond to, for example, physical downlink control channels (PDCCHs; physical uplink control channels) or the like in LTE. In addition, the transmission weighting coefficient can be transmitted using a physical downlink shared channel (PDSCH; physical uplink shared channel) in LTE. It is to be noted that the control signals may be subjected to error correction coding and a modulation process.

FIG. 20 is a conceptual diagram illustrating an example of the format of the control signals output from the control signal generation unit A121. Each control signal includes a region storing transmission weighting coefficient information regarding the mobile station apparatus connected to the host apparatus. As illustrated in FIG. 20, the region storing the information regarding the transmission weighting coefficient, the reception weighting coefficient $V_1$ by which the mobile station apparatus A200-1 multiplies its transmission signals is provided. It is to be noted that an MCS region and a layer region are examples of included control data other than the information regarding the transmission weighting coefficient, and other types of control data may also be included. The MCS region is a region storing MCS information regarding a signal transmitted from the mobile station apparatus A200-1 to the base station apparatus A100-1. The layer region is a region storing information regarding the spatial multiplexing number of the signal transmitted from the mobile station apparatus A200-1 to the base station apparatus A100-1. It is to be noted that the control signal generation unit that generates control signals including a weighting coefficient may be referred to as a weighting coefficient information generation unit, and the reference signals including the weighting coefficient generated by the reference signal generation unit may be referred to as weighting coefficient information.

The reference signal generation unit A122 generates reference signals (pilot signals). The reference signals are, for example, signals used for estimating transmission characteristics from the transmission antenna unit A124 of the base station apparatus A100-1 to the reception antenna units of the mobile station apparatuses. It is to be noted that a code sequence configuring each reference signal is, for example, preferably an orthogonal sequence, that is, a Hadamard code or a CAZAC (constant amplitude zero autocorrelation) sequence.

The transmission unit A123 up-converts the control signals output from the control signal generation unit A121 and downlink signals including reference signals such that the signals fall into a frequency band in which transmission is possible, and transmits the signals to the connected base station apparatus A100-$k$ through the transmission antenna unit A124. It is to be noted that the transmission unit A123 can apply a transmission scheme in which the mobile station apparatus A200-$j$ can perform reception in the downlink of the communication system A1. For example, in LTE, OFDM transmission may be applied.

The base station apparatus A100-1 receives transmission signals of the mobile station apparatuses A200-$j$ through the reception antenna units A101-L. Here, transmission signals other than those of the mobile station apparatus A200-1 cause inter-cell interference. The configurations of the mobile station apparatuses that generate transmission signals will be described later.

The reception units A102-L down-convert wireless frequency signals input from the reception antenna units A101-L such that the wireless frequency signals fall into the frequency band in which digital signal processing is possible, and remove unnecessary components (spurious) from the down-converted signals by performing a filtering process. In addition, the reception units A102-L convert the signals subjected to the filtering process from analog signals into digital signals (A/D; analog-to-digital), and output the digital signals obtained as a result of the conversion to the channel estimation unit A103, the GI removal units A104-L, and the control signal detection unit A113.

The GI removal units A104-L remove the guard intervals GI from the signals output from the reception units A102-L in order to avoid distortion due to delayed waves, and output the signals from which the guard intervals GI have been removed to the DFT units A105-L.

The DFT units A105-L perform a discrete Fourier transform (DFT) for transmitting the signals that have been input from the GI removal units A104-L and from which the guard intervals GI have been removed from time-domain signals into frequency domain signals, and outputs the frequency domain signals to the interference suppression unit A106. It is to be noted that the DFT units A105-L may use another method instead of the DFT, such as, for example, a fast Fourier transform (FFT), insofar as the signals can be transformed from the time domain into the frequency domain.

The control signal detection unit A113 detects control signals included in the signals output from the reception unit A102-2. The control signals may be, for example, feedback information such as a CQI (channel quality control) in LTE. Upon extracting the feedback information, the control signal detection unit 113 outputs the feedback information to the control signal generation unit A121 and the higher layer A112.

The control signal generation unit A121 and the higher layer A112 generate downlink transmission signals (information data or control signals of the downlink) in consideration of the feedback information such as the CQI.

The channel estimation unit A103 performs channel estimation using the reference signals included in the signals output from the reception units A102-L. The channel estimation unit A103 then transmits a channel estimation value to the channel compensation unit A107, the weighting coefficient control unit A111, and the higher layer A112. It is to be noted that the channel estimation value is, for example, a transmission function, an impulse response, or the like.

The weighting coefficient control unit A111 calculates transmission weighting coefficients $V_j$ by which signals transmitted from the mobile station apparatuses A200-$j$ are multiplied and reception weighting coefficients $U_k$ by which reception signals of the master base station apparatus and the slave base station apparatuses are multiplied using the channel state information (channel estimation values) obtained from the higher layer A112 and the channel estimation unit A103.

That is, the master base station apparatus obtains channel estimation values between all the base station apparatuses (the master base station apparatus and the slave base station apparatuses) that perform the coordinated control and all the mobile station apparatuses involved in the coordinated control, and calculates the transmission weighting coefficients $V_j$ of the mobile station apparatuses and the reception weighting coefficients $U_k$ of the base station apparatuses using the channel estimation values.

As an example, the weighting coefficient control unit A111 calculates the transmission weighting coefficients such that the directions (vectors) of the equivalent channels of interference signals transmitted from a plurality of mobile station apparatuses that are interference sources become orthogonal to the reception weighting coefficients by which the reception signals are multiplied by the base station apparatuses (Math. 7).

$$U^*_k H_{kj} V_j = 0, \forall j \neq k = 0,$$

$$\text{rank}(U^*_k H_{kk} V_k) = d_k$$

$$U_k^H H_{kj} V_j = 0, \forall j \neq k = 0,$$

$$\text{rank}(U_k^H H_{kk} V_k) = d_k \quad \text{[Math. 7]}$$

Here, $H_{kj}$ denotes a channel matrix between the mobile station apparatus A200-$j$ and the base station apparatus 100-$k$ subjected to the coordinated control, and $V_j$ denotes the vector of the transmission weighting coefficient of the mobile station apparatus A200-$j$. $U_k$ denotes the vector of the reception weighting coefficient of the base station apparatus A100-$k$, and $d_k$ denotes the number of streams. $H$ denotes a complex conjugate transpose.

In addition, the weighting coefficient control unit A111 transmits the reception weighting coefficients $U_k$ of the slave base station apparatuses and the transmission weighting coefficients $V_j$ of the mobile station apparatuses connected to the slave base station apparatuses to the higher layer A112. In addition, the weighting coefficient control unit A11 outputs the reception weighting coefficient $U_1$ by which the reception signals of the master base station apparatus (host apparatus) are multiplied to the interference suppression unit A106. In addition, the weighting coefficient control unit A111 outputs the transmission weighting coefficient $V_1$ of the mobile station apparatus connected to the master base station apparatus (host apparatus) to the control signal generation unit A121. It is to be noted that the above-described weighting coefficient control unit A111 and weighting coefficient control function may be configured in such a way as to be included in the higher layer A112.

The interference suppression unit A106 multiplies the frequency domain signals input from the DFT units A105-L by the reception weighting coefficients input from the weighting coefficient control unit A111.

The channel compensation unit A107 calculates a weighting coefficient that corrects channel distortion due to fading using a scheme such as ZF (zero forcing) equalization or MMSE (minimum mean square error) equalization on the basis of the channel estimation value input from the channel estimation unit 203. The channel compensation unit A107 performs channel compensation by multiplying the signals input from the interference suppression unit A106 by this weighting coefficient.

The IDFT unit A108 performs an IDFT (inverse discrete Fourier transform) process on the signals output from the channel compensation unit A107.

The demodulation unit A109 performs a demodulation process on the signal input from the IDFT unit A108. The demodulation process may be either hard decision (calculation of a coded bit sequence) or soft decision (calculation of a coded bit LLR).

The decoding unit A110 performs an error correction decoding process on the coded bit sequence (or the coded bit LLR) subjected to the demodulation output from the demodulation unit A109, calculates information data transmitted to the host apparatus, and outputs the information data to the higher layer A112. A scheme for the error correction coding process is a scheme corresponding to the error correction coding such as turbo coding or convolutional coding performed by the connected base station apparatus. In the error correction coding process, either hard decision or soft decision may be adapted.

It is to be noted that when the mobile station apparatus A200-$j$ has transmitted interleaved data modulation symbols, the decoding unit A110 performs a deinterleaving process corresponding to the interleaving on the input coded bit sequence. The decoding unit A110 then performs the error correction decoding process on the signals subjected to the deinterleaving process.

Next, a process for calculating the transmission weighting coefficients $V_j$ and the reception weighting coefficients $U_k$ in the communication system A1 will be described. As the weighting calculation process according to this embodiment, for example, the weighting coefficient control unit A111 may apply the process for calculating the transmission weighting coefficients $V_j$ and the reception weighting coefficients $U_k$ illustrated in FIG. 4.

In the calculation method illustrated in FIG. 4, the process for calculating a weighting coefficient that reduces the effect of interference as much as possible is repeatedly performed while switching the roles of transmission and reception by utilizing a property (reciprocity of channels) that the complex conjugate transpose of a channel matrix from a mobile station apparatus to a base station apparatus equals a channel matrix from the base station apparatus to the mobile station apparatus.

First, upon obtaining channel state information, the weighting coefficient control unit A111 sets an arbitrary transmission weighting coefficient $V_j$ (S100).

Next, the weighting coefficient control unit A111 calculates the sum $Q_{k,i}$ of values of interference received by the base station apparatus A100-$k$ on the basis of (Math. 8) (S101). Here, Q denotes a covariance matrix of received interference signals. In addition, P denotes transmission power and K denotes the number of base station apparatuses that suppress inter-cell interference in a coordinated manner. In addition, $_H$ denotes a complex conjugate transpose.

$$Q_{k,i} = \sum_{j=1, j \neq k}^{K} \frac{P_j}{d_j} H_{kj} V_{j,i} V_{j,i}^H H_{kj}^H \qquad \text{[Math. 8]}$$

Next, the weighting coefficient control unit A111 performs singular value decomposition on the calculated sum $Q_{k,i}$ of the values of interference to calculate a reception weighting coefficient $U_{k,i}$ that suppresses the sum $Q_{k,i}$ of the values of interference (S102). It is to be noted that in step S102 and step S103, the reception weighting coefficient $U_k$ when transmission signals of the mobile station apparatus A200-$j$ are received by the base station apparatus A100-$k$ is calculated.

Next, the roles of transmission and the reception are switched between the mobile station apparatus A200-$j$ and the base station apparatus A100-$k$ (S103). That is, a reception weighting coefficient $U_k\sim$ of the mobile station apparatus A200-$j$ when the mobile station apparatus A200-$j$ receives transmission signals multiplied by the base station apparatus A100-$k$ by the coefficient $U_{k,i}$ is calculated. The reception weighting coefficient $U_k\sim$ corresponds to a transmission weighting coefficient $V_k$ of the mobile station apparatus A200-$j$.

In the calculation of the reception weighting coefficient $U_k\sim$, first, the sum $Q_{j,i}\sim$ of values of interference received by the mobile station apparatus A200-$j$ is calculated on the basis of (Math. 9) (S104). Here, $H_{jk}\sim = H_{kj}{}^H$ and $V_k\sim = U_k$. P$\sim$ denotes transmission power.

$$\tilde{Q}_j = \sum_{k=1, k \neq j}^{K} \frac{\tilde{P}_k}{d_k} \tilde{H}_{jk} \tilde{V}_k \tilde{V}_k^H \tilde{H}_{jk}^H \qquad \text{[Math. 9]}$$

Next, the sum $Q_{j,i}\sim$ of the values of interference is subjected to singular value decomposition to calculate a reception weighting coefficient $U_{k,i}\sim$ that suppresses the sum $Q_{j,i}\sim$ of the values of interference (S105). Again, the roles of transmission and reception are switched between the mobile station apparatus A200-$j$ and the base station apparatus A100-$k$ (S106). That is, $V_{k,i} = U_{k,i}\sim$ is substituted.

A counter (not illustrated) that counts the number of times of processing is incremented by 1 (S107), and the processing in step S101 to step S106 is repeated until a certain number of times I has been reached (N in S108). If the certain number of times I has been reached (Y in S108), the processing ends.

Thus, a reception weighting coefficient with which the base station apparatus A100-$k$ and the mobile station apparatus A200-$j$ can suppress the effect of interference can be obtained by repeatedly updating the reception weighting coefficients ($U_k$ and $U_k\sim$) that reduce interference power while switching the roles of transmission and reception between the base station apparatus A100-$k$ and the mobile station apparatus A200-$j$.

By determining the reception weighting coefficient $U_k\sim$ with which k=j as the transmission weighting coefficient $V_j$ of the mobile station apparatus A200-$j$, the plurality of base station apparatuses A100-$k$ can suppress the effect of interference in a coordinated manner. It is to be noted that this calculation method is an example, and the calculation method is not limited to this. Another calculation method may be used, instead.

Figure 21:
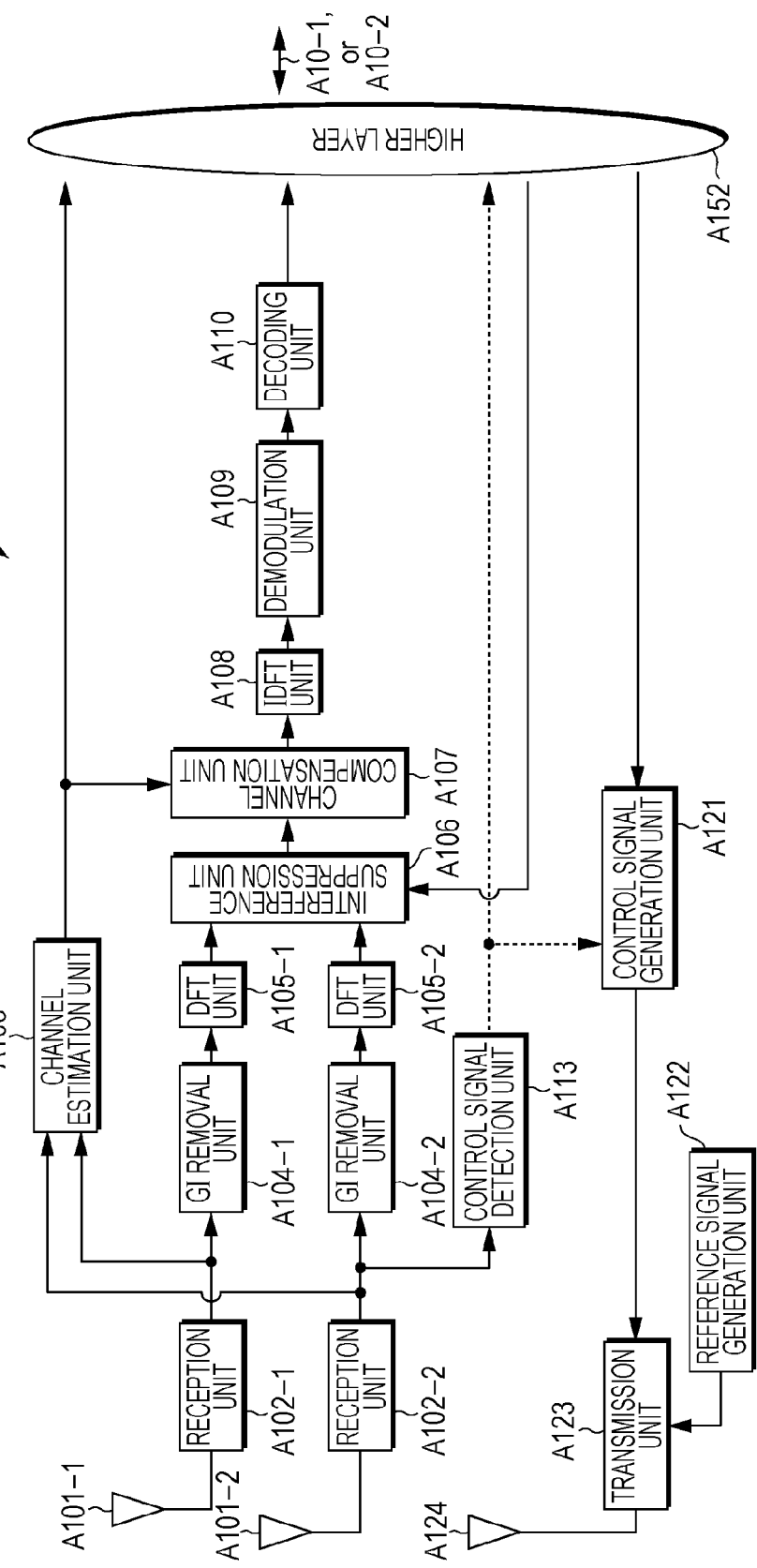
FIG. 21 is a schematic diagram illustrating the configurations of subsidiary base station apparatuses in the communication system according to the fourth embodiment.

Next, the slave base station apparatuses (the base station apparatus A100-2 and the base station apparatus A100-3) in the fourth embodiment will be described. FIG. 21 is a schematic diagram illustrating the configurations of the slave base station apparatuses (the base station apparatus A100-2 and the base station apparatus A100-3) according to the fourth embodiment. Although the configuration of the base station apparatus A100-2 will be described hereinafter, the base station apparatus A100-3 has the same configuration.

As illustrated in FIG. 21, each of the slave base station apparatuses (the base station apparatuses A100-2 and A100-3) is configured by including a plurality of reception antenna units A101-L (L is an arbitrary positive integer and denotes the number of components), reception units A102-L, a channel estimation unit A103, GI removal units A104-L, DFT units A105-L, an interference suppression unit A106, a channel compensation unit A107, an IDFT unit A108, a demodulation unit A109, a decoding unit A110, a higher layer A152, a control signal detection unit A113, a control signal generation unit A121, a reference signal generation unit A122, a transmission unit A123, and a transmission antenna unit A124. It is to be noted that although an example of a case in which the base station apparatus A100-2 includes two (L=2) reception antenna units is illustrated in FIG. 21, the number of reception antenna units is not limited to this, and any number of antennas may be included. In addition, although one transmission antenna unit is included, the number of transmission antennas is not limited to this, and a plurality of transmission antennas may be included, or a transmission antenna and a reception antenna may be the same antenna. In addition, if part or the entirety of the base station apparatus A100-2 is realized as a chip, namely an integrated circuit, a chip control circuit (not illustrated) that controls each function block is included.

The operation of the higher layer A152 is different between the base station apparatus A100-1 and the base station apparatus A100-2. The difference will be mainly described hereinafter.

The higher layer A152 obtains a channel estimation value $H_{2j}$ between the mobile station apparatus A200-$j$ and the host apparatus (base station apparatus A100-2) from the channel estimation unit A103. The higher layer A152 transmits the channel estimation value $H_{2j}$ to the base station apparatus A100-1 through the backhaul line A10-1.

In addition, the higher layer A152 obtains the transmission weighting coefficient $V_2$ of transmission signals of the mobile station apparatus A200-2 connected to the host apparatus and the reception weighting coefficient $U_2$ by which reception signals of the host apparatus are multiplied from the base station apparatus A100-1 through the backhaul line A10-1. The transmission weighting coefficient $V_2$ and the reception weighting coefficient $U_2$ have been calculated by the weighting coefficient control unit A111 of the base station apparatus A100-1.

In addition, the higher layer A152 inputs the reception weighting coefficient $U_2$ to the interference suppression unit A106. The interference suppression unit A106 multiplies frequency domain signals input from the DFTs A105-L by the reception weighting coefficient $U_2$.

In addition, the higher layer A152 inputs the transmission weighting coefficient $V_2$ by which the mobile station apparatus A200-$j$ connected to the host apparatus multiplies its transmission signals to the control signal generation unit A121.

The control signal generation unit A121 generates control signals including control data output from the higher layer A152 and the transmission weighting coefficient $V_2$. It is to be noted that, as in the case of the master base station apparatus A100-1, the format illustrated in FIG. 20 may be applied as the format of the control signals. It is to be noted that the control data includes MCS information, the spatial multiplexing number, and the like.

Figure 22:
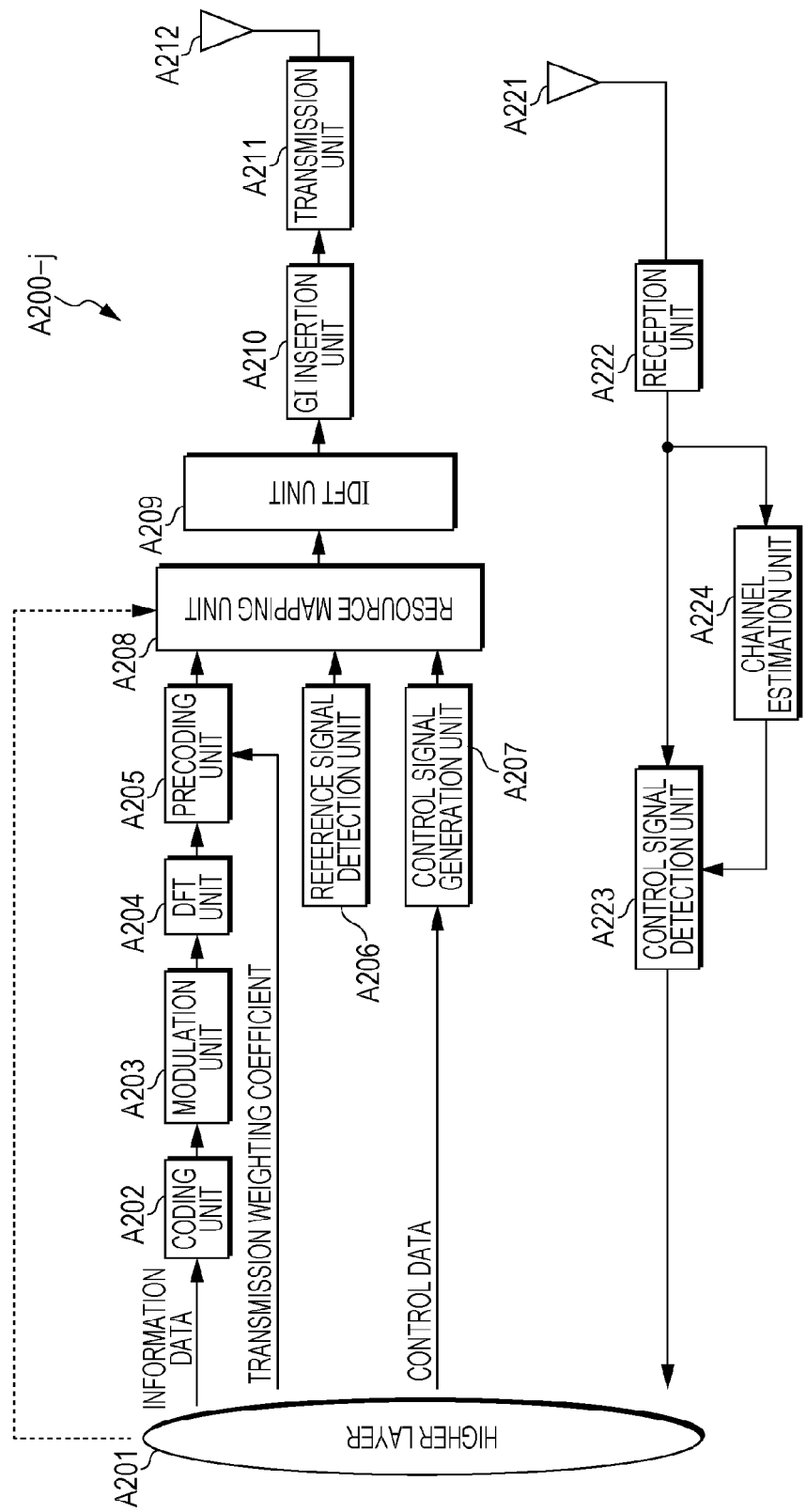
FIG. 22 is a schematic diagram illustrating the configurations of mobile station apparatuses in the communication system according to the fourth embodiment.

Next, the mobile station apparatuses A200-j according to the fourth embodiment will be described. FIG. 22 is a schematic diagram illustrating the configurations of the mobile station apparatuses A200-j according to the fourth embodiment.

As illustrated in FIG. 22, each mobile station apparatus A200-j is configured by including a higher layer A201, a coding unit A202, a modulation unit A203, a DFT unit A204, a precoding unit A205, a reference signal generation unit A206, a control signal generation unit A207, a resource mapping unit A208, an IDFT unit A209, a GI insertion unit A210, a transmission unit A211, a transmission antenna unit A212, a reception antenna unit A221, a reception unit A222, a control signal detection unit A223, and a channel estimation unit A224. It is to be noted that if part or the entirety of each mobile station apparatus A200-j is realized as a chip, namely an integrated circuit, a chip control circuit (not illustrated) that controls each function block is included.

The reception unit A222 of the mobile station apparatus A200-j receives downlink transmission signals of the base station apparatus A100-k that satisfies j=k through the reception antenna unit A221. It is to be noted that the transmission signals are signals including control signals such as a transmission weighting coefficient. In addition, the control signals are signals including the transmission weighting coefficient $V_j$ generated by the control signal generation unit A121 of the base station apparatus A100-k. It is to be noted that transmission signals of the mobile station apparatus A100-j are multiplied by the transmission weighting coefficient $V_j$, details of which will be described later.

In addition, the reception unit A222 down-converts (wireless frequency conversion) the signals output from the reception antenna unit A221 such that the signals fall into the frequency band in which digital signal processing such as a process for detecting signals is possible. The reception unit A222 then performs a filtering process for removing spurious and converts (analog-to-digital conversion) the signals subjected to the filtering process from analog signals into digital signals.

The channel estimation unit A224 performs channel estimation using reference signals included in the signals output from the reception unit A222. In the channel estimation, a downlink channel between the base station apparatus A100-k and the mobile station apparatus A200-j is estimated.

The control signal detection unit A223 performs channel estimation, a demodulation process, and a decoding process on the control signals output from the reception unit A222 in order to extract the transmission weighting coefficient $V_j$. It is to be noted that the control signal detection unit A223 uses a result (channel estimation value) of the channel estimation performed by the channel estimation unit A224 for the channel compensation, the demodulation process, and the decoding process.

In addition, the control signal detection unit A223 extracts feedback information such as MCS information (modulation and coding scheme) and the spatial multiplexing number of the transmission signals of the mobile station apparatus A100-j.

The higher layer A112 obtains the transmission weighting coefficient $V_j$ included in the control signals. In addition, the higher layer A112 obtains the feedback information such as the MCS information and the spatial multiplexing number included in the control signals.

In addition, the higher layer A112 outputs information data to be transmitted using the uplink to the coding unit A202 on the basis of the feedback information. It is to be noted that the information data is, for example, audio signals obtained from speech, still image or moving image signals representing a captured image, a character message, or the like.

In addition, the higher layer A112 outputs control data (includes the MCS information, the spatial multiplexing number, and the like) to be transmitted using the uplink. It is to be noted that the higher layer A201 also transmits other parameters necessary for the components of the mobile station apparatus A200-j to realize their respective functions.

The coding unit A202 performs error correction coding on the information data input from the higher layer A201. A coding scheme used by the coding unit A202 for the error correction coding is, for example, turbo coding, convolutional coding, low-density parity-check coding (LDPC), or the like.

It is to be noted that the coding unit A202 may perform a rate matching process on a coded bit sequence in order to match a coding rate of the data sequence subjected to the error correction coding with a coding rate corresponding to a data transmission rate. In addition, the coding unit A202 may have a function of rearranging and interleaving the data sequence subjected to the error correction coding.

The modulation unit A203 modulates the signals input from the coding unit A202 and generates modulation symbols. A modulation process performed by the modulation unit A203 is, for example, BPSK (binary phase-shift keying), QPSK (quadrature phase-shift keying), M-QAM (M-quadrature amplitude modulation; for example, M=16, 64, 256, 1,024, or 4,096), or the like. It is to be noted that the modulation unit A203 may have a function of rearranging and interleaving the generated modulation symbols.

The DFT unit A204 performs a DFT process (discrete Fourier transform process) on the modulation symbols output from the modulation unit A203.

The precoding unit A205 multiplies output signals of the DFT unit A204 by a transmission weighting coefficient. As illustrated in FIG. 22, the precoding unit A205 obtains the transmission weighting coefficient through the higher layer A201, but the precoding unit A205 may directly obtain the transmission weighting coefficient from the control signal detection unit A223, instead.

The reference signal generation unit A206 generates reference signals (pilot signals) and outputs the generated reference signals to the resource mapping unit A208. The reference signals are signals used by the base station apparatuses A100-k for estimating transmission characteristics from the transmission antenna unit of the mobile station apparatus to reception antennas of the base station apparatuses A100-k. The estimated transmission characteristics are used for channel state information for calculating the transmission weighting coefficients and the reception weighting coefficients or channel compensation in the base station apparatuses A100-k.

It is to be noted that a code sequence configuring each reference signal is preferably an orthogonal sequence, that is, for example, a Hadamard code or a CAZAC (constant amplitude zero autocorrelation) sequence.

The control signal generation unit A207 generates control signals including downlink control data output from the higher layer A201. For example, the control signals may be, for example, a CQI (channel quality control) or the like in LTE. It is to be noted that error correction coding and a modulation process may be performed on the control signals.

The resource mapping unit A208 maps (hereinafter referred to as resource mapping) the modulation symbols, the reference signals, and the control signals in resource elements on the basis of scheduling information transmitted from the higher layer A201. It is to be noted that a resource element refers to a minimum unit that is configured by one subcarrier and one OFDM symbol and in which a signal is arranged.

The IDFT unit A209 performs an inverse discrete Fourier transform (IDFT) on frequency domain signals input from the resource mapping unit 208 to transform the frequency domain signals into time domain signals. The IDFT unit A209 may be configured in such a way as to use another processing method (for example, an inverse fast Fourier transform (IFFT)) instead of the IDFT insofar as the frequency domain signals can be transformed into the time domain signals.

The GI insertion unit A210 adds GIs (guard intervals, or guard sections) to the time domain signals (referred to as valid symbols) input from the IDFT unit A209 to generate SC-FDMA symbols. It is to be noted that the guard intervals GI are sections that are added in order to enable a reception side (the base station apparatus A100-$k$) to perform a DFT process (the DFT unit A105-1 of the base station apparatus A100-$k$) while maintaining periodicity. For example, the GI insertion unit A210 disposes a copy of a portion of a latter half of the valid symbol before the valid symbol as the guard interval GI. Therefore, a valid symbol preceded by a guard interval GI is an SC-FDMA symbol.

The transmission unit A211 performs D/A (digital-to-analog) conversion on the SC-FDMA symbols input from the GI insertion unit A210 to generate analog signals. The transmission unit A211 performs bandlimiting on the generated analog signals by performing a filtering process in order to generate bandlimited signals. The transmission unit A211 up-converts the generated bandlimited signals such that the bandlimited signals fall into the radio frequency band, and outputs the bandlimited signals to the transmission antenna unit A212.

Next, a process performed by the interference suppression unit A106 of the base station apparatus A100-$k$ that has received transmission signals of the mobile station apparatus A200-$j$ ($j$=1 to 3) will be specifically described. An example of a case in which the base station apparatus includes two (L=2) antennas will be described hereinafter.

In the base station apparatus A100-$k$, if signals input from the DFT unit A105-1 and the DFT unit A105-2 to the interference suppression unit A106 are denoted by vectors $R_k$, (Math. 10) is obtained.

$$R_k = H_k V \oplus S$$

$$R_k = \begin{bmatrix} R_{k,1} \\ R_{k,2} \end{bmatrix}$$

$$H_k = \begin{bmatrix} H_{k1,1} & H_{k2,1} & H_{k3,1} \\ H_{k1,2} & H_{k2,2} & H_{k3,2} \end{bmatrix}$$

$$V = \begin{bmatrix} V_1 \\ V_2 \\ V_3 \end{bmatrix}$$

$$S = \begin{bmatrix} S_1 \\ S_2 \\ S_3 \end{bmatrix}$$

[Math. 10]

Here, $R_{k,L}$ denotes a signal input from the DFT unit A105-L of the base station apparatus k, and $H_{kj,L}$ denotes a channel (transmission function) at a time when the base station apparatus A100-$k$ has received transmission signals of the mobile station apparatus A200-$j$ ($j$=1 to 3) through the antenna unit A101-L. $V_j$ is a transmission weighting coefficient (multiplied by the precoding unit A205 of each mobile station apparatus) by which the transmission signals of the mobile station apparatus A200-$j$ have been multiplied, and $S_j$ denotes a data modulation symbol of the mobile station apparatus A200-$j$. In addition, + (indicated as a circle plus in Math. 10 and Math. 11) denotes addition of each element.

If a signal obtained by the interference suppression unit A106 by multiplying $R_k$ by the reception weighting coefficient $U_k$ is denoted by $Y_K$, (Math. 11) is obtained. Here, $U_{K,L}$ denotes a reception weighting coefficient by which the signals input from the DFT unit A105-L are multiplied.

$$Y_k = U_k R = U_k H_k V \oplus S$$

$$U_k = [U_{k,1} U_{k,2}]$$

[Math. 11]

Next, a procedure for transmitting the transmission weighting coefficients $V_j$ and the reception weighting coefficients $U_k$ in the communication system A1 will be described.

Figure 23:
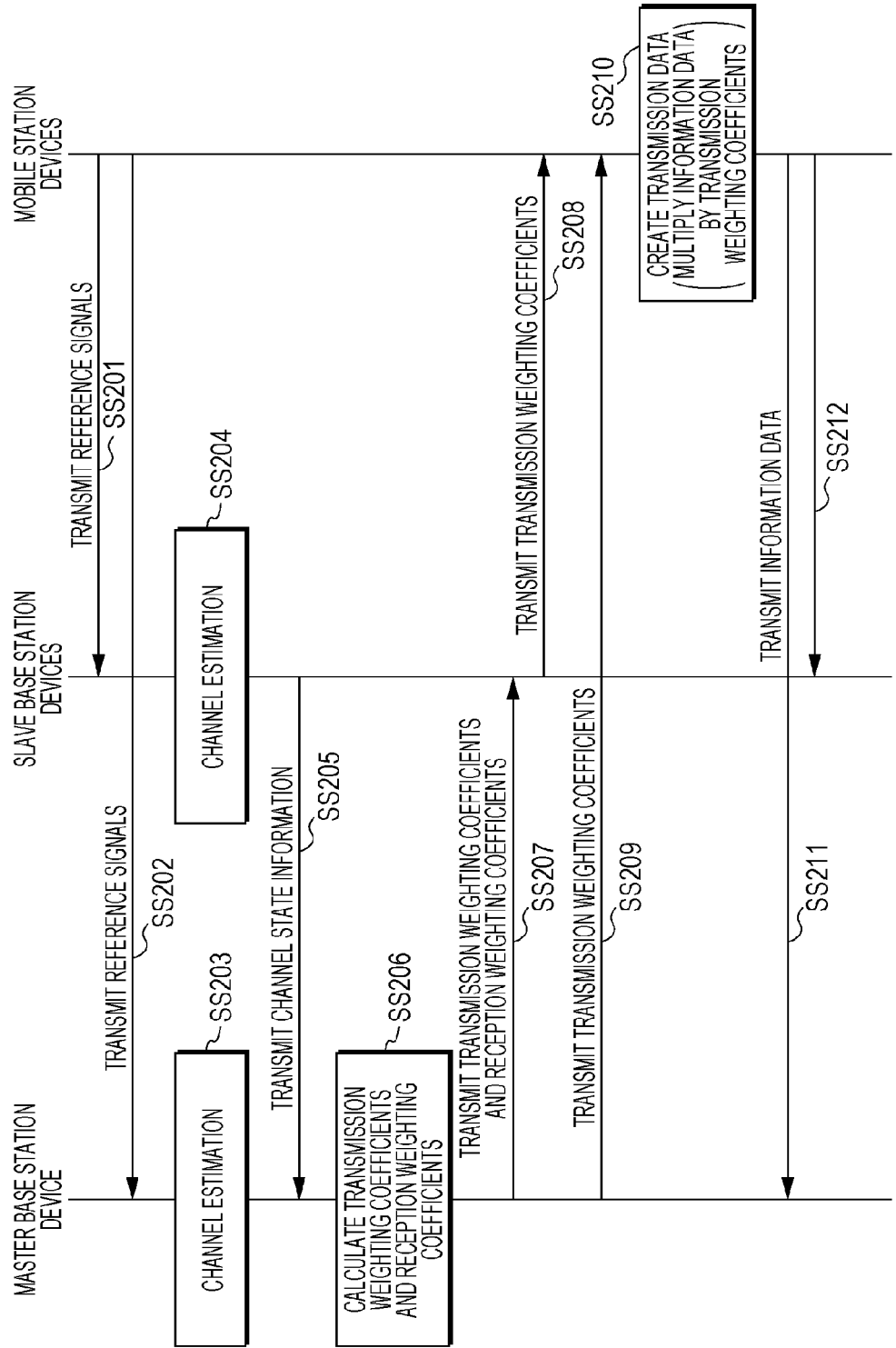
FIG. 23 is a sequence diagram illustrating a process for calculating the transmission weighting coefficients and the reception weighting coefficients and transmitting the transmission weighting coefficients and the reception weighting coefficients to the subsidiary base station apparatuses and the mobile station apparatuses performed by the main base station apparatus in the communication system according to the fourth embodiment.

FIG. 23 is a sequence diagram illustrating an example of an operation in which the master base station apparatus (the base station apparatus A100-1) in the communication system A1 calculates the transmission weighting coefficients $V_j$ and the reception weighting coefficients $U_k$ and transmits the transmission weighting coefficients $V_j$ and the reception weighting coefficients $U_k$ to the slave base station apparatuses (the base station apparatuses A100-2 and A100-3) and the mobile station apparatuses A200-$j$.

First, the mobile station apparatuses A200-$j$ transmit reference signals to the master base station apparatus and the slave base station apparatuses (SS201 and SS202).

The master base station apparatus and the slave base station apparatuses that have received the reference signals in steps SS201 and SS202 estimate channels between themselves and the mobile station apparatuses A200-$j$ using the reference signals (SS203 and SS204). It is to be noted that, in the communication system A1, the base station apparatus A100-$k$ estimates a channel $H_{k1}$, a channel $H_{k2}$, and a channel $H_{k3}$.

Furthermore, the slave base station apparatuses transmit results (channel state information) of the channel estimation to the master base station apparatus (SS205).

Next, the master base station apparatus calculates the transmission weighting coefficients and the reception weighting coefficients using the channel state information (SS206).

Furthermore, the master base station apparatus transmits the calculated transmission weighting coefficients $V_j$ and reception weighting coefficients $U_k$ to the slave base station apparatus through the backhaul lines (SS207).

In addition, the slave base station apparatuses transmit the transmission weighting coefficients $V_j$ to the mobile station apparatuses connected thereto (SS207 and SS208). For example, the mobile station apparatus A200-2 connected to the slave base station apparatus 100-2 obtains the transmission weighting coefficient $V_2$ from the master base station apparatus A100-1 through the slave base station apparatus A100-2.

In addition, the master base station apparatus directly transmits the transmission weighting coefficient of the mobile station apparatus connected thereto to the mobile station apparatus (SS209).

Next, each mobile station apparatus multiplies information data regarding itself to be transmitted by the transmission weighting coefficient (S210), and transmits the information data obtained as a result of the multiplication (SS211 and SS212).

As described above, in the fourth embodiment, in the communication system A1 in which the entirety or part of cells of the plurality of base station apparatuses A100-$k$ is arranged in such a way as to overlap with one another, the master base station apparatus calculates the transmission weighting coefficients $V_j$ of the mobile station apparatuses A200-$j$ and the reception weighting coefficients $U_k$ of the base station apparatuses A100-$k$ such that the directions of the equivalent channels of interference signals received by the base station apparatuses A100-$k$ become orthogonal to the reception weighting coefficients by which the base station apparatuses A100-$k$ multiply their respective reception signals.

The base station apparatuses A100-$k$ then transmit the transmission weighting coefficient $V_j$ to the mobile station apparatuses A200-$j$ connected thereto, and the mobile station apparatuses A200-$j$ multiply their respective transmission signals by the transmission weighting coefficients $V_j$ and perform a transmission process.

As a result, in the communication system in which the entirety or part of the cells of the plurality of base station apparatuses having different cell ranges is arranged in such a way as to overlap with one another, inter-cell interference caused when the plurality of base station apparatuses perform communication using the same frequency is effectively suppressed, thereby achieving desirable reception characteristics.

It is to be noted that the weighting coefficient control unit A111 of the base station apparatus A100-1 may be included in the higher layer A112. Alternatively, the weighting coefficient control unit A111 may be located outside the plurality of base station apparatuses A100-$k$ operating in a coordinated manner and included in a base station management unit that manages these base station apparatuses A100-$k$.

Fifth Embodiment

In a fifth embodiment, a method used by the base station apparatuses A100-$k$ for transmitting the transmission weighting coefficients $U_k$ to the mobile station apparatuses A200-$j$ using codebooks in the communication system A1 described in the fourth embodiment in which the plurality of base station apparatuses A100-$k$ suppress inter-cell interference in a coordinated manner will be described. The codebooks refer to a list of predetermined transmission weighting coefficients $V_j$ and a list of reception weighting coefficients $U_k$ in the communication system A1.

The base station apparatuses A100-$k$ in the communication system A1 according to the fifth embodiment are configured in such a way as to share the codebook of the transmission weighting coefficients $V_j$ of the base station apparatuses and the codebook of the reception weighting coefficients $U_k$ of the mobile station apparatuses, and the mobile station apparatuses A200-$j$ are configured in such a way as to share at least the codebook of the reception weighting coefficients $U_k$ thereof.

As the codebooks according to this embodiment, for example, the codebooks illustrated in FIG. 8 may be applied. In this embodiment, the transmission weighting coefficient $V_{j,n}$ illustrated in FIG. 8 is an n-th candidate for the transmission weighting coefficient of a j-th mobile station apparatus (j and n are arbitrary positive integers). In addition, the reception weighting coefficient $U_{k,n}$ is an n-th candidate for the reception weighting coefficient of a k-th base station apparatus (k and n are arbitrary positive integers).

In this embodiment, the codebook indices #0 to #3 in the codebooks illustrated in FIG. 8 are candidates for the transmission weighting coefficients $V_j$ and the reception weighting coefficients $U_k$ with which two base station apparatuses and two mobile station apparatuses suppress inter-cell interference in a coordinated manner. The codebook indices #4 to #7 are candidates for the transmission weighting coefficients $V_j$ and the reception weighting coefficients $U_k$ with which three base station apparatuses and three mobile station apparatuses suppress inter-cell interference in a coordinated manner. The codebook indices #8 to #11 are candidates for the transmission weighting coefficients $V_j$ and the reception weighting coefficients $U_k$ with which four base station apparatuses and four mobile station apparatuses suppress inter-cell interference in a coordinated manner.

Next, selection of the transmission weighting coefficients $V_j$ and the reception weighting coefficients $U_k$ using the codebooks in this embodiment will be described.

For example, the master base station apparatus A100-1 holds the codebooks in the weighting coefficient control unit A111. First, the weighting coefficient control unit A111 selects candidates in the codebooks on the basis of the number of base station apparatuses and the number of mobile station apparatuses operating in a coordinated manner input from the higher layer A112.

In the case of the communication system A1 illustrated in FIG. 18, the codebook indices #4 to #7 are selected as candidates since the three base station apparatuses A100-$k$ and the three mobile station apparatuses A200-$j$ operate in a coordinated manner.

Next, the weighting coefficient control unit A111 performs a process for obtaining weighting coefficients that reduce the effect of interference as much as possible using channel state information $H_{kj}$ input from the channel estimation unit A103 and the higher layer A112 and the selected candidate codebook indices #.

For example, the channel state information $H_{kj}$ and the transmission weighting coefficients $V_j$ and the reception weighting coefficients $U_k$ of the candidate codebook indec # are substituted for Math. 8 and Math. 9, and a codebook index # with which the sum $Q_{k,i}$ of the values of interference and the sum $Q_{j,i}$~ of the values of interference become smallest is selected.

Next, a method for transmitting the transmission weighting coefficients $V_j$ and the reception weighting coefficients $U_k$ using the codebooks in this embodiment will be described.

As the sequence of an operation for transmitting the codebook index # selected by the master base station apparatus to the slave base station apparatuses and the mobile station apparatuses, the sequence illustrated in FIG. 23 is applied.

In this case, the operation is realized by replacing "transmit transmission weighting coefficients and reception weighting coefficients" (SS207) and "transmit transmission weighting coefficients" (SS208 and SS209) by "transmit the codebook index".

Next, the format of the control signals output from the control signal generation unit A121 will be described. As the format of the control signals output from the control signal generation unit A121, for example, the format illustrated in FIG. 9 may be applied.

Each control signal according to this embodiment includes a region of codebook indices # for transmitting information regarding the transmission weighting coefficient UVB of the mobile station apparatus connected to the host apparatus. As an example, FIG. 9 illustrates a case in which a 4-bit region for storing information regarding the transmission weighting coefficient, a codebook index corresponding to the transmission weighting coefficient $V_1$ by which the mobile station apparatus A200-1 multiplies its reception signals is provided.

In addition, similarly, the control signal generation unit A121 of each slave base station apparatus transmits the transmission weighting coefficient $V_j$ to the corresponding mobile station apparatus A200-$j$ using the format of the control signals illustrated in FIG. 9.

As described above, by sharing the codebooks between the base station apparatuses A100-$k$ and the mobile station apparatuses A200-$j$, the number of repetitions for calculating the transmission weighting coefficients $V_j$ and the reception weighting coefficients $U_k$ can be reduced, thereby reducing the amount of arithmetic processing in the base station apparatuses A100-$k$ and the mobile station apparatuses A200-$j$. In addition, since the transmission weighting coefficients $V_j$ can be transmitted to the mobile station apparatuses A200-$j$ by transmitting codebook indec #, overhead (a storage region for transmitting weighting coefficients) can be reduced.

Sixth Embodiment

In a sixth embodiment, an embodiment will be described in which base station apparatuses A300-$k$ use a method for transmitting transmission weighting coefficients $V_k$ to mobile station apparatuses A400-$j$ using a plurality of reference signals in a communication system A1$a$ in which the plurality of base station apparatuses A300-$k$ suppress inter-cell interference in a coordinated manner.

Figure 24:
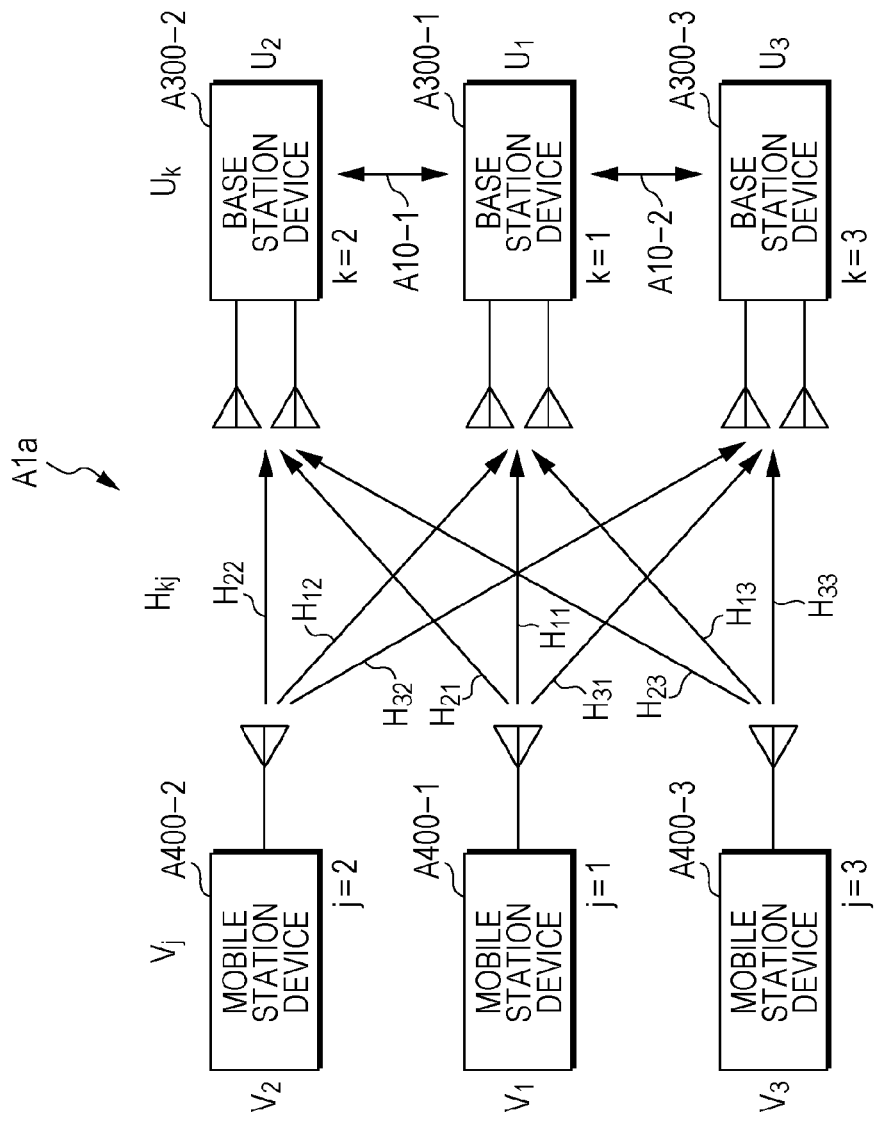
FIG. 24 is a schematic diagram illustrating the configuration of a communication system according to a sixth embodiment.

As illustrated in FIG. 24, the communication system A1$a$ according to the sixth embodiment includes the base station apparatus A300-1, which is a master base station apparatus, the base station apparatuses A300-2 and A300-3, which are slave base station apparatuses, and the plurality of mobile station apparatuses A400-1 to A400-3. It is to be noted that the communication system 1$a$ according to the sixth embodiment can be realized by replacing the base station apparatus A100-1 illustrated in FIG. 18 by the base station apparatus A300-1, the base station apparatuses A100-2 and A100-3 illustrated in FIG. 18 by the base station apparatuses A300-2 and A300-3, respectively, and the mobile station apparatuses A200-1 to the mobile station apparatus A200-3 by the mobile station apparatus A400-1 to the mobile station apparatus A400-3, respectively.

Figure 25:
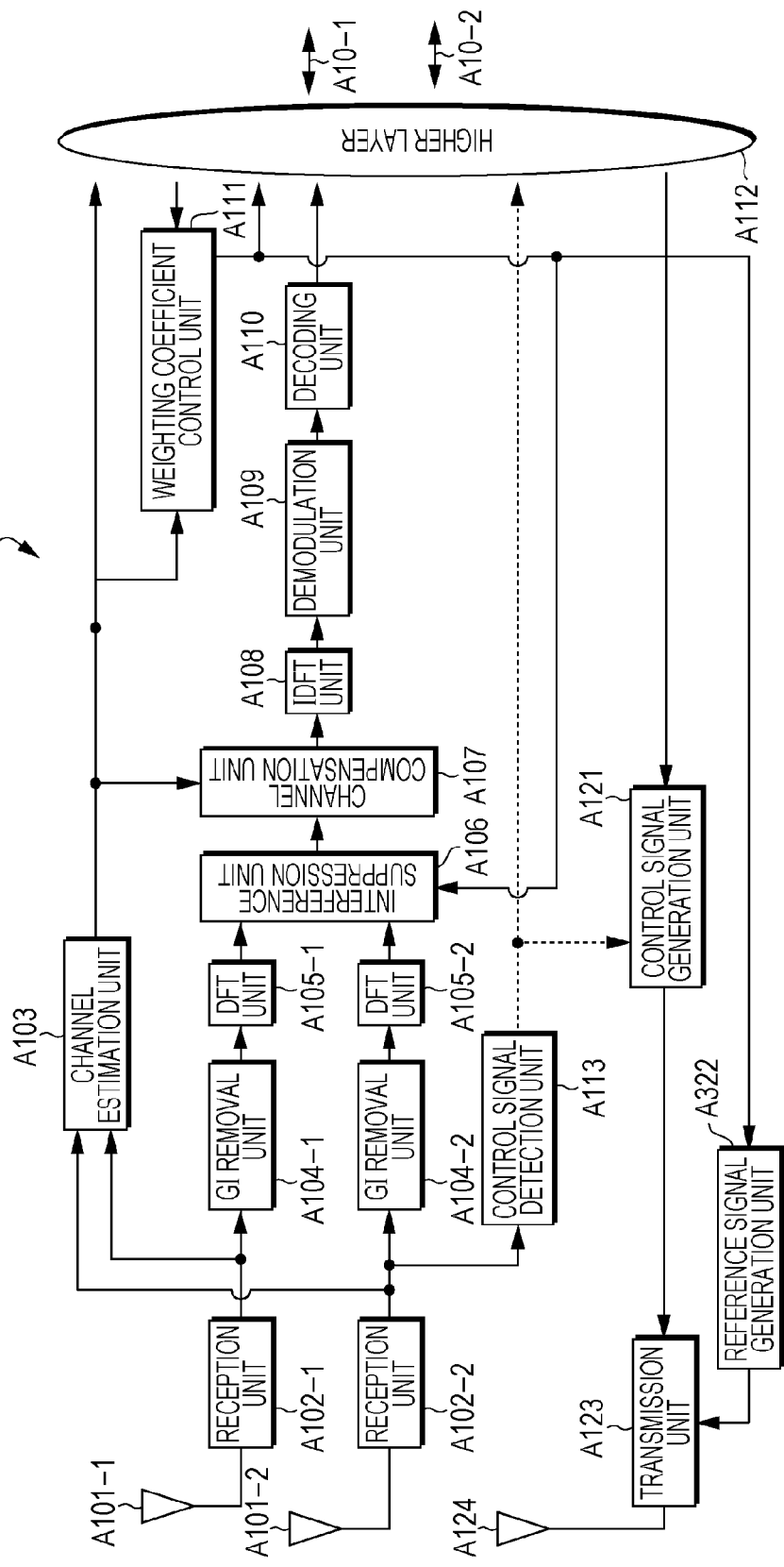
FIG. 25 is a schematic diagram illustrating the configuration of a main base station apparatus in the communication system according to the sixth embodiment.

FIG. 25 is a schematic diagram illustrating the configuration of the base station apparatus A300-1 according to the sixth embodiment. As illustrated in FIG. 25, the master base station apparatus (the base station apparatus A300-1) is configured by including a plurality of reception antenna units A101-L (L is an arbitrary positive integer and will denote the number of components in the following description), reception units A102-L, a channel estimation unit A103, GI removal units A104-L, DFT units A105-L, an interference suppression unit A106, a channel compensation unit A107, an IDFT unit A108, a demodulation unit A109, a decoding unit A110, a weighting coefficient control unit A111, a higher layer A112, a control signal detection unit A113, a control signal generation unit A121, a reference signal generation unit A322, a transmission unit A123, and a transmission antenna unit A124. It is to be noted that although an example of a case in which the base station apparatus A300-1 includes two (L=2) reception antenna units is illustrated in FIG. 25, the number of reception antenna units is not limited to this, and any number of antennas may be included. In addition, although one transmission antenna unit is included, the number of transmission antenna units is not limited to this, and a plurality of transmission antenna units may be included, or a transmission antenna unit and a reception antenna unit may be the same. In addition, if part or the entirety of the base station apparatus A300-1 is realized as a chip, namely an integrated circuit, a chip control circuit (not illustrated) that controls each function block is included.

In the base station apparatus A300-1, components having the same reference numerals as those illustrated in FIG. 19 have the same functions and operations, and accordingly description thereof is omitted. Between the base station apparatus A300-1 according to the sixth embodiment and the base station apparatus A100-1 according to the fourth embodiment, the reference signal generation unit A322 is different. This component will be mainly described hereinafter.

The reference signal generation unit A322 generates first reference signals used for estimating transmission characteristics from the transmission antenna of the base station apparatus A300-$j$ to reception antennas of the mobile station apparatuses A400-$k$ and a second reference signal used for transmitting a transmission weighting coefficient $V_1$ to the mobile station apparatus. It is to be noted that the transmission weighting coefficient $V_1$ is input to the reference signal generation unit A322 from the weighting coefficient control unit A111. The second reference signal is generated by multiplying a known code sequence predetermined by the communication system 1$a$ by the transmission weighting coefficient $V_1$. Here, the reference signal generation unit that generates reference signals including a weighting coefficient may be referred to as a weighting coefficient information generation unit, and the reference signals including the weighting coefficient generated by the reference signal generation unit may be referred to as weighting coefficient information.

For example, if the known code sequence predetermined by the communication system A1$a$ is denoted by $S_{RS}$, the first reference signals are denoted by $S_{RS}$ and the second reference signal is denoted by $V_1 S_{RS}$. It is to be noted that, as the code sequence, an orthogonal sequence, that is, for example, a Hadamard code, a CAZAC (constant amplitude zero autocorrelation) sequence, or the like may be used.

The transmission unit A123 has a function of performing resource mapping on the first reference signals, the second reference signal, and control signals in resource elements. The transmission unit A123 then up-converts signals including the control signals output from the control signal generation unit A121, the first reference signals, and the second reference signal such that the signals fall into the frequency band in which downlink transmission is possible, and transmits the signals to the connected base station apparatus through the transmission antenna unit A124.

Next, the base station apparatus A300-2 and the base station apparatus A300-3 (slave base station apparatuses) according to the sixth embodiment will be described.

Figure 26:
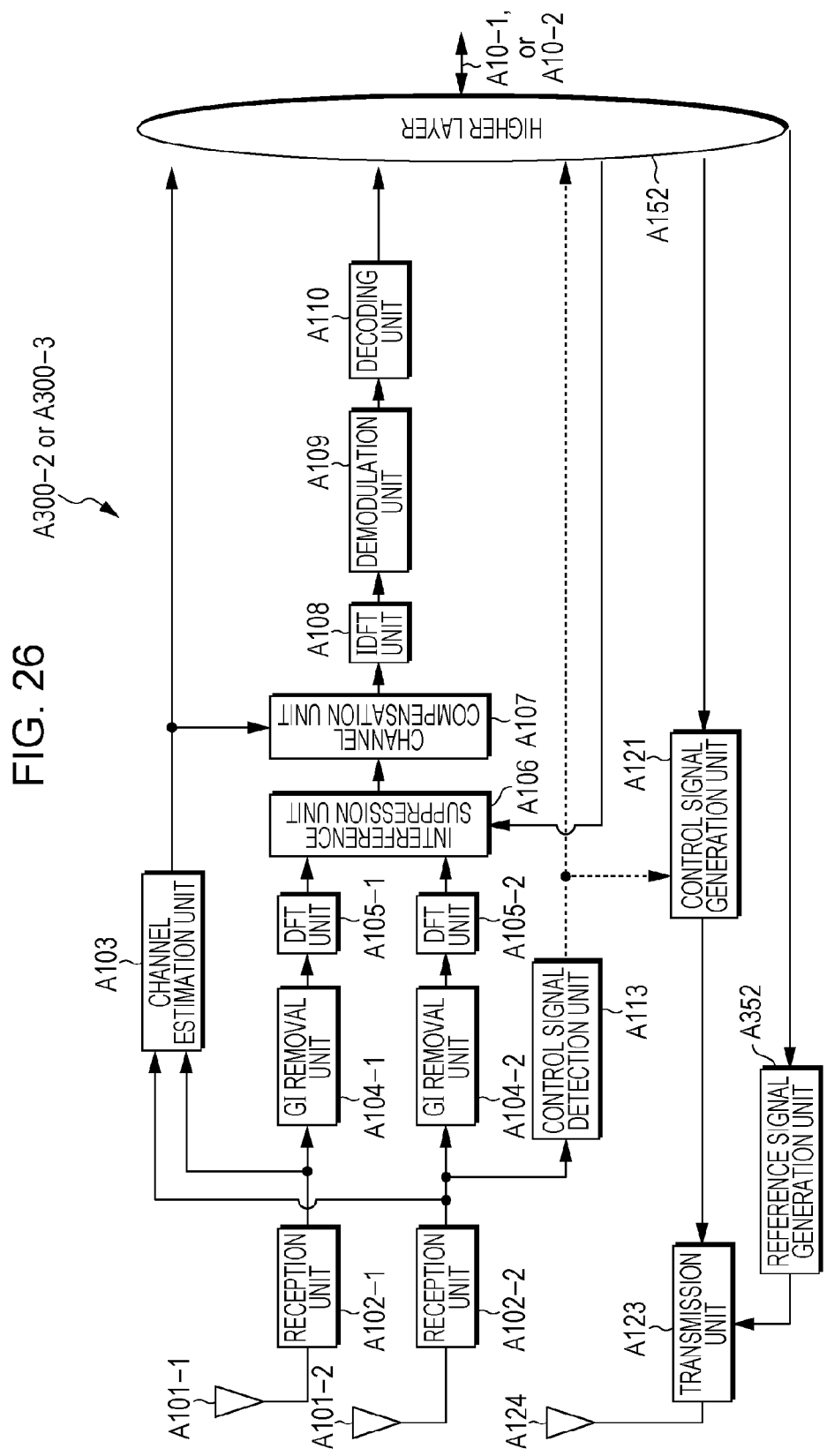
FIG. 26 is a schematic diagram illustrating the configurations of subsidiary base station apparatuses according to the sixth embodiment.

FIG. 26 is a schematic diagram illustrating the configurations of the base station apparatus A300-2 and the base station apparatus A300-3 according to the sixth embodiment. Although the configuration of the base station apparatus A300-2 will be described hereinafter, the base station apparatus A300-3 has the same configuration. In addition, the number of slave base station apparatuses is not limited to two, and it is only required that at least one base station apparatus be included.

As illustrated in FIG. 26, each of the slave base station apparatuses (the base station apparatuses A300-2 and A300-3) is configured by including a plurality of reception antenna units A101-L (L is an arbitrary positive integer and denotes the number of components), reception units A102-L, a channel estimation unit A103, GI removal units A104-L, DFT units A105-L, an interference suppression unit A106, a channel compensation unit A107, an IDFT unit A108, a demodulation unit A109, a decoding unit A110, a higher layer A152, a control signal detection unit A113, a control signal generation unit A121, a reference signal generation unit A352, a transmission unit A123, and a transmission antenna unit A124. It is to be noted that although an example of a case in which the base station apparatus A300-2 includes two (L=2) reception antenna units is illustrated in FIG. 26, the number of reception antenna units is not limited to this, and any number of antennas may be included. In addition, although one transmission antenna unit is included, the number of transmission antenna units is not limited to this, and a plurality of transmission antenna units may be included, or a transmission antenna unit and a reception antenna unit may be the same. In addition, if part or the entirety of the base station apparatus A300-2 is realized as a chip, namely an integrated circuit, a chip control circuit (not illustrated) that controls each control block is included.

In the base station apparatus A300-2, components having the same reference numerals as those illustrated in FIG. 21 have the same functions and operations, and accordingly description thereof is omitted. Between the base station apparatus A300-2 according to the sixth embodiment and the base station apparatus A100-2 according to the fourth embodiment, the reference signal generation unit A352 is different. This component will be mainly described hereinafter.

The reference signal generation unit A352 generates first reference signals used for estimating transmission characteristics from the transmission antenna of the base station apparatus to reception antennas of the mobile station apparatuses and a second reference signal used for transmitting a transmission weighting coefficient $V_2$ to the mobile station apparatus A400-2.

For example, if the known code sequence predetermined by the communication system 1a is denoted by $S_{RS}$, the first reference signals are denoted by $S_{RS}$ and the second reference signal is denoted by $V_2 S_{RS}$. The transmission weighting coefficient $V_2$ has been obtained from the base station apparatus A300-1 through the backhaul line A10-1, and input through the higher layer A152.

The transmission unit A123 has a function of performing resource mapping on the first reference signals, the second reference signal, and control signals in resource elements. The control signals are signals that are generated by the control signal generation unit 121 including control data such as MCS information and spatial multiplexing information regarding transmission signals of the mobile station apparatus A400-2. As described above, the same resource mapping format as that used by the transmission unit A123 of the base station apparatus A300-1 may be applied.

In addition, the transmission unit A123 up-converts signals including the control signals output from the control signal generation unit A121, the first reference signals, and the second reference signal such that the signals fall into the frequency band in which downlink transmission is possible, and transmits the signals to the connected base station apparatus through the transmission antenna unit A124.

Next, the configurations of the mobile station apparatuses A400-j according to the sixth embodiment will be described.

Figure 27:
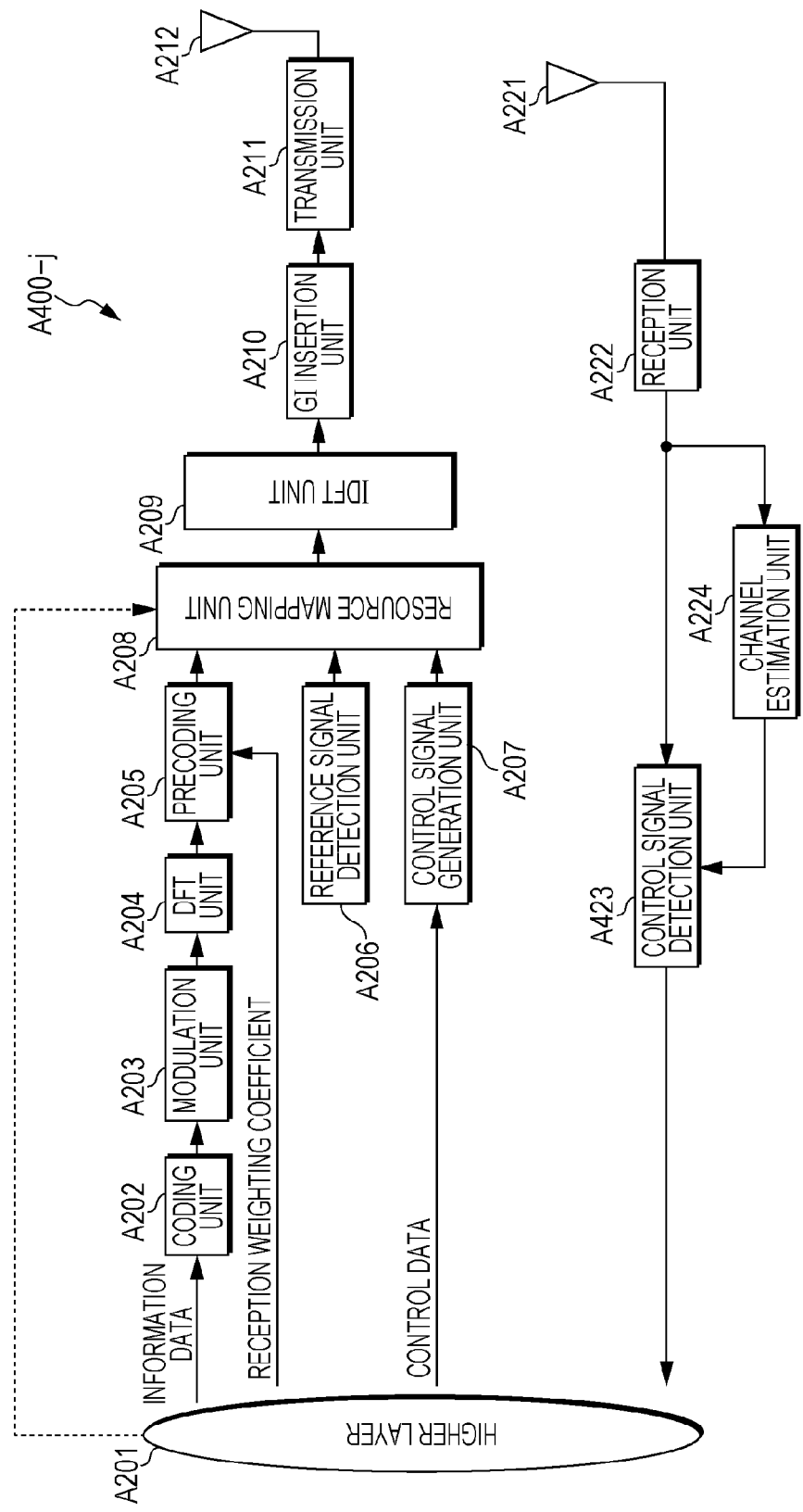
FIG. 27 is a schematic diagram illustrating the configurations of mobile station apparatuses according to the sixth embodiment.

FIG. 27 is a conceptual diagram illustrating the configurations of the mobile station apparatuses A400-j according to the sixth embodiment. As illustrated in FIG. 27, each mobile station apparatus A400-j is configured by including a higher layer A201, a coding unit A202, a modulation unit A203, a DFT unit A204, a precoding unit A205, a reference signal generation unit A206, a control signal generation unit A207, a resource mapping unit A208, an IDFT unit A209, a GI insertion unit A210, a transmission unit A211, a transmission antenna unit A212, a reception antenna unit A221, a reception unit A222, a control signal detection unit A423, and a channel estimation unit A224. It is to be noted that if part or the entirety of each mobile station apparatus A400-j is realized as a chip, namely an integrated circuit, a chip control circuit (not illustrated) that controls each function block is included.

In the mobile station apparatuses A400-j, components having the same reference numerals as those illustrated in FIG. 22 have the same functions and operations, and accordingly description thereof is omitted. Between the mobile station apparatuses A400-j according to the sixth embodiment and the mobile station apparatuses A200-j according to the fourth embodiment, the control signal detection unit A423 is different. This component will be mainly described hereinafter.

The channel estimation unit A224 performs channel estimation using the first reference signal $S_{RS1}$ included in signals output from the reception unit A222. The channel estimation unit A224 then transmits a channel estimation value (for example, a transmission function) to the control signal detection unit A423.

More specifically, the channel estimation unit A224 calculates a channel estimation value H^ by dividing a first reference signal $H_k S_{RS1}$ (here, $H_k$ denotes a channel between the base station apparatus A300-j (however, j=k) and the mobile station apparatus A400-k) output from the reception unit A222 by a known signal $S_{RS1}$.

In addition, a channel estimation value of a subcarrier in which the known signal $S_{RS1}$ is not arranged can be calculated through an interpolation technique such as linear interpolation or FFT complement using a channel estimation value of a subcarrier in which the first reference signal $H_{SRS1}$ is arranged.

The control signal detection unit A423 detects control signals included in signals output from the reception unit A222. After extracting information regarding the MCS and the number of layers added to information data included in the control signals, the control signal detection unit A423 transmits the information to the higher layer A201.

In addition, the control signal detection unit A423 calculates a transmission weighting coefficient $V_k\hat{}$ using the second reference signal $S_{RS2}$ (=$V_k S_{RS1}$) included in the signals output from the reception unit A222. The control signal detection unit A423 then inputs the transmission weighting coefficient $V_k\hat{}$ to the higher layer A201. The calculated transmission weighting coefficient $V_k\hat{}$ can be expressed by the following (Math. 12). Here, $H_k\hat{}$ denotes the channel estimation value.

$$\hat{V}_k = H_k R_{RS2}/\hat{H}_k S_{RS2} = H_k V_k S_{RS1}/\hat{H}_{RS2} \qquad [\text{Math. 12}]$$

The precoding unit A205 multiplies output signals of the DFT unit A204 by the transmission weighting coefficient $V_k$.

Next, resource mapping performed when the transmission antenna unit A124 of the base station apparatus A300-1 according to the sixth embodiment performs transmission will be described with reference to FIG. 28.

Figure 28:
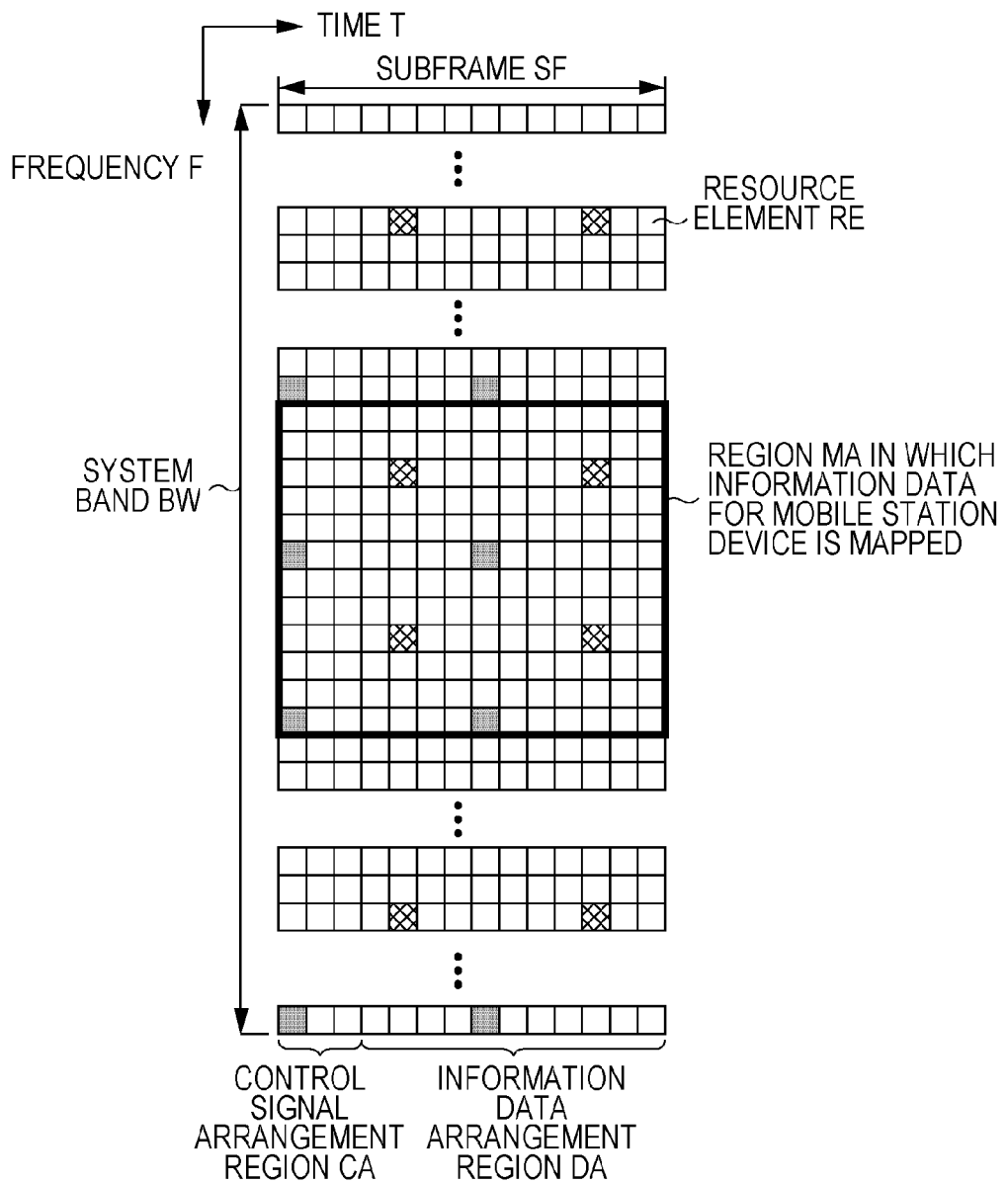
FIG. 28 illustrates an example of resource mapping performed by a resource mapping unit of the base station apparatus according to the sixth embodiment.

In FIG. 28, the horizontal direction represents the time T, and the vertical direction represents the frequency F. White portions RE1 are resource elements in which the control signals and the downlink information data are mapped. In addition, a range MA indicated by thick lines is a region in which the base station apparatus A300-1 maps information data for a mobile station apparatus to which the transmission weighting coefficient $V_j$ is to be transmitted.

In addition, hatched portions RE2 and solid portions RE3 are resource elements in which the reference signals are mapped. The resource elements in which the reference signals can be mapped are included over the entirety of a system band. That is, such resource elements are resource elements in which cell-specific reference signals are mapped.

Among the resource elements in which the reference signals are mapped, the first reference signals are mapped in the solid portions RE3. In addition, among the resource elements in which the reference signals are mapped, the second reference signals are arranged in the hatched portions RE2.

Thus, by multiplying part of the cell-specific reference signals by the transmission weighting coefficient $V_j$, the transmission weighting coefficient $V_j$ is transmitted to the mobile station apparatus. It is to be noted that error correction coding and a modulation process may be performed on the information data and the control signals (the same holds true in FIG. 29 to FIG. 31).

Figure 29:
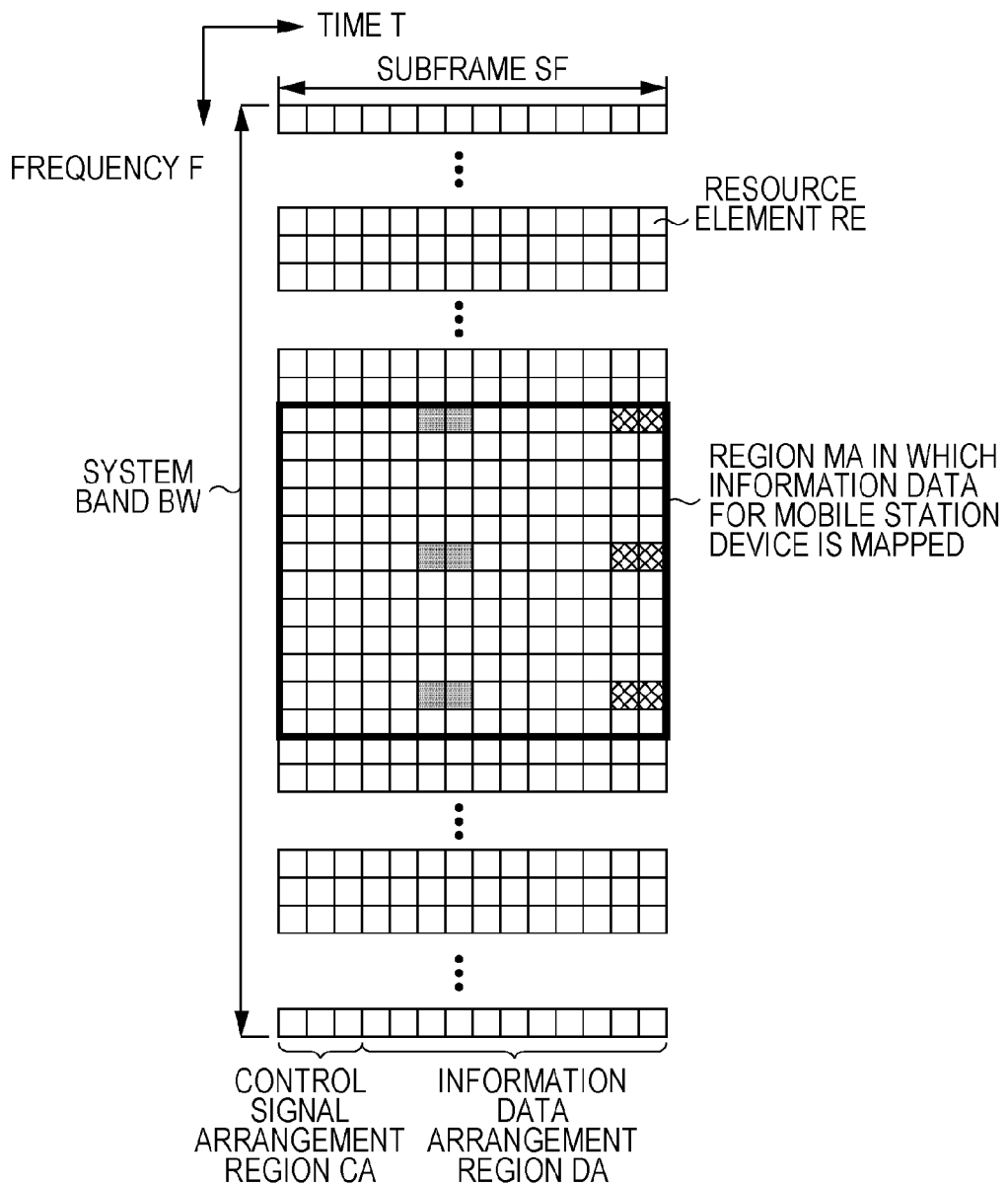
FIG. 29 illustrates another example of the resource mapping performed by the resource mapping unit of the base station apparatus according to the sixth embodiment.

FIG. 29 illustrates another example of the resource mapping performed when the resource mapping unit A124 of the base station apparatus A300-1 according to the sixth embodiment performs transmission.

In FIG. 29, the horizontal direction represents the time T, and the vertical direction represents the frequency F. In FIG. 29, white portions RE1 are resource elements in which the control signals and the downlink information data are mapped. A range MA indicated by thick lines is a region in which the base station apparatus A300-1 maps information data for a mobile station apparatus to which the transmission weighting coefficient $V_j$ is to be transmitted.

In addition, hatched portions RE2 and solid portions RE3 are resource elements in which the reference signals are mapped. The resource elements in which the reference signals can be mapped are included in the range in which the downlink information data for the mobile station apparatus to which the transmission weighting coefficient $V_j$ is to be transmitted is assigned. That is, such resource elements are resource elements in which user-specific reference signals are mapped.

Among the resource elements in which the reference signals are mapped, the first reference signals are mapped in the solid portions RE3. In addition, among the resource elements in which the reference signals are mapped, the second reference signals are arranged in the hatched portions RE2.

Thus, by multiplying part of the user-specific reference signals by the transmission weighting coefficient $V_j$, the transmission weighting coefficient $V_j$ is transmitted to the mobile station apparatus.

Figure 30:
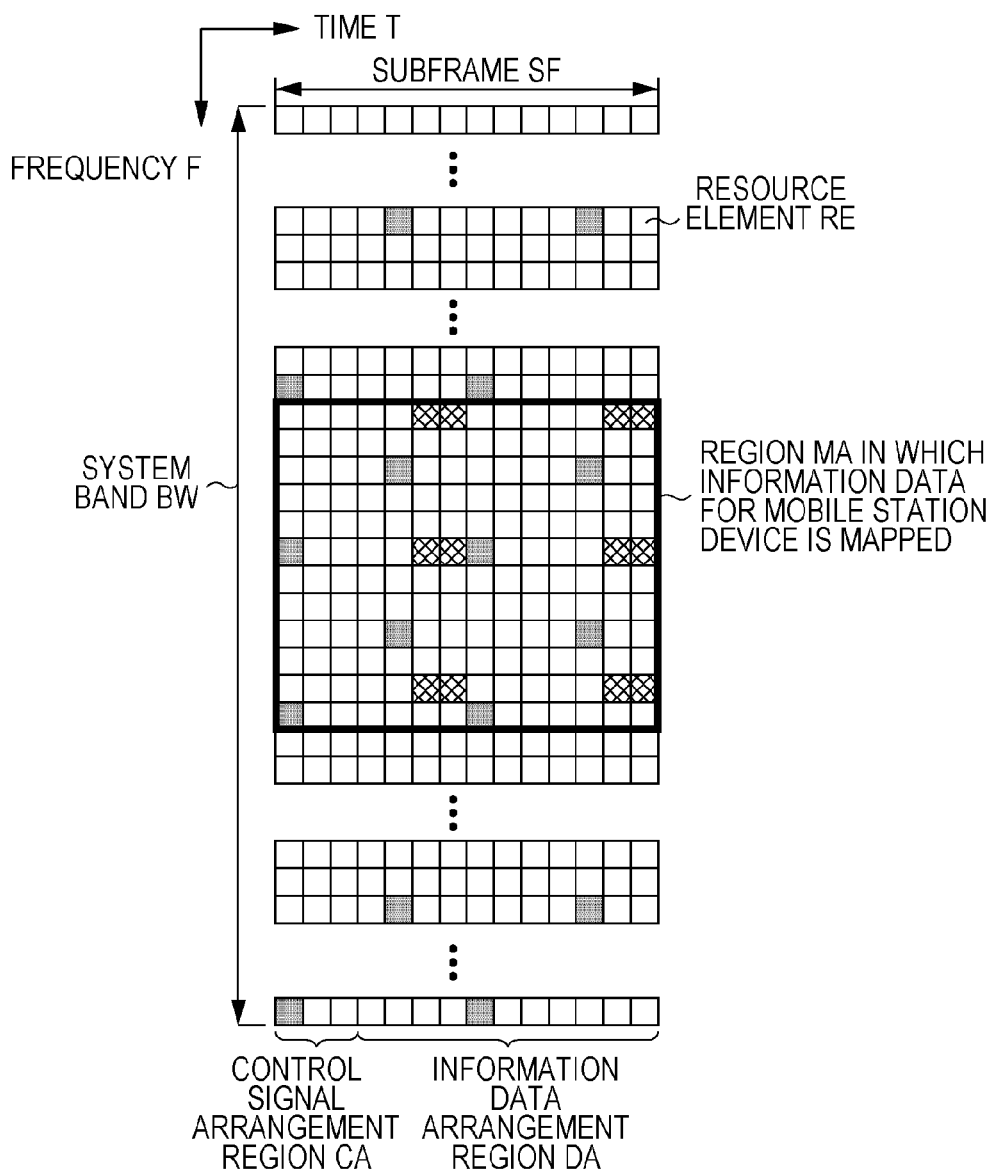
FIG. 30 illustrates another example of the resource mapping performed by the resource mapping unit of the base station apparatus according to the sixth embodiment.

FIG. 30 illustrates another example of the resource mapping performed when the resource mapping unit A124 of the base station apparatus A300-1 according to the sixth embodiment performs transmission.

In FIG. 30, the horizontal direction represents the time T, and the vertical direction represents the frequency F. In FIG. 30, white portions RE1 are resource elements in which the control signals and the downlink information data are mapped. A region MA indicated by thick lines is a region MA in which information data for a mobile station apparatus to which the transmission weighting coefficient is to be transmitted is assigned.

In addition, hatched portions RE2 and solid portions RE3 are resource elements in which the reference signals are mapped. The resource elements indicated by the solid portions RE3 in which the reference signals can be mapped are resource elements in which the cell-specific reference signals are mapped. The resource elements indicated by the hatched portions RE2 in which the reference signals can be mapped are resource elements in which the user-specific reference signals are mapped.

Among the resource elements in which the reference signals are mapped, the first reference signals are mapped in the solid portions RE3. In addition, among the resource elements in which the reference signals are mapped, the second reference signals are arranged in the hatched portions RE2. It is to be noted that the second reference signals may be arranged in the solid portions RE3 and the second reference signals may be arranged in the hatched portions RE2, instead.

Thus, by multiplying either the user-specific reference signals or the cell-specific reference signals by the transmission weighting coefficient $V_j$, the transmission weighting coefficient $V_j$ is transmitted to the mobile station apparatus.

Figure 31:
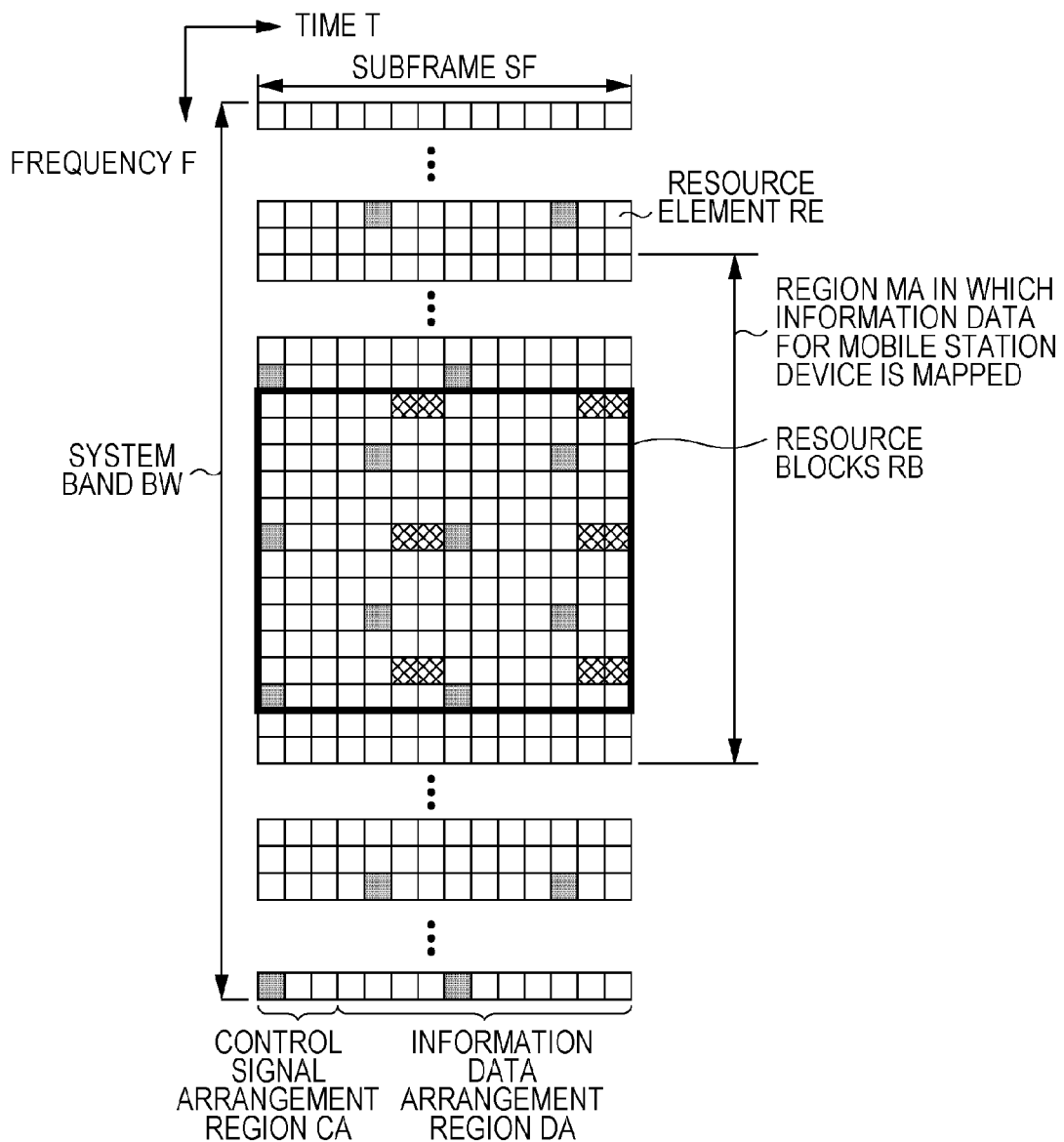
FIG. 31 illustrates another example of the resource mapping performed by the resource mapping unit of the base station apparatus according to the sixth embodiment.
Figure 32:
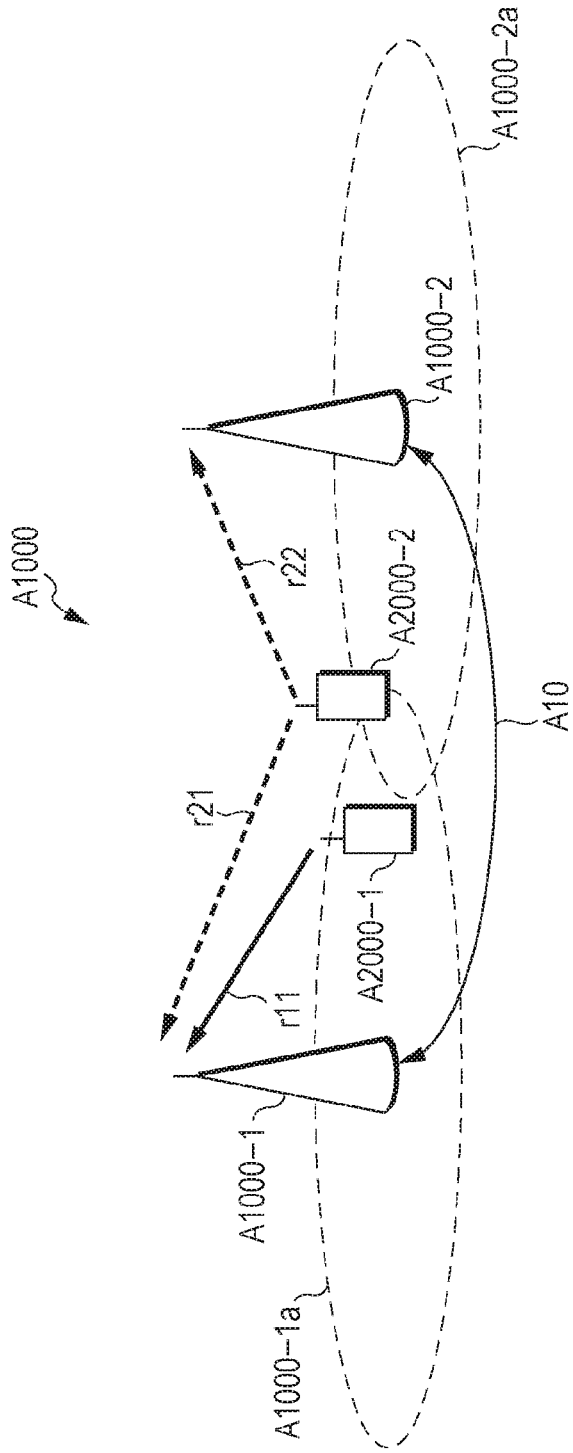
FIG. 32 is a schematic diagram illustrating the configuration of an existing communication system.
Figure 33:
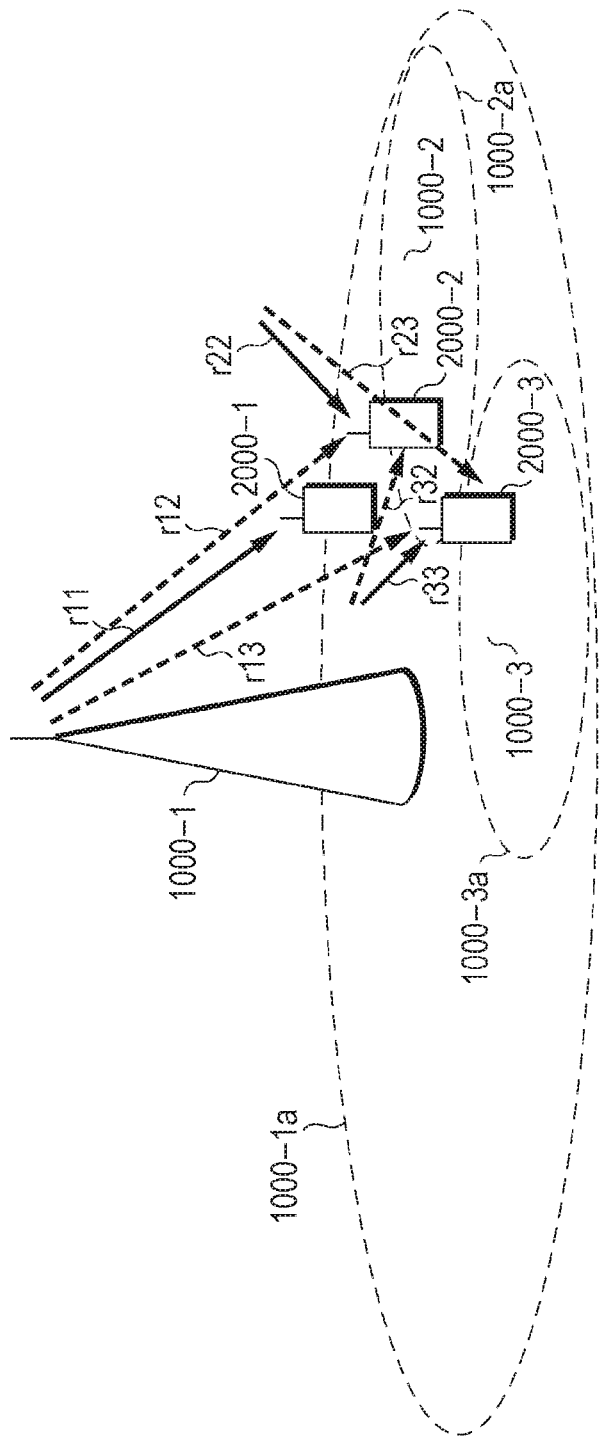
FIG. 33 is a schematic diagram illustrating the configuration of an existing communication system.

FIG. 31 illustrates another example of the resource mapping performed when the resource mapping unit A124 of the base station apparatus A300-1 according to the sixth embodiment performs transmission.

In FIG. 31, the horizontal direction represents the time T, and the vertical direction represents the frequency F. In FIG. 31, white portions RE1 are resource elements in which the control signals and the downlink information data are mapped. A region RB indicated by thick lines is resource blocks. A resource block is a unit of resources in which a plurality of resource elements are collected, and is a minimum unit of resources to which the downlink information data is assigned for each mobile station apparatus. In FIG. 31, the resource blocks RB may each be resources configured by twelve subcarriers and seven OFDM symbols.

In addition, hatched portions RE2 and solid portions RE3 are resource elements in which the reference signals are mapped. The resource elements indicated by the solid portions RE3 in which the reference signals are mapped are resource elements in which the cell-specific reference signals are mapped. The resource elements indicated by the hatched portions RE2 in which the reference signals can be mapped are resource elements in which the user-specific reference signals are mapped.

In addition, among the resource elements in which the reference signals are mapped, the first reference signals are mapped in the solid portions RE3. In addition, among the resource elements in which the reference signals are mapped, the second reference signals are arranged in the hatched portions RE2.

Thus, by multiplying either the mobile station apparatus-specific reference signals or the cell-specific reference signals included in the resource blocks, which are part of the region in which the information data for the mobile station apparatus is mapped, by the transmission weighting coefficient, the transmission weighting coefficient is transmitted to the mobile station apparatus.

As described above, in the communication system according to the sixth embodiment, the entirety or part of cells of the plurality of base station apparatuses are arranged in such a way as to overlap with one another, and the plurality of base station apparatuses and the mobile station apparatuses connected to the base station apparatuses suppress inter-cell interference in a coordinated manner. Since the base station apparatuses transmit the transmission weighting coefficients for suppressing the inter-cell interference to the mobile station apparatuses using the reference signals, an increase in the number of control signals can be suppressed, thereby realizing a communication system capable of reducing the amount of processing of the control signals in the plurality of base station apparatuses and the mobile station apparatuses. In addition, the base station apparatuses can transmit the weighting coefficients using the cell-specific reference signals, and accordingly a communication system in which data can be efficiently transmitted and received in accordance with a communication environment can be constructed.

It is to be noted that although a method for transmitting the transmission weighting coefficients to the mobile station apparatuses by multiplying the reference signals by the transmission weighting coefficients has been described in this embodiment, the method is not limited to this, and it is only required that the signals multiplied by the transmission weighting coefficients be known signals. For example, control signals that are known signals may be multiplied by the transmission weighting coefficients in order to transmit the transmission weighting coefficients to the mobile station apparatuses.

It is to be noted that programs operating on the base station apparatuses and the mobile station apparatuses according to the present invention are programs (programs that cause a computer to function) that control CPUs or the like in such a way as to realize the functions of the embodiments of the present invention. In addition, information handled by these apparatuses is temporarily accumulated in RAMs during processing, and then stored in various ROMs and HDDs and read, corrected, and written by the CPUs as necessary. As a recording medium that stores the programs, any of semiconductor media (for example, a ROM, a nonvolatile memory card, and the like), optical recording media (for example, a DVD, an MO, an MD, a CD, a BD, and the like), magnetic recording media (for example, a magnetic tape, a flexible disk, and the like), and the like may be used. In addition, not only the functions of the above-described embodiments are realized by executing loaded programs but also the functions of the present invention might be realized by performing processing in cooperation with an operating system, another application program, or the like on the basis of instructions from the programs.

In addition, when the programs are to be distributed in the market, the programs can be stored in a portable recording medium and distributed, or the programs can be transferred to a server computer connected through a network such as the Internet. In this case, a storage apparatus of the server computer is also included in the present invention. In addition, part or the entirety of each mobile station apparatus and each base station apparatus in the above-described embodiments may be realized as LSI, which is typically an integrated circuit. The function blocks of a reception apparatus may be individually realized as chips, or part or all of the function blocks may be integrated and realized as a chip. If the function blocks are realized as integrated circuits, an integrated circuit control unit that controls the integrated circuits is added.

In addition, a method for realizing these apparatuses as integrated circuits is not limited to LSI, but dedicated circuits or general-purpose processors may be used. In addition, if a technique for realizing these apparatuses as integrated circuits that replaces LSI appears as a result of evolution of semiconductor technologies, integrated circuits realized by the technique may be used.

Although the embodiments of the present invention have been described with reference to the drawings, specific configurations are not limited to those according to the embodiments, and the claims include designs and the like that do not deviate from the scope of the present invention.

REFERENCE SIGNS LIST 1 communication system
100-1 (master) base station apparatus
100-2, 100-3 (slave) base station apparatus
101, 211 higher layer
102 coding unit
103 modulation unit
104 precoding unit
105 weighting coefficient control unit
106 reference signal generation unit
107, 221 control signal generation unit
108 resource mapping unit
109 IDFT unit
110 GI insertion unit
111, 223 transmission unit
112, 221 transmission antenna unit
121, 201-1, 201-2 reception antenna unit
122, 202-1, 202-2 reception unit
123 control signal detection unit
200-1, 200-2, 200-3 mobile station apparatus
203 channel estimation unit
204-1, 204-2 GI removal unit
205-1, 205-2 DFT unit
206 interference suppression unit
207 channel compensation unit
208 demodulation unit
209 decoding unit
210 control signal detection unit
A1 communication system
A100-1 (master) base station apparatus
A100-2, A100-3 (slave) base station apparatus
A102-L, A222 reception unit
A101-L, A221 reception antenna unit
A103 channel estimation unit
A104-L GI removal unit
A105-L DFT unit
A106 interference suppression unit
A107 channel compensation unit
A108 IDFT unit
A109 demodulation unit
A110 decoding unit
A111 weighting coefficient control unit
A112, A152, A201 higher layer
A113 control signal detection unit
A121, A207 control signal generation unit
A122, A206 reference signal generation unit
A123, A211 transmission unit
A124, A212 transmission antenna unit
A202 coding unit
A203 modulation unit
A204 DFT unit
A205 precoding unit
A208 resource mapping unit
A209 IDFT unit
A210 GI insertion unit
A223 control signal detection unit
A224 channel estimation unit

The invention claimed is:

1. A second communication apparatus that transmits information data and reference signals to a first communication apparatus, the second communication apparatus comprising:
a weighting coefficient controller that calculates both transmission weighting coefficients and reception weighting coefficients by which the information data is multiplied;
a precoder that multiplies the information data by the transmission weighting coefficients;
a reference signal generator that multiplies the reference signals by the reception weighting coefficients which are not shared in advance by the first communication apparatus and the second communication apparatus and used by the first communication apparatus having received the information data;

a transmitter that transmits the information data and the reference signals; and a higher layer processor that that assigns resources made up of resource blocks to the first communication apparatus based upon scheduling information and the reference signals.

2. The second communication apparatus according to claim 1, wherein the reference signals are part of reference signals specific to the first communication apparatus.

3. The second communication apparatus according to claim 1, wherein the second communication apparatus configures a cell, and the reference signals are part of reference signals specific to the cell of the second communication apparatus.

4. The second communication apparatus according to claim 1, wherein the second communication apparatus configures a cell, and the reference signals are reference signals specific to the first communication apparatus.

5. The second communication apparatus according to claim 1, in a communication system that includes third communication apparatuses and a fourth communication apparatus connected to the third communication apparatuses, further comprising:

the higher layer processor notifies the third communication apparatuses of the transmission weighting coefficients by which the information data transmitted by the third communication apparatuses is multiplied, and the reception weighting coefficients used by the fourth communication apparatus.

6. The second communication apparatus according to claim 1, in a communication system that includes third communication apparatuses and a fourth communication apparatus connected to the third communication apparatuses, wherein the weighting coefficient controller calculates the transmission weighting coefficients by which the information data transmitted by the second communication apparatus and the third communication apparatuses is multiplied, and the reception weighting coefficients used by the first communication apparatus and the fourth communication apparatus.

7. A communication method used by a second communication apparatus that transmits information data and reference signals to a first communication apparatus, the communication method comprising the steps of:

calculating both transmission weighting coefficients and reception weighting coefficients by which information data is multiplied;

multiplying the information data by the transmission weighting coefficients;

multiplying the reference signals by the reception weighting coefficients which are not shared in advance by the first communication apparatus and the second communication apparatus and used by the first communication apparatus having received the information data; and transmitting the information data and the reference signals; wherein a higher layer processor is used to assign resources made up of resource blocks to the first communication apparatus based upon scheduling information and the reference signals.

8. A first communication apparatus that receives information data and reference signals from a second communication apparatus, the first communication apparatus comprising:

a control signal processor that calculates reception weighting coefficients that are not shared in advance by the first communication apparatus and the second communication apparatus by using the reference signals multiplied by the reception weighting coefficients by which the information data is multiplied;

a multiplier that multiplies the information data by the reception weighting coefficients;

a receiver that receives the information data and the reference signals; and a higher layer processor that that assigns resources made up of resource blocks to the first communication apparatus based upon scheduling information and the reference signals.

9. A communication method used by a first communication apparatus that receives information data and reference signals from a second communication apparatus, the communication method comprising the steps of:

calculating reception weighting coefficients that are not shared in advance by the first communication apparatus and the second communication apparatus by using the reference signals multiplied by the reception weighting coefficients by which the information data is multiplied;

multiplying the information data by the reception weighting coefficients; and receiving the information data and the reference signals; and a higher layer processor is used to assign resources made up of resource blocks to the first communication apparatus based upon scheduling information and the reference signals.

* * * * *